(12) United States Patent
Black et al.

(10) Patent No.: US 8,331,385 B2
(45) Date of Patent: Dec. 11, 2012

(54) METHOD AND APPARATUS FOR FLEXIBLE PACKET SELECTION IN A WIRELESS COMMUNICATION SYSTEM

(75) Inventors: Peter John Black, San Diego, CA (US); Rohit Kapoor, San Diego, CA (US); Serafin Diaz Spindola, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 724 days.

(21) Appl. No.: 11/216,872

(22) Filed: Aug. 30, 2005

(65) Prior Publication Data
US 2006/0050743 A1    Mar. 9, 2006

Related U.S. Application Data

(60) Provisional application No. 60/606,036, filed on Aug. 30, 2004.

(51) Int. Cl.
*H04L 12/28* (2006.01)
*H04L 12/54* (2006.01)
*H04L 12/56* (2006.01)

(52) U.S. Cl. ........................................ 370/412; 370/429
(58) Field of Classification Search .................. None
See application file for complete search history.

(56) References Cited

U.S. PATENT DOCUMENTS

| | | | |
|---|---|---|---|
| 4,710,960 A | 12/1987 | Sato | |
| 5,283,811 A | 2/1994 | Chennakeshu et al. | |
| 5,317,604 A | 5/1994 | Osterweil | |
| 5,371,853 A | 12/1994 | Kao et al. | |
| 5,440,562 A | 8/1995 | Cutler | |
| 5,490,479 A | 2/1996 | Shalev | |
| 5,586,193 A | 12/1996 | Ichise et al. | |
| 5,640,388 A | 6/1997 | Woodhead et al. | |
| 5,696,557 A | 12/1997 | Yamashita et al. | |
| 5,794,186 A | 8/1998 | Bergstrom et al. | |
| 5,899,966 A | 5/1999 | Matsumoto et al. | |
| 5,929,921 A | 7/1999 | Taniguchi et al. | |
| 5,940,479 A | 8/1999 | Guy et al. | |
| 5,966,187 A | 10/1999 | Do | |
| 6,073,092 A | 6/2000 | Kwon | |
| 6,134,200 A | 10/2000 | Timmermans | |
| 6,240,386 B1 | 5/2001 | Thyssen | |
| 6,259,677 B1 | 7/2001 | Jain | |

(Continued)

FOREIGN PATENT DOCUMENTS

CN    018103383    10/2005

(Continued)

OTHER PUBLICATIONS

PCT International Search Report.

(Continued)

*Primary Examiner* — Gregory Sefcheck
*Assistant Examiner* — Suk Jin Kang
(74) *Attorney, Agent, or Firm* — Heejong Yoo

(57) ABSTRACT

Adaptive De-Jitter Buffer for Voice over IP (VoIP) for packet switch communications. The de-jitter buffer methods and apparatus presented avoid playback of underflows while balancing end-to-end delay. In one example, the de-jitter buffer is recalculated at the beginning of each talkspurt. In another example, talkspurt packets are compressed upon receipt of all remaining packets.

24 Claims, 35 Drawing Sheets

U.S. PATENT DOCUMENTS

| | | | |
|---|---|---|---|
| 6,366,880 B1 | 4/2002 | Ashley | |
| 6,370,125 B1 | 4/2002 | Belk | |
| 6,377,931 B1* | 4/2002 | Shlomot | 704/503 |
| 6,456,964 B2 | 9/2002 | Manjunath et al. | |
| 6,496,794 B1 | 12/2002 | Kleider et al. | 704/201 |
| 6,693,921 B1* | 2/2004 | Whitfield | 370/516 |
| 6,785,230 B1 | 8/2004 | Ogata et al. | |
| 6,813,274 B1 | 11/2004 | Suzuki et al. | |
| 6,859,460 B1* | 2/2005 | Chen | 370/412 |
| 6,922,669 B2 | 7/2005 | Schalk et al. | |
| 6,925,340 B1 | 8/2005 | Suito et al. | |
| 6,944,510 B1 | 9/2005 | Ballesty et al. | |
| 6,996,626 B1* | 2/2006 | Smith | 709/232 |
| 7,006,511 B2 | 2/2006 | Lanzafame et al. | |
| 7,016,970 B2 | 3/2006 | Harumoto et al. | |
| 7,079,486 B2 | 7/2006 | Colavito et al. | |
| 7,117,156 B1* | 10/2006 | Kapilow | 704/267 |
| 7,126,957 B1 | 10/2006 | Isukapalli et al. | |
| 7,158,572 B2 | 1/2007 | Dunne et al. | |
| 7,263,109 B2 | 8/2007 | Ternovsky | |
| 7,266,127 B2 | 9/2007 | Gupta et al. | |
| 7,272,400 B1 | 9/2007 | Othmer | |
| 7,280,510 B2 | 10/2007 | Lohtia et al. | |
| 7,336,678 B2 | 2/2008 | Vinnakota et al. | |
| 7,424,026 B2 | 9/2008 | Mallila | |
| 7,496,086 B2 | 2/2009 | Eckberg | |
| 7,525,918 B2 | 4/2009 | LeBlanc et al. | |
| 7,551,671 B2 | 6/2009 | Tyldesley et al. | |
| 7,817,677 B2 | 10/2010 | Black et al. | |
| 7,826,441 B2 | 11/2010 | Black et al. | |
| 7,830,900 B2 | 11/2010 | Black et al. | |
| 8,155,965 B2 | 4/2012 | Kapoor et al. | |
| 2002/0016711 A1 | 2/2002 | Manjunath et al. | |
| 2002/0064158 A1 | 5/2002 | Yokoyama et al. | |
| 2002/0133334 A1 | 9/2002 | Coorman et al. | |
| 2002/0133534 A1 | 9/2002 | Forslow | |
| 2002/0145999 A1* | 10/2002 | Dzik | 370/352 |
| 2003/0152093 A1* | 8/2003 | Gupta et al. | 370/412 |
| 2003/0152094 A1* | 8/2003 | Colavito et al. | 370/412 |
| 2003/0152152 A1 | 8/2003 | Dunne et al. | |
| 2003/0185186 A1 | 10/2003 | Tsutsumi et al. | |
| 2003/0202528 A1* | 10/2003 | Eckberg | 370/412 |
| 2004/0022262 A1* | 2/2004 | Vinnakota et al. | 370/429 |
| 2004/0039464 A1 | 2/2004 | Virolainen et al. | |
| 2004/0057445 A1* | 3/2004 | LeBlanc | 370/412 |
| 2004/0120309 A1 | 6/2004 | Kurittu et al. | |
| 2004/0141528 A1 | 7/2004 | LeBlanc et al. | |
| 2004/0156397 A1 | 8/2004 | Heikkinen et al. | |
| 2004/0179474 A1 | 9/2004 | Usuda et al. | |
| 2004/0204935 A1 | 10/2004 | Anandakumar et al. | |
| 2005/0007952 A1* | 1/2005 | Scott | 370/229 |
| 2005/0036459 A1 | 2/2005 | Kezys et al. | |
| 2005/0058145 A1* | 3/2005 | Florencio et al. | 370/412 |
| 2005/0089003 A1 | 4/2005 | Proctor et al. | |
| 2005/0180405 A1 | 8/2005 | Bastin | |
| 2005/0228648 A1 | 10/2005 | Heikkinen et al. | |
| 2005/0243846 A1 | 11/2005 | Mallila | |
| 2006/0077994 A1 | 4/2006 | Spindola et al. | |
| 2006/0171419 A1 | 8/2006 | Spindola et al. | |
| 2006/0184861 A1 | 8/2006 | Sun et al. | |
| 2006/0187970 A1* | 8/2006 | Lee et al. | 370/516 |
| 2006/0206318 A1 | 9/2006 | Kapoor et al. | |
| 2006/0277042 A1 | 12/2006 | Vos et al. | |
| 2007/0206645 A1 | 9/2007 | Sundqvist et al. | |
| 2011/0222423 A1 | 9/2011 | Spindola et al. | |

FOREIGN PATENT DOCUMENTS

| | | |
|---|---|---|
| EP | 0707398 | 4/1996 |
| EP | 0731448 | 9/1996 |
| EP | 1088303 A1 | 4/2001 |
| EP | 1221694 | 7/2002 |
| EP | 1278353 | 1/2003 |
| EP | 1536582 | 6/2005 |
| JP | 56-43800 | 10/1981 |
| JP | 57158247 A | 9/1982 |
| JP | 57158247 U | 10/1982 |
| JP | 57159038 A | 10/1982 |
| JP | 61-156949 | 7/1986 |
| JP | 64029141 | 1/1989 |
| JP | 02081538 | 3/1990 |
| JP | 2502776 | 8/1990 |
| JP | 04-113744 | 4/1992 |
| JP | 04150241 | 5/1992 |
| JP | 8130544 A | 5/1996 |
| JP | 08256131 | 10/1996 |
| JP | 9127995 A | 5/1997 |
| JP | 09261613 | 10/1997 |
| JP | 10-190735 | 7/1998 |
| JP | 10313315 A | 11/1998 |
| JP | 2000124947 A | 4/2000 |
| JP | 2000307654 A | 11/2000 |
| JP | 2001045067 | 2/2001 |
| JP | 2001134300 A | 5/2001 |
| JP | 2002164921 A | 6/2002 |
| JP | 2003532149 | 10/2003 |
| JP | 2004153618 | 5/2004 |
| JP | 2004-266724 | 9/2004 |
| JP | 2004-282692 | 10/2004 |
| JP | 2004-285692 | 10/2004 |
| JP | 2005-057504 | 3/2005 |
| JP | 2005521907 T | 7/2005 |
| JP | 2006-050488 | 2/2006 |
| KR | 20040050813 | 6/2004 |
| RU | 2073913 | 2/1997 |
| RU | 2118058 | 8/1998 |
| TW | 504937 B | 10/2002 |
| TW | 515168 B | 12/2002 |
| WO | 8807297 | 9/1988 |
| WO | 9222891 | 12/1992 |
| WO | 9522819 | 8/1995 |
| WO | 9710586 | 3/1997 |
| WO | WO 00/24144 | 4/2000 |
| WO | 0033503 | 6/2000 |
| WO | 0042749 | 7/2000 |
| WO | WO0055829 | 9/2000 |
| WO | WO0063885 A1 | 10/2000 |
| WO | WO0176162 A1 | 10/2001 |
| WO | 0182289 | 11/2001 |
| WO | WO0182293 | 11/2001 |
| WO | WO03083834 A1 | 10/2003 |
| WO | WO03090209 A1 | 10/2003 |
| WO | 2006099534 | 9/2006 |

OTHER PUBLICATIONS

E. Moulines, et al., "*Time-Domain and Frequency—Domain Techniques for Prosodic Modification of Speech*", 1995 Elsevier Science B.V., (Chapter 15), pp. 519-555.

Goldenstein et al., "Time Warping of Audio Signals," Computer Graphics International-Proceedings, Jun. 1999, pp. 1-7.

Liang et al., "Adaptive playout scheduling using time-scale modification in packet voice communications," 2001 IEEE International Conference on Acoustics, Speech, and Signal Processing (ICASSP '01), vol. 3, May 2001, pp. 1445-1448 with Attachment (14 pgs.).

Verhelst et al., "An overlap-add technique based on waveform similarity (WSOLA) for high quality time-scale modificaton of speech," IEEE International Conference on Acoustics, Speech, and Signal Processing, vol. 2, Apr. 1993, pp. 554-557.

Benaissa et al., "An algorithm for delay adjustment for interactive audio appliacations in mobile ad hoc networks," Proceedings of the Seventh International Symposium on Computers and Communications, Jul. 2002, pp. 524-529.

Choudhury, et al., "Design and Analysis of Optimal Adaptive Dejitter Buffers," Computer Communications, Elsevier Science Publishers BV, vol. 27, No. 6, Apr. 2004, pp. 529-537.

International Search Report- PCT/US2005/030894, International Search Authority- European Patent Office- Apr. 13, 2006.

International Preliminary Report on Patentability- PCT/US2005/030894, International Search Authority- The International Bureau of WIPO- Geneva, Sitzerland- Feb. 28, 2007.

Written Opinion- PCT/US2005/030894, International Search Authority- European Patent Office- Apr. 13, 2006.

"Enhanced Variable Rate Codec, Speech Service Option 3 for Wideband Spread Spectrum Digital Systems," 3GPP2 C.S0014-A (Apr. 2004).

Boku et al., "Structures and Network Performance of the Ultra-fast Optical Packet Switching Ring Network", Technical Report of IEICE, Japan, The Institute of Electronics, Information and Communication Engineers, Jul. 26, 2002, vol. 102, No. 257, CS2002-56.

Bellavista, Paolo; Corradi, Antonio; Giannelli, Carlo: "Adaptive Buffering-based on Handoff Prediction for Wireless Internet Continuous Services", [Online] 23.

Sep. 2005 (Sep. 23, 2005), pp. 1-12, XP002609715, Retrieved from the Internet : URL: http://citeseerx. ist .psu.edu/viewdoc/summary?doi=10.1.1.62.6005>.

Vatn, Jon-Olov: "Thesis proposal: Supporting real-time services to mobile Internet hosts". [Online] Jun. 5, 2002, pp. 1-21, XP002609716, Retrieved from the Internet: URL:http://web. it. kth. se/{maguire/vatn/res earch/thesis-proposal-updated. pdf> [retrieved on Nov. 15, 2010].

Sen S et al: "Proxy prefix caching for multimedia streams", Infocom '99. Eighteenth Annual Joint Conference of the IEEE Computer and Communications Societies. Proceedings. IEEE New York, NY, USA Mar. 21-25, 1999, Piscataway, NJ, USA,IEEE, US, vol. 3, Mar. 21, 1999, pp. 1310-1319, XP010323883, ISBN: 978-0-7803-5417-3.

Taiwan Search Report—TW094129711—TIPO—Mar. 16, 2012.

* cited by examiner

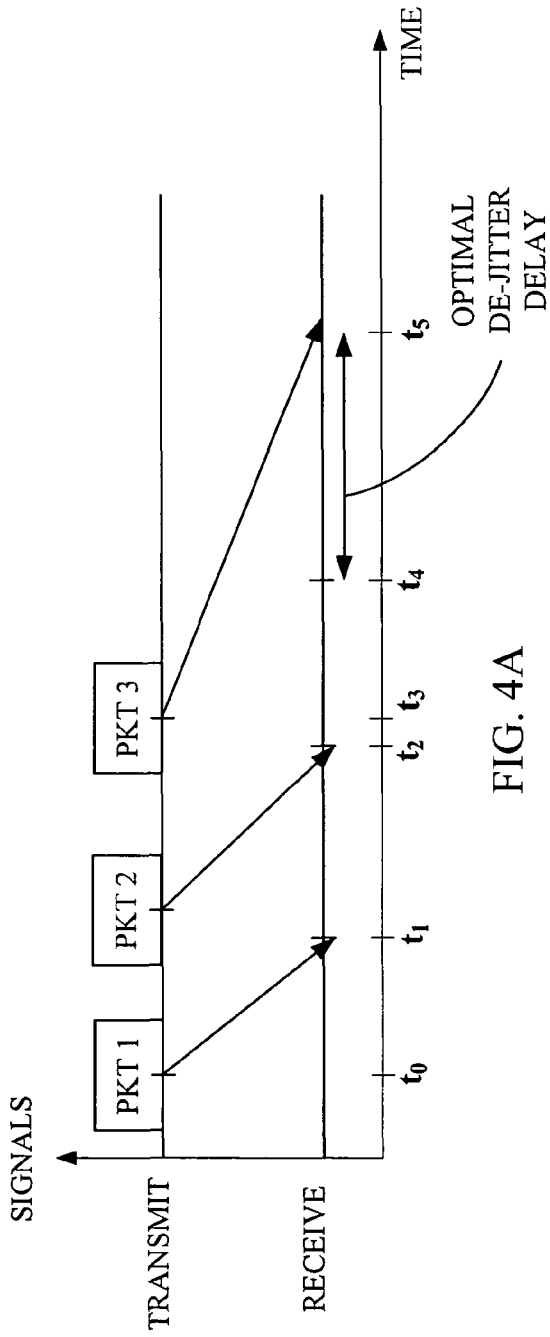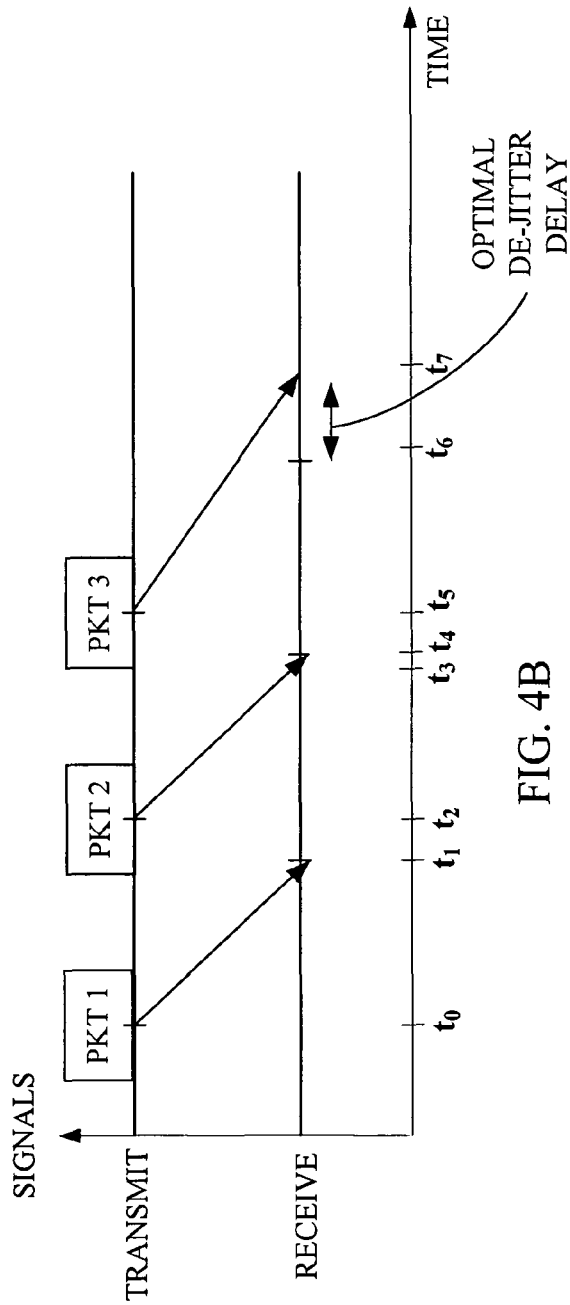

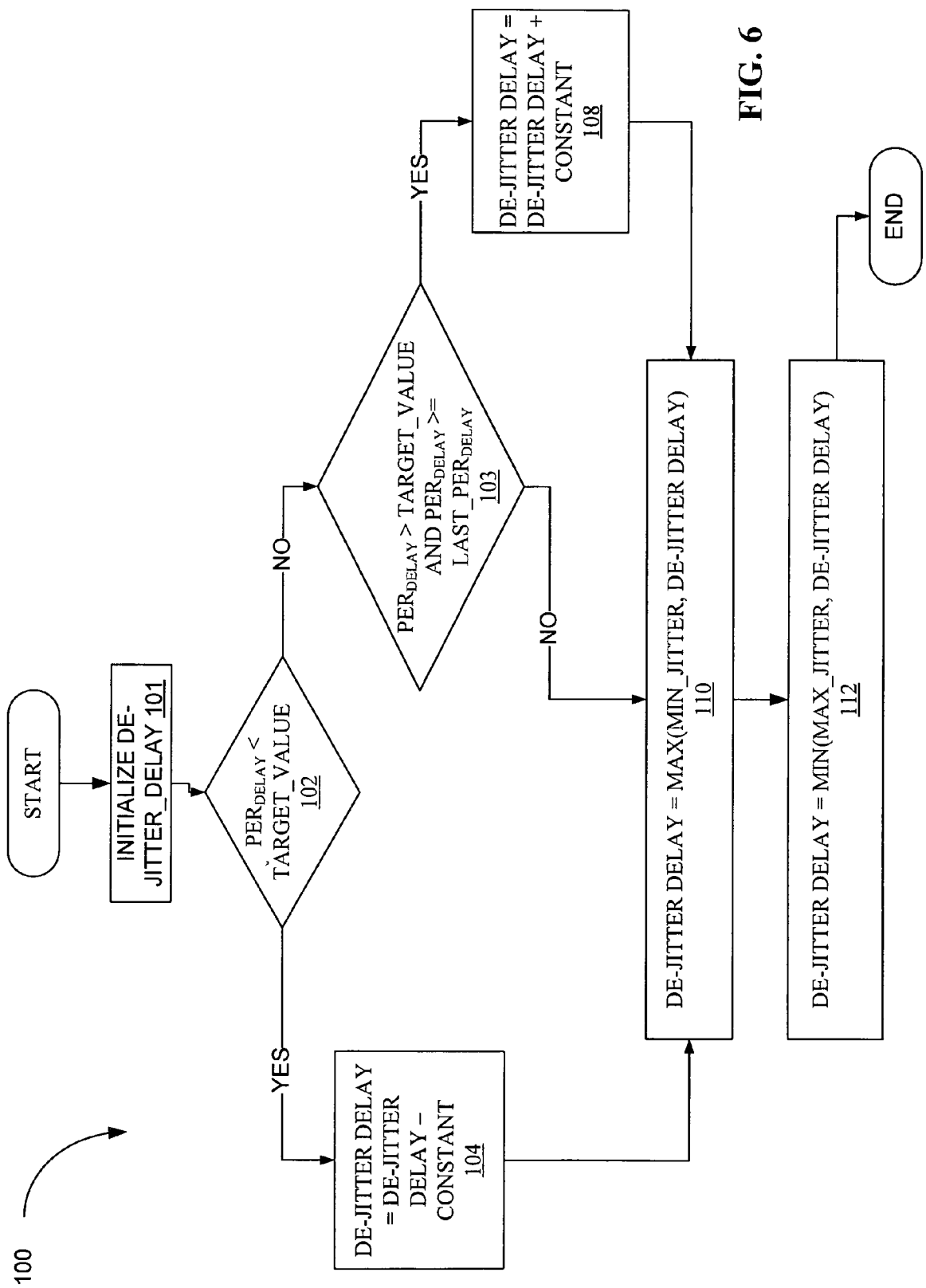

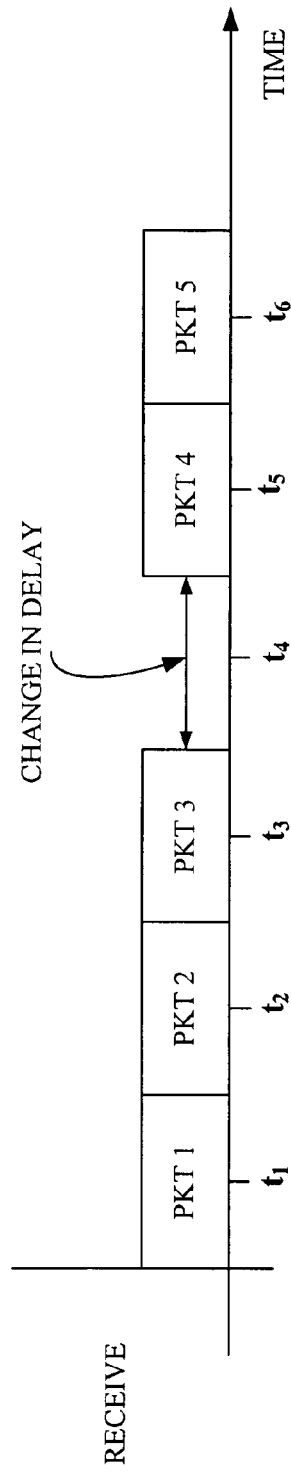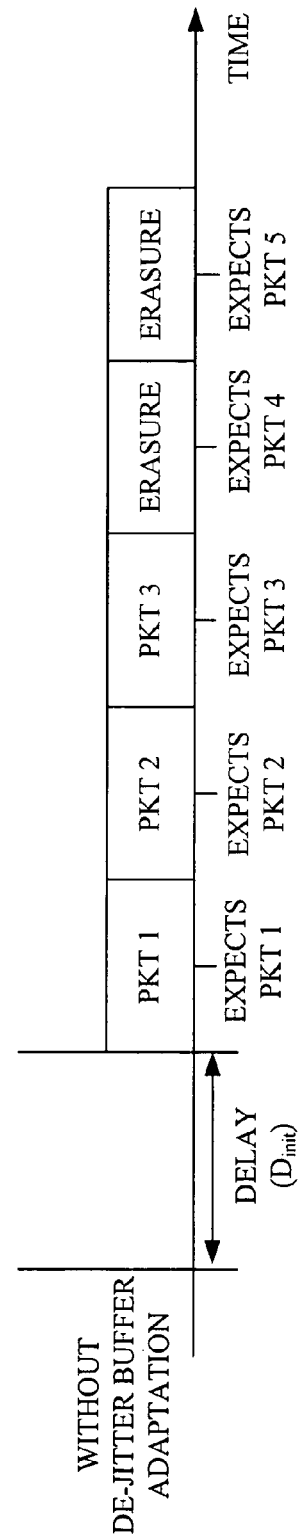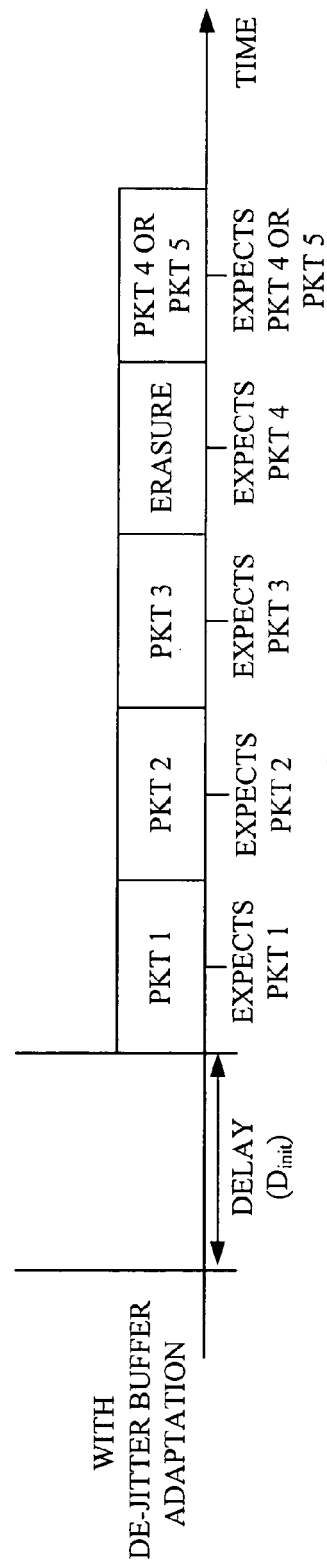

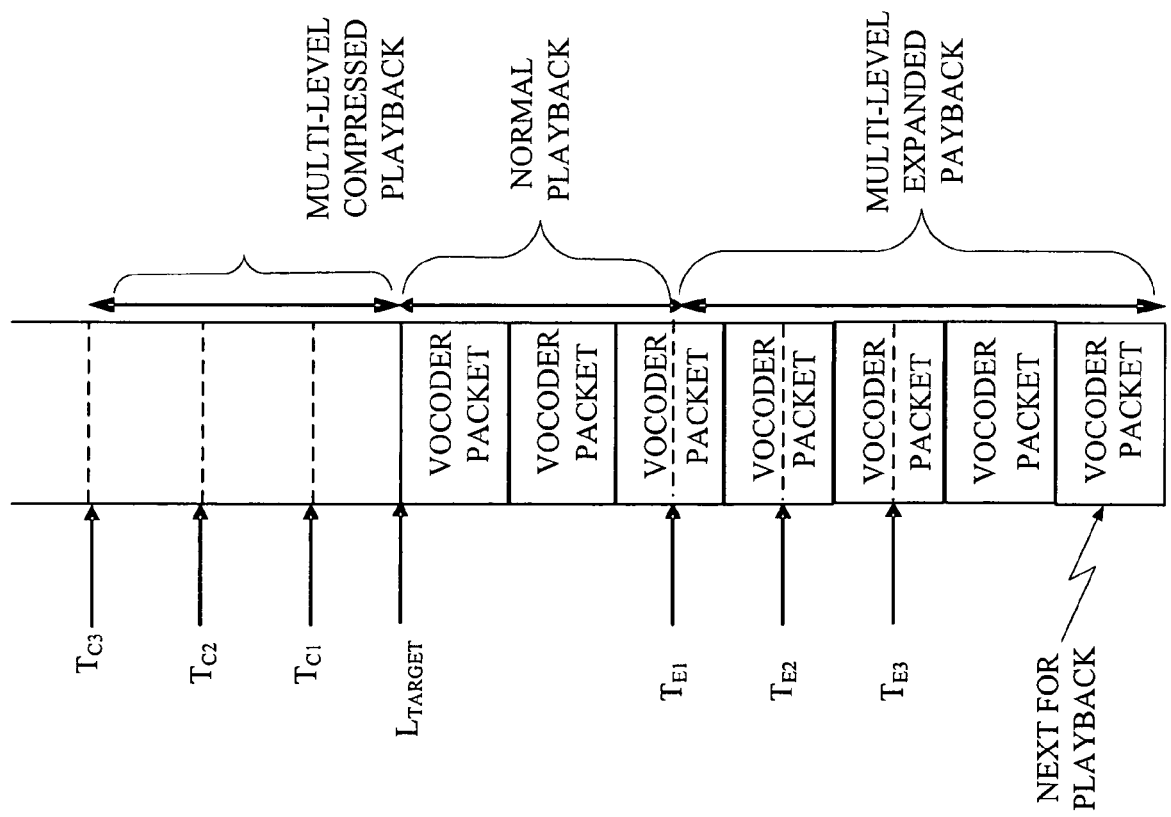

METHOD AND APPARATUS FOR FLEXIBLE PACKET SELECTION IN A WIRELESS COMMUNICATION SYSTEM

CLAIM OF PRIORITY UNDER 35 U.S.C. §119

The present Application for Patent claims priority to U.S. Provisional Application No. 60/606,036, entitled "Adaptive De-Jitter Buffer For Voice Over IP for Packet Switched Communications," filed Aug. 30, 2004, assigned to the assignee hereof.

REFERENCE TO CO-PENDING APPLICATIONS FOR PATENT

The present Application for Patent is related to the following co-pending U.S. Patent Applications:

U.S. patent application Ser. No. 10/964,319, entitled "Media (Voice) Playback (De-Jitter) Buffer Adjustments Based on Air Interface," filed Oct. 13, 2004, assigned to the assignee hereof;

U.S. patent application Ser. No. 11/192,231, entitled "Phase Matching in Vocoders," filed Jul. 7, 2005, assigned to the assignee hereof; and U.S. patent application Ser. No. 11/123,467, entitled "Time Warping Frames Inside The Vocoder by Modifying The Residual," filed May 5, 2005, assigned to the assignee hereof.

BACKGROUND

1. Field

The present invention relates to wireless communication systems, and specifically to an adaptive de-jitter buffer for Voice over Internet Protocol (VoIP) for packet switched communications. The invention applies to any system where packets may be lost.

2. Background

In a communication system, the end-to-end delay of a packet may be defined as the time from its generation at the source to when the packet reaches its destination. In a packet-switched communication system, the delay for packets to travel from source to destination may vary depending upon various operating conditions, including but not limited to, channel conditions and network loading. Channel conditions refer to the quality of the wireless link. Some factors determining the quality of the wireless link are signal strength, speed of a mobile and/or physical obstructions.

The end-to-end delay includes the delays introduced in the network and the various elements through which the packet passes. Many factors contribute to end-to-end delay. Variance in the end-to-end delay is referred to as jitter. Jitter may cause packets to be received after the packets are no longer useful. For example, in a low latency application, such as voice, if a packet is received too late, it may be dropped by the receiver. Such conditions lead to degradation in the quality of communication.

BRIEF DESCRIPTION OF THE DRAWINGS

FIGS. 4A and 4B are timing diagrams illustrating calculation of optimal de-jitter buffer lengths in two scenarios.

FIG. 6 is a flowchart illustrating the calculation of the target de-jitter buffer length.

FIG. 7A is a timing diagram illustrating transmission of packets in a first scenario.

FIG. 7B is a timing diagram illustrating receipt of packets without de-jitter buffer adaptation.

FIG. 7C is a timing diagram illustrating receipt of packets with de-jitter buffer adaptation, wherein the receiver may receive a packet subsequent to an expected time for the packet.

FIG. 13B illustrates one example of an adaptive de-jitter buffer, including multiple compression and expansion thresholds.

DETAILED DESCRIPTION

Figure 1:
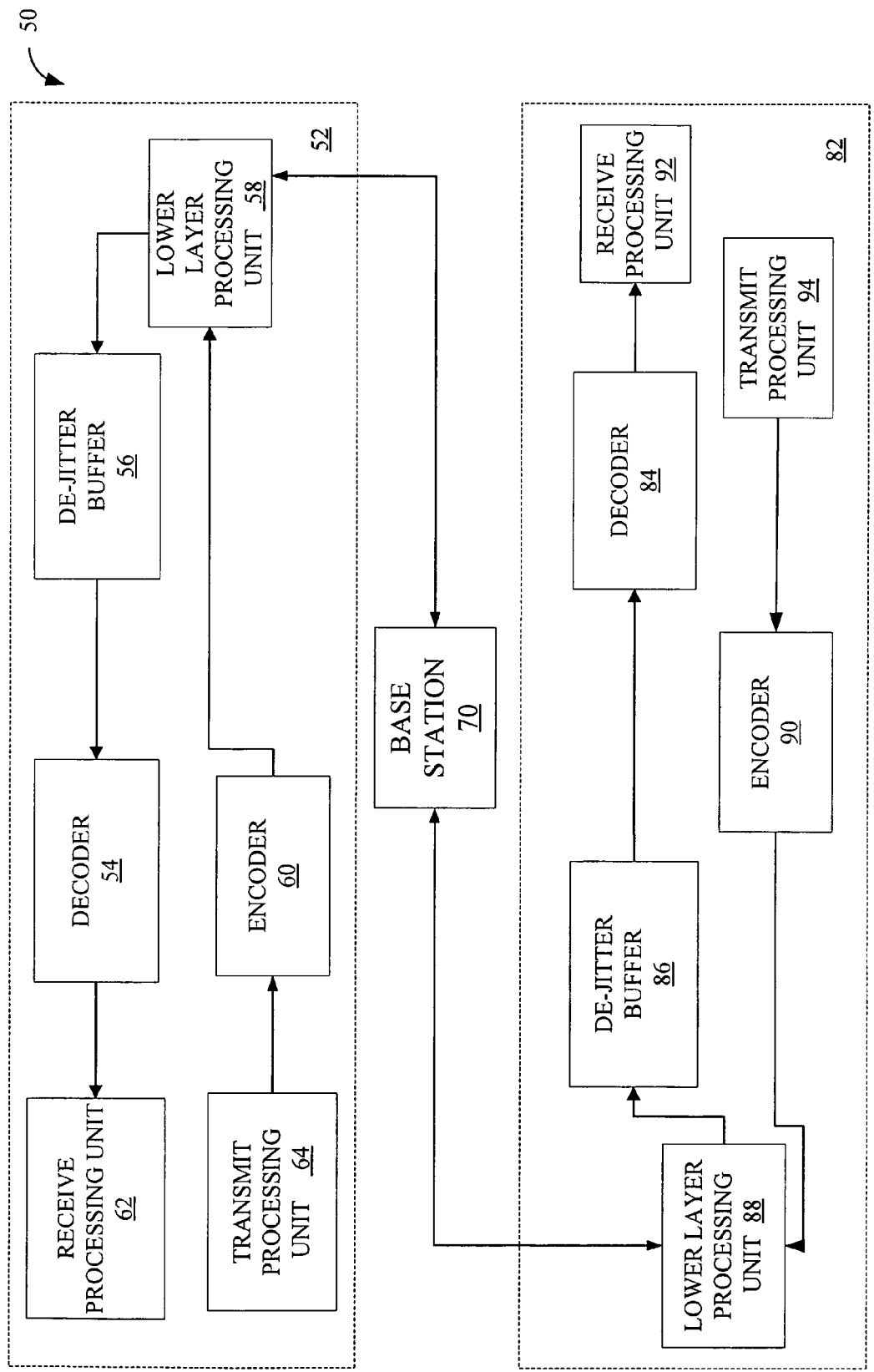
FIG. 1 is a block diagram of a prior art communication system, wherein an Access Terminal includes a de-jitter buffer.

In packet-switched systems, data is formed into packets and routed through a network. Each packet is sent to a destination in the network, based on an assigned address contained within the packet, typically in a header. The end-to-end delay of packets, or the time it takes a packet to travel within the network from a first user or "sender" to a second user or "receiver" varies, depending upon channel conditions, network load, Quality of Service (QoS) capabilities of the system, and other flows competing for resources among other things. Note, for clarity the following discussion describes a spread-spectrum communication systems supporting packet data communications including, but is not limited to Code Division-Multiple Access (CDMA) systems, Orthogonal Frequency Division Multiple Access (OFDMA), Wideband Code Division Multiple Access (W-CDMA), Global Systems for Mobile Communications (GSM) systems, systems supporting IEEE standards, such as 802.11 (A,B,G), 802.16, etc.

In a wireless communication system, each packet may incur a source to destination delay different from that experienced by other packets belonging to the same flow. This variation in delay is known as "jitter." Jitter creates additional complications for receiver-side applications. If the receiver does not correct for jitter, the received message will suffer distortion when the packets are re-assembled. Some systems correct for jitter when reconstructing messages from the received packets. Such systems incorporate a de-jitter buffer, which adds a wait time, referred to as a de-jitter buffer delay. When the de-jitter buffer applies a fixed, large de-jitter buffer delay, it may accommodate a high amount of jitter in arrival of packets; however, this use is not efficient since packets having a smaller delay are also processed using the large de-jitter buffer delay even though these packets could have been processed earlier. This leads to larger end-to-end delays for these packets than what may have been achieved using a smaller de-jitter buffer delay.

In order to prevent this, VoIP systems incorporating de-jitter buffers may try to adapt to changes in packet delay. For instance, a de-jitter buffer may detect changes in packet delay by analyzing packet arrival statistics. Many de-jitter buffer implementations do not adapt their delay at all and are configured to have a conservatively large delay. In this case, the de-jitter buffer may add excessive delay to packets causing a user's experience to be sub-optimal.

The following discussion describes an adaptive de-jitter buffer that adapts to changes in the packet delay behavior by changing its de-jitter buffer delay. This de-jitter buffer makes use of speech time warping to enhance its ability to track variable delay of packets. The following discussion is applicable to packetized communications, such as communications having periodic data transmission, low latency requirements, sequential processing of data, or a designate playback rate. In particular, the following discussion details a voice communication, wherein the data, or speech and silence, originate at a source and are transmitted to a destination for playback. The original data is packetized and encoded using a known encoding scheme. At the receiver, the encoding scheme is determined for each packet of data. In a speech communication, for example, the type of encoding of speech is different from the type of encoding of silence. This allows the communication system to take advantage of the periodic nature of speech, which includes silence portions. For a speech communication, the data appears bursty, and the speech content may appear repetitive. The packetized speech transmission has low latency requirements, as participants to a voice communication do not want to hear delays, but the quality of the communication allows for only limited delays. The packetized speech may take different paths to arrive at the receiver, however, on receipt the packets are recompiled in their original sequence. Therefore, the received packetized speech is played back sequentially. If a packet is lost in over the air transmission or in physical layer processing, the packet is not recovered, but the receiver may estimate or guess what the content of the packet was. Additionally, the playback rate of speech communications has a predetermined playback rate or range. If the playback is outside of the range, the quality at the receiver is degraded. The application to speech communications is an example of application of the present discussion. Other applications may include video communications, gaming communications, or other communications having characteristics, specifications and/or requirements similar to those of speech communications. For example, video communications may desire to speed up or slow down playback. The present discussion may be desirable for such use. As provided herein, an adaptive de-jitter buffer may allow a receiver to achieve a quality of service specified by the jitter requirements of the system. The adaptive de-jitter buffer adapts a target de-jitter buffer length, e.g., the amount of data stored in the de-jitter buffer, to the timing and amount of data received at the adaptive de-jitter buffer. Further, an adaptive de-jitter buffer uses the status or size of the de-jitter buffer, e.g., measure of data stored in the adaptive de-jitter buffer, to determine when time warping is beneficial for processing and playback of the received data. For example, if data is arriving at the adaptive de-jitter buffer at a slow rate, the adaptive de-jitter buffer provides this information to a time warping unit, allowing the time warping unit to expand the received packets. If the data stored in the adaptive de-jitter buffer exceeds a threshold value, the adaptive de-jitter buffer alerts the time warping unit to compress the packets so as to effectively keep up with the incoming data. Note, time warping is within limits, which may be defined by the application and type of communication. For example, in speech communications, the time warping should not compress speech, i.e., increase the pitch, so that the listener is not able to understand the communication. Similarly, the time warping should not expand speech beyond the range. Ideally, the time warping range is defined to allow the listener little to no discomfort.

Communication System

FIG. 1 is a block diagram illustrating a digital communication system 50. Two Access Terminals (ATs) 52 and 82 communicate via Base Station (BS) 70. Within AT 52, transmit processing unit 64 transmits voice data to an encoder 60, which encodes and packetizes the voice data and sends the packetized data to lower layer processing unit 58. For transmission, data is then sent to BS 70. BS 70 processes the received data and transmits the data to AT 82, wherein the data is received at lower layer processing unit 88. The data is then provided to de-jitter buffer 86, which stores the data so as to conceal or reduce the impact of jitter. The data is sent from the de-jitter buffer 86 to decoder 84, and on to receive processing unit 92.

For transmission from AT 82, data/voice is provided from transmit processing unit 94 to encoder 90. Lower layer processing unit 88 processes the data for transmission to BS 70. For receipt of data from BS 70 at AT 52, data is received at lower layer processing unit 58. Packets of data are then sent to a de-jitter buffer 56, where they are stored until a required buffer length or delay is reached. Once this length or delay is attained, the de-jitter buffer 56 begins to send data to a decoder 54. The decoder 54 converts the packetized data to voice data packets and sends the packets to receive processing unit 62. In the present example, the behavior of AT 52 is analogous to AT 82.

De-Jitter Buffer

A storage or de-jitter buffer is used in ATs, such as the ones described above, to conceal the effects of jitter. In one example, an adaptive de-jitter buffer is used for packet switched communications, such as VoIP communication. The de-jitter buffer has an adaptive buffer memory and uses speech time warping to enhance its ability to track variable delay and jitter. In this example, the processing of the de-jitter buffer is coordinated with that of the decoder, wherein the de-jitter buffer identifies an opportunity or need to time warp the packets and instructs the decoder to time warp the packets. The decoder time warps the packets by compressing or expanding the packets, as instructed by the de-jitter buffer.

Figure 2:
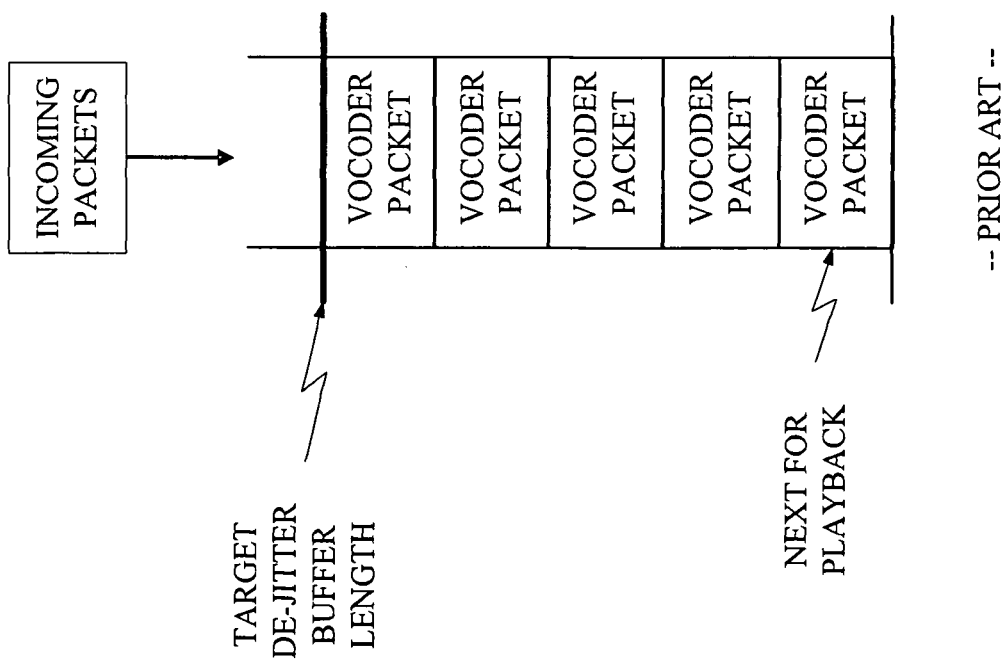
FIG. 2 illustrates a prior art de-jitter buffer.

FIG. 2 illustrates one example of a de-jitter buffer. Incoming encoded packets are accumulated and stored in the buffer. In one example, the buffer is a First In, First Out (FIFO) buffer, wherein data is received in a particular order and processed in that same order; the first data processed is the first data received. In another example, the de-jitter buffer is an ordered list that keeps track of which packet is the next to process. The adaptive de-jitter buffer may be a memory storage unit, wherein the status of the de-jitter buffer is a measure of the data (or the number of packets) stored in the adaptive de-jitter buffer. The data processed by the de-jitter buffer may be sent to a decoder or other utility from the de-jitter buffer. The encoded packets may correspond to a fixed amount of speech data, e.g., 20 msec corresponding to 160 samples of speech data, at 8 Khz sampling rate. In one example of the present invention, the number of samples produced by the decoder, with time warping capabilities, may vary based on whether the packet is time warped or not. When the de-jitter buffer instructs the decoder/time warping to expand a packet, the decoder/time warper may produce more than 160 samples. On the other hand, when the de-jitter buffer instructs the decoder/timewarping to compress a packet, the decoder/time warping may produce less than 160 samples. Note, alternate systems may have different playback schemes, such as other than 20 ms vocoding.

Packets arriving at the de-jitter buffer may not arrive at regular intervals. One of the design goals of a de-jitter buffer therefore, is to adjust for the irregularity of incoming data. In one example of this invention, a de-jitter buffer has a target de-jitter buffer length. The target de-jitter buffer length refers to the required amount of data to be accumulated in the de-jitter buffer before starting to playback the first packet. In another example, the target de-jitter buffer length may refer to the amount of time the first packet in the de-jitter buffer needs to be delayed before being played back. The target de-jitter buffer length is illustrated in FIG. 2. By accumulating enough packets in the de-jitter buffer before starting playback of packets, the de-jitter buffer is able to playback subsequent packets at regular intervals while minimizing the potential of running out of packets. FIG. 2 illustrates a de-jitter buffer, wherein the vocoder packet first received into the de-jitter buffer is the next packet scheduled for output from the de-jitter buffer. The de-jitter buffer includes sufficient packets to achieve the required de-jitter buffer delay. This way, the de-jitter buffer smooths the jitter experienced by packets and conceals the variation in packet arrival time at the receiver.

Figure 3:
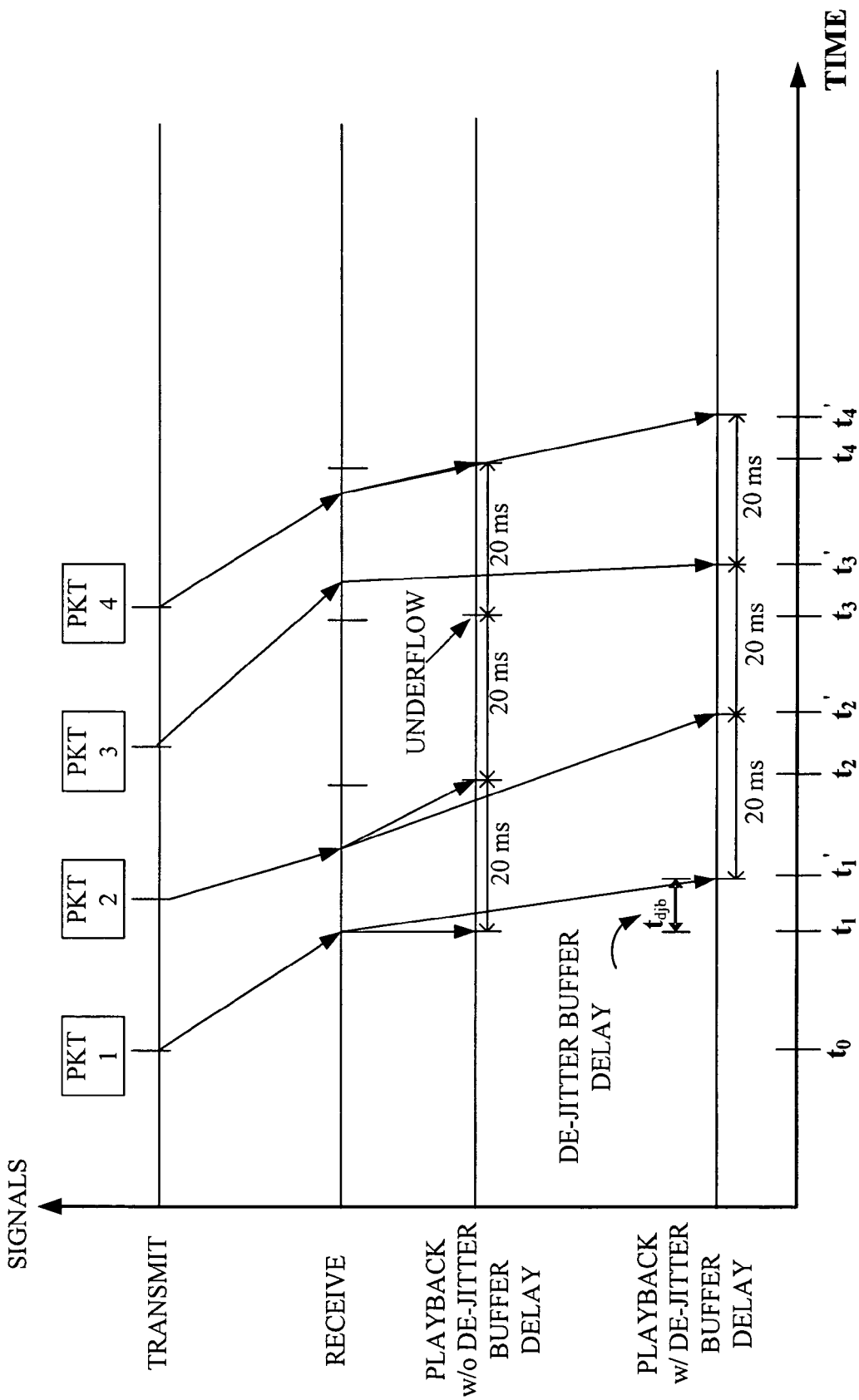
FIG. 3 is a timing diagram illustrating transmission, receipt, and playback for packets resulting in an "underflow."

FIG. 3 illustrates transmission, receipt, and playback timelines for packets in various scenarios. The first packet, PKT 1, is transmitted at time $t_0$ and is played back upon receipt at time $t_1$. Subsequent packets, PKT 2, PKT 3, and PKT 4, are transmitted at 20 ms intervals after PKT 1. In the absence of time warping, decoders playback packets at regular time intervals (e.g. 20 ms), from the first packet's playback time. For instance, if a decoder plays back packets at regular 20 ms intervals, a first received packet is played back at time $t_1$, and subsequent packets will be played back 20 ms after time $t_1$, 40 ms after time $t_1$, 60 ms after time $t_1$, etc. As illustrated in FIG. 3, the anticipated playback time (without de-jitter buffer delay) of PKT 2 is $t_2=t_1+20$ ms. PKT 2 is received before its anticipated playback time, $t_2$. Packet 3, on the other hand, is received after its anticipated playback time $t_3=t_2+20$ ms. This condition is referred to as an underflow. An underflow occurs when the playback utility is ready to play a packet, but the packet is not present in the de-jitter buffer. Underflows typically cause the decoder to produce erasures and degrade playback quality.

FIG. 3 further illustrates a second scenario, in which the de-jitter buffer introduces a delay, $t_{djb}$ before the playback of the first packet. In this scenario, the de-jitter buffer delay is added to enable the playback utility to receive packets (or samples) every 20 ms. In this scenario, even though PKT 3 is received after its anticipated playback time, $t_3$, the addition of the de-jitter buffer delay allows PKT 3 to be played 20 ms after playback of PKT 2.

PKT 1 is sent at time $t_0$, received at time $t_1$ and instead of being played back at time $t_1$, as was done previously, is now played back at time $t_1+t_{djb}=t_1'$. The playback utility plays PKT 2 at a predetermined interval, e.g. 20 ms, after PKT 1 or at time $t_2'=t_1+t_{djb}+20=t_2+t_{djb}$ and PKT 3 at time $t_3'=t_3+t_{djb}$. The delaying of the playback by $t_{djb}$ allows the third packet to be played out without an underflow being caused. Thus, as illustrated in FIG. 3, introduction of the de-jitter buffer delay may reduce underflows and prevent speech quality from being degraded.

Speech consists of periods of talkspurts and silence periods. The expansion/compression of silence periods has minimal or no impact on speech quality. This allows the de-jitter buffer to delay the playback of the first packet differently for each talkspurt.

FIGS. 4A and 4B illustrate transmission and receipt timelines for different talkspurts. Note, the amount of de-jitter buffer delay is determined to prevent underflows. This is referred to as "optimal de-jitter buffer delay." The optimal de-jitter buffer delay is related to the target de-jitter buffer length. In other words, the target de-jitter buffer length is determined to allow enough data to be stored in the buffer so packets are played back consistent with playback utility specifics. The optimal de-jitter buffer delay may be determined by the greatest end-to-end delay experienced by the system. Alternately, the optimal de-jitter buffer delay may be based on an average delay experienced by the system. Other methods for determining the optimal de-jitter buffer delay may also be implemented specific to a given criteria or system design. Further, the target de-jitter buffer length is determined so as to effect the optimal de-jitter buffer delay, and therefore, the target de-jitter buffer length may be calculated based on received packet rates, Packet Error Rate (PER) or other operating statistics.

FIGS. 4A and 4B illustrate optimal de-jitter buffer delays for two examples. As illustrated, the time between transmission and receipt of sequential packets varies over time. As PKT 3 has the longest delay from transmission to receipt, this difference is used to determine an optimal delay for de-jitter processing.

Use of a de-jitter buffer with a target de-jitter buffer length may avoid at least some underflow conditions. Referring again to FIG. 3 the second scenario obviated an underflow (occurring when the decoder expected a packet and the playback utility was ready to play a packet, but no packets were present in the packet storage buffer). Here, PKT 2 is played back after a predetermined interval, 20 ms, subsequent to $t_1$, wherein $t_1$ is the playback time of PKT 1. While PKT 3 is scheduled or anticipated for playback at time $t_3$, PKT 3 is not received until after time $t_3$. In other words, the playback utility is ready to playback PKT 3 but this packet is not present in the storage buffer. Since PKT 3 is not available for playback at the anticipated time, and is not played back, there results a large amount of jitter and an underflow with respect to PKT 3. PKT 4 is played back at $t_4$, the anticipated playback time for PKT 4. Note the anticipated time $t_4$ is calculated from the time $t_3$. Since each packet may contain more than one voice packet, the loss of packets due to underflows degrades voice quality.

Figure 5:
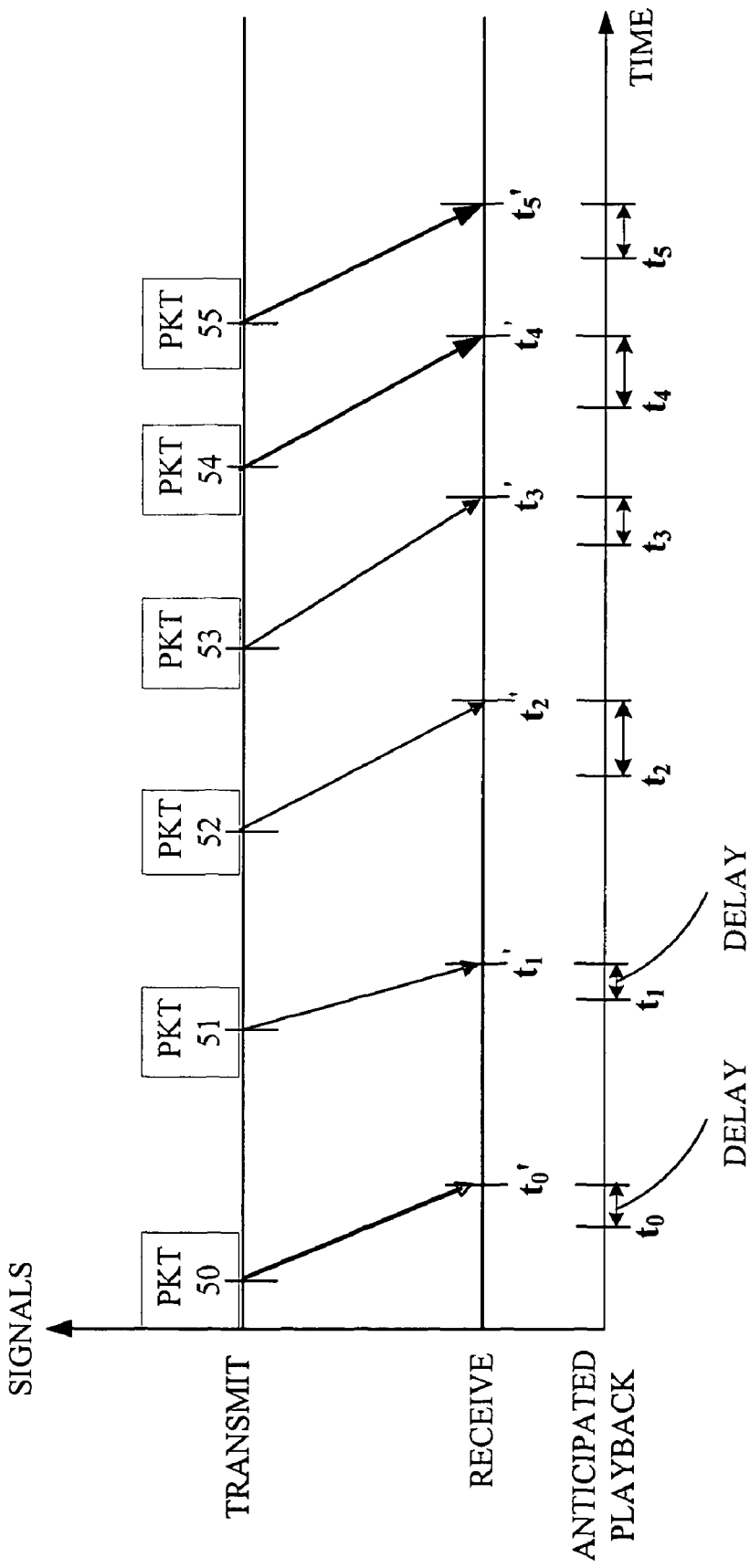
FIG. 5 is a timing diagram illustrating a run of "underflows" resulting from delayed packets.

Another scenario for consideration involves a run of "underflows due to delayed packets" as illustrated in FIG. 5, wherein transmission, receipt and anticipated playback time of packets are illustrated in time. In this scenario, each packet is received a short time after its anticipated playback time. For example, anticipated playback time for PKT 50 is to but PKT 50 is not received until time $t_0'$ after $t_0$. The next packet, 51 is anticipated at time $t_1$ but is not received until time $t_1'$, after $t_1$. This causes a run of underflows leading to a high percentage of "delayed underflows," underflows due to a delayed packet, and thus, higher end-to-end delays.

Clearly, a de-jitter buffer which delays playback by a large amount will be successful in keeping underflows to a minimum. Such a de-jitter buffer, however, introduces a large de-jitter buffer delay into the end-to-end delay of packets. A large end-to-end delay may lead to difficulty in maintaining the flow of a conversation. Delays greater than 100 ms may cause the listening party to think that the speaking party has not finished talking. Good quality, therefore, ideally considers both avoidance of underflows and reduction of end-to-end delay. A problem exists as resolution of one problem may worsen the other. In other words, smaller end-to-end delays generally result in more underflows, and vice versa. There is therefore, a need to balance these competing goals. Specifically, there is a need for the de-jitter buffer to track and avoid underflows while reducing end-to-end delay.

De-Jitter Buffer Target Length

A design goal of an adaptive de-jitter buffer is to allow the system to target a particular "underflow rate" of voice packets, while at the same time achieving low end-to-end delays. As perceived quality is a function of the percentage of underflows, the ability to target a particular percentage of underflows enables the control of voice quality. Packet underflows at the de-jitter buffer may occur when there are missing packets. A packet may be missing when it is lost or delayed. A lost packet causes an underflow when dropped before it reaches the receiver, such as when it is dropped somewhere in the access network, for example on the physical layer or the forward link scheduler. In this scenario, the underflow cannot be corrected by using a de-jitter buffer delay because the packet never arrives at the de-jitter buffer. Alternatively, an underflow may occur as a result of a packet that is delayed, and arrives after its playback time. In addition to tracking underflows due to delayed packets, the adaptive de-jitter buffer may also track underflows due to lost packets.

The number of underflows due to a delayed packet may be controlled by trading off underflows for de-jitter buffer delay. A value representing the target percentage of underflows due to delayed packets is referred to as "underflow target." This value is the target value for operation of the de-jitter buffer and is selected so as to keep end-to-end delay within reasonable limits. In one instance, a value of 1% (0.01) may be used as the "underflow target." Another example uses a value of 0.5% (0.005). In order to achieve an "underflow target," the de-jitter buffer delay may be adapted.

In one example of the present invention, the filtered value of percentage of underflows due to delayed packets (henceforth referred to as "delayed underflows") may be used to adapt the de-jitter buffer delay. At the end of each silence period (or beginning of each talkspurt), the de-jitter buffer delay is updated as illustrated in FIG. 6. As illustrated in FIG. 6, the algorithm specifies the following:

1) If ($PER_{delay}$<$TARGET\_VALUE$) then $DEJITTER\_DELAY=DEJITTER\_DELAY-CONSTANT$;

2) If ($PER_{delay}$>$TARGET$ && $PER_{delay}$>=$last\_PER_{delay}$) then $DEJITTER\_DELAY=DEJITTER\_DELAY+CONSTANT$;

3) Set $DEJITTER\_DELAY$=MAX (MIN_*JITTER*, $DEJITTER\_DELAY$);

AND

4) $DEJITTER\_DELAY$=MIN (MAX_*JITTER*, $DEJITTER\_DELAY$).  (1)

In the present example, the initial de-jitter buffer delay may be set to a constant value such as 40 ms. The TARGET_VALUE is a targeted value of "delayed underflows" (e.g., 1%). $PER_{delay}$ is a filtered value of the "delayed underflow" rate of packets where the parameters of the filter allow the TARGET_VALUE to be achieved. The last_$PER_{delay}$ is the value of $PER_{delay}$ at the previous updating of the de-jitter buffer delay. DEJITTER_DELAY is the target de-jitter buffer length as defined hereinabove. In the present example, CONSTANT is equal to 20 ms. MIN_JITTER and MAX_JITTER are the minimum and maximum values of the de-jitter buffer delay; according to one example these are set at 20 ms and 80 ms, respectively. MIN_JITTER and MAX_JITTER may be estimated based on system simulation. The values (MIN_JITTER, MAX_JITTER, CONSTANT) may be optimized depending on the communications system in which the de-jitter buffer is deployed.

$PER_{delay}$ may be updated at the end of each silence period or at the beginning of each talkspurt, wherein $PER_{delay}$ is calculated as:

$$PER_{delay} = PER\_CONSTANT \times PER_{delay} + (1 - PER\_CONSTANT) \times Current\_PER_{delay} \quad (2)$$

PER_CONSTANT is the time constant for the filter used to estimate $PER_{delay}$. The value for this constant determines the memory of the filter and allows the TARGET_VALUE to be achieved. $Current\_PER_{delay}$ is the rate of "delayed underflows" observed between the last update of $PER_{delay}$ and the current update.

$Current\_PER_{delay}$ is defined as the ratio of the number of delayed underflow packets to the total number of packets received between the last update of $PER_{delay}$ and the current update.

$$Current\_PER_{delay} = \frac{\text{Number of Delayed Underflows Since Last Update}}{\text{Number of Packets Received Since Last Update}} \quad (3)$$

Referring to FIG. 6, the process 100 for calculating and updating the de-jitter buffer delay begins at step 101 by initializing the DEJITTER_DELAY. By comparing the PERdelay is compared to the TARGET_VALUE at step 102. If the PERdelay is less than the TARGET_VALUE, the CONSTANT value is subtracted from the DEJITTER_DELAY at step 104. If the PERdelay is larger than the TARGET_VALUE at step 102, and PERdelay is greater than TARGET_VALUE and greater than or equal to LAST_PERDELAY at step 103, is not less than last PERdelay at step 102, then processing continues to decision 108. The DEJITTER_DELAY is set to the DEJITTER_DELAY plus the CONSTANT value at step 108. Continuing from step 103, if PERdelay is not greater than TARGET_VALUE and not greater than or equal to LAST_PERDELAY, processing continues to step 110. Also, continuing from step 104, the DEJITTER_DELAY is set equal to the maximum of MIN_JITTER and DEJITTER_DELAY at step 110. From step 110, processing continues to step 112 to set the DEJITTER_DELAY equal to the minimum of MAX_JITTER and DEJITTER_DELAY at step 112.

Tracking Delay

The de-jitter buffer may enter a mode where it tracks delay (instead of tracking the underflow rate.) The tracked delay may be the end-to-end delay or the de-jitter buffer delay. In one instance, the de-jitter buffer enters a "track delay" mode when the target underflow rate may be easily met. This means the de-jitter buffer is able to achieve a lower underflow rate than the target underflow rate for some period of time. This period of time may be anywhere from a few hundred ms to a few sec.

In this mode the de-jitter buffer has a target delay value. This is similar to the underflow target value described above. Equation (1) above may be used for targeting an underflow rate may be used in an analogous manner to calculate a Target Delay value. When the de-jitter buffer enters this mode where it targets a Target Delay value, this may allow it to reduce its Target underflow rate as long as the Target Delay is being maintained.

Implicit Buffer Adaptation

In some situations, the decoder may expect to play a packet, which has not yet been received. This situation is shown in FIG. 5, where the anticipated playback time of PKT 50 is $t_0$ but PKT 50 is received after this time. Similarly, PKT 51 is received after its anticipated playback time $t_1$, PKT 52 is received after its anticipated playback time $t_2$ and so on. It should be noted here that packets arrive fairly regularly, but because PKT 50 was received slightly after its anticipated playback time, it caused all subsequent packets also to miss their playback times. If, on the other hand, the decoder could insert an erasure at $t_0$ and still playback PKT 50 at $t_1$, it would allow all packets to meet their playback times. By playing PKT 50 after an erasure in lieu of PKT 50 has been played, the de-jitter buffer length is effectively adapted.

Note playback of PKT 50 after its erasure may cause discontinuities, which may be removed by using a phase matching technique described in co-pending application Ser. No. 11/192,231, entitled "PHASE MATCHING IN VOCODERS," filed Jul. 7, 2005.

As illustrated in FIG. 7A, there may be gaps in receipt of packets such as the time gap between PKT 3 and PKT 4. The delay in packet arrival may be different for each packet. The de-jitter buffer may respond immediately with adjustments to compensate for the delay. As illustrated, PKT 1, PKT 2 and PKT 3 are received at times $t_1$, $t_2$, and $t_3$, respectively. At time $t_4$, it is anticipated that PKT 4 will be received, but PKT 4 has not yet arrived. It is assumed in FIG. 7A that packets are expected to be received every 20 ms. In the present illustration, PKT 2 is received 20 ms after PKT 1 and PKT 3 is received 40 ms after PKT 1. PKT 4 is expected to be received 60 ms after PKT 1 but does not arrive until 80 ms after PKT 1.

In FIG. 7B, an initial delay is introduced at the de-jitter buffer prior to playback of the first packet received, PKT 1. Here, the initial delay is $D_{init}$. In this case, PKT 1 will be played back by the buffer at time $D_{init}$, PKT 2 at time $D_{init}+20$ ms, PKT 3 at $D_{init}+40$ ms, etc. In FIG. 7B, when PKT 4 fails to arrive at the expected time, $D_{init}+60$ ms, an erasure may be played back by the de-jitter buffer. At the next time $t_0$ playback a packet, the de-jitter buffer will seek to play PKT 4. If PKT 4 still has not arrived, another erasure may be sent at time $D_{init}+80$ ms. Erasures will continue to be played back until PKT 4 arrives at the de-jitter buffer. Once PKT 4 arrives at the de-jitter buffer, PKT 4 is then played back. Such processing results in delay, as no other packets are played back until PKT 4 is received. When the system is not able to recover, i.e., never receives PKT 4, the system may apply a reset of the process, allowing playback of packets subsequent to PKT 4 without playback of PKT 4. In the scenario described above, end-to-end delay of the de-jitter buffer has the potential of increasing as erasures may continue to be sent for a long period of time before PKT 4 arrives.

In contrast, according to an example illustrated in FIG. 7C, if a packet fails to arrive or if receipt of the packet is delayed, an erasure is played back at the expected playback time of PKT 4. This is similar to the scenario described with respect to FIG. 7B above, wherein the system waited for PKT 4. At the next playback time, if PKT 4 has still not arrived but the next packet, PKT 5 has arrived, then PKT 5 is played back. To further illustrate, suppose receipt of PKT 4 is delayed and the de-jitter buffer expects to receive PKT 4 at time $D_{init}+80$ ms. When PKT 4 is delayed, an erasure is played back. At time $D_{init}+100$ ms, if PKT 4 still has not arrived, instead of playing back another erasure, PKT 5 is played back. In this second scenario, adjustments for delay are made immediately and excessive end-to-end delays in the communication network are avoided. This process may be referred to as IBA, as the size of data stored in the buffer prior to playback increases and decreases according to the receipt of data.

Figure 8A:
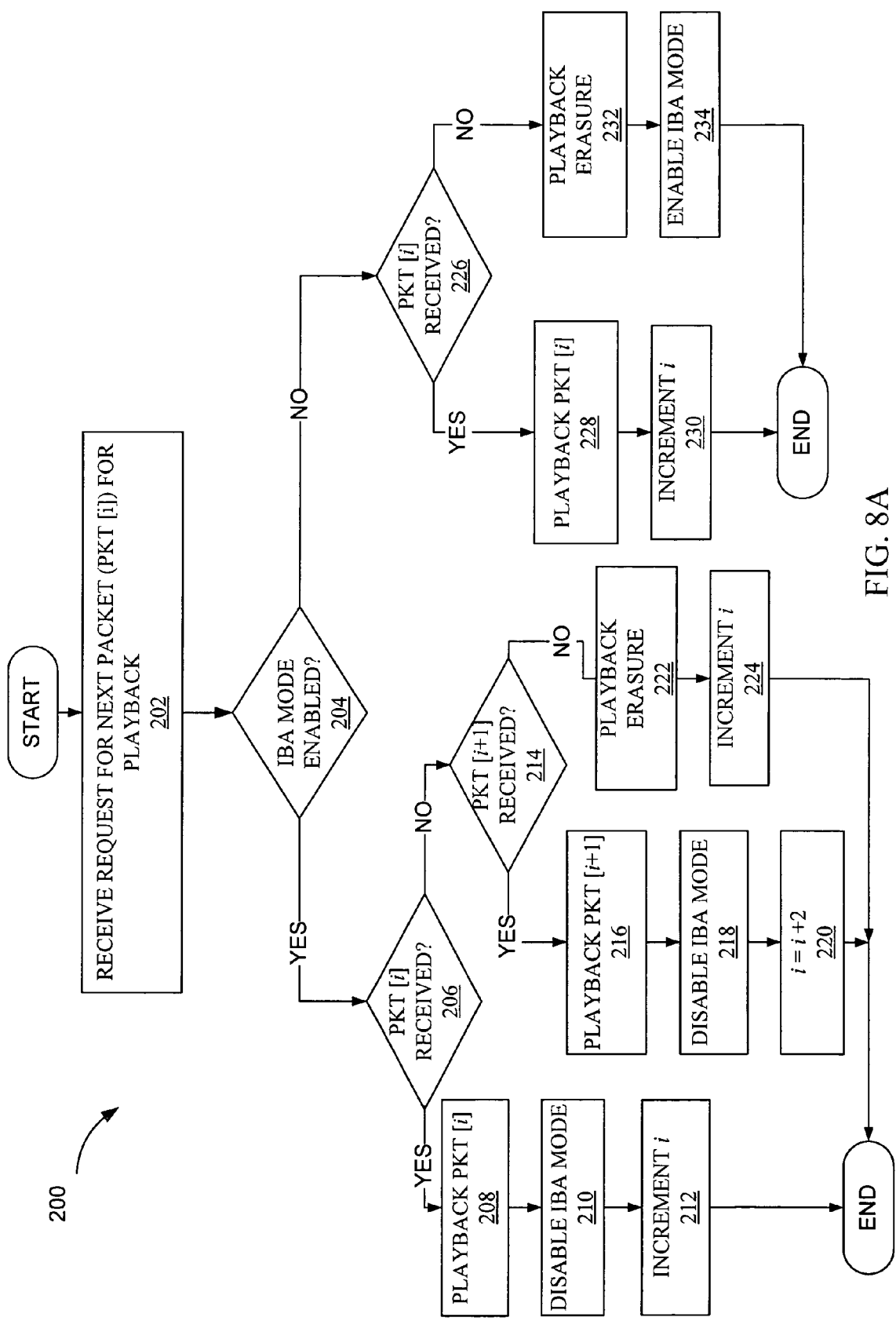
FIG. 8A is a flowchart illustrating one example of implicit buffer adaptation, which allows the receiver to receive a packet subsequent to an expected time for the packet.

Implicit buffer adaptation (IBA) process 200 is illustrated by a flowchart in FIG. 8A. The process 200 may be implemented in a controller within an adaptive de-jitter buffer, such as in output controller 760 or in de-jitter buffer controller 756. The process 200 may reside in other portions within a system supporting an adaptive de-jitter buffer. At step 202, a request is received at the adaptive de-jitter buffer to provide a next packet for playback. The next packet is identified as a packet having an index i in a sequence, specifically, PKT[i]. At 204, if an Implicit Buffer Adaption (IBA) mode is enabled, processing continues to 206 to process according to IBA mode; and if IBA mode is disabled, processing continues to 226 to process without IBA mode.

If PKT [i] is received at 206, then the adaptive de-jitter buffer provides PKT [i] for playback at step 208. IBA mode is disabled at step 210 and the index, i, is incremented, i.e., (i=i+1). Further, if PKT [i] is not received at 206 and if PKT [i+1] is received at 214, processing continues to step 216 to playback PKT [i+1]. IBA mode is disabled at step 218 and the index, i, is incremented twice, i.e., (i=i+2), at step 220.

If, at 214, PKT [i] and PKT [i+1] are not received, then the controller initiates playback of an erasure at step 222; and index i is incremented at step 224. Note, in the present example, when in IBA mode, the controller checks for up to two (2) packets in response to a request for a next packet, such as received at step 202. This effectively implements a packet window over which the controller searches for received packets. Alternate examples may implement a different window size, e.g., search for three (3) packets, which in this example would be packet sequence numbers i, i+1, and i+2.

Returning to 204, if IBA mode is not enabled, processing continues to 226 to determine if PKT [i] is received. If received, PKT [i] is provided for playback at step 228, and index, i, is incremented at step 230. If PKT [i] is not received at 226, the adaptive de-jitter buffer provides an erasure for playback at step 232. IBA mode is enabled, as PKT [i] was not received and an erasure was played back instead.

Figure 8B:
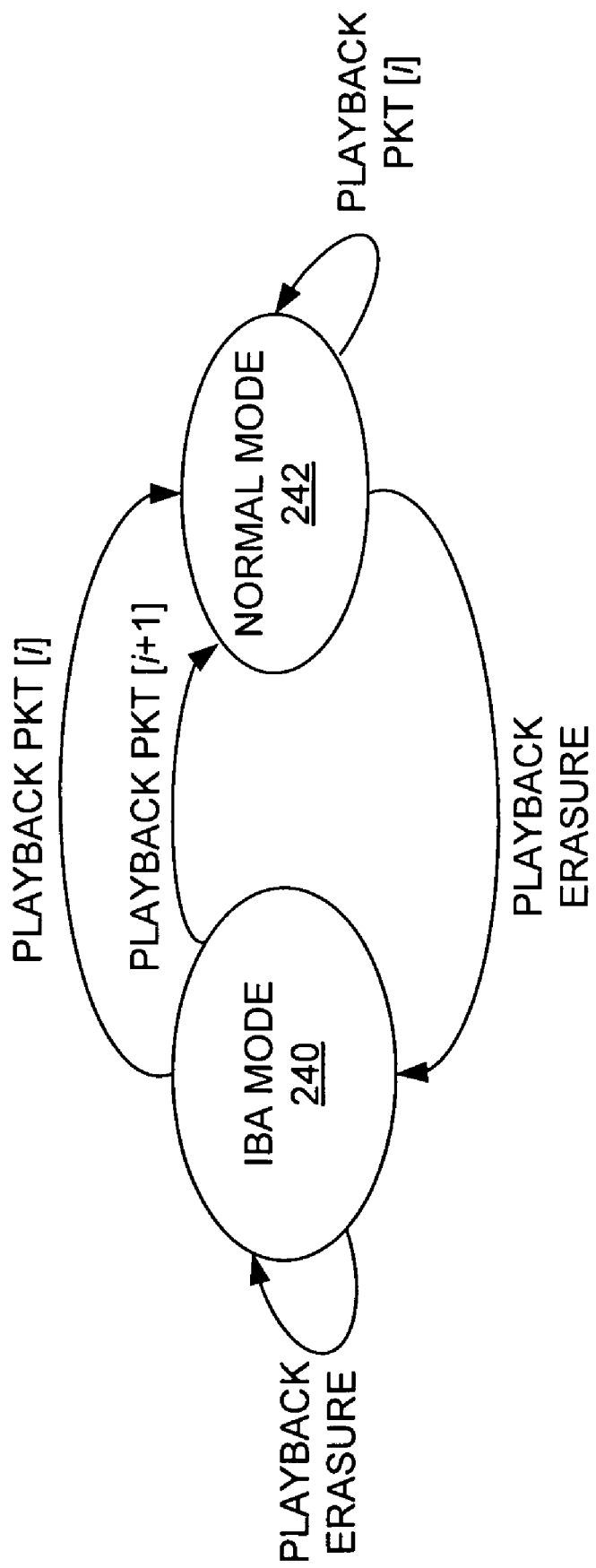
FIG. 8B is a state diagram of modes of operation for an adaptive de-jitter buffer.

FIG. 8B is a state diagram related to IBA mode. When in normal mode 242, if the adaptive de-jitter buffer provides PKT [i] for playback, the controller stays in normal mode. The controller transitions from normal mode 242 to IBA mode 240 when an erasure is played back. Once in IBA mode 240, the controller remains there on playback of an erasure. The controller transitions from IBA mode 240 to normal mode 242 on playback of PKT [i] or PKT [i+1].

Figure 9:
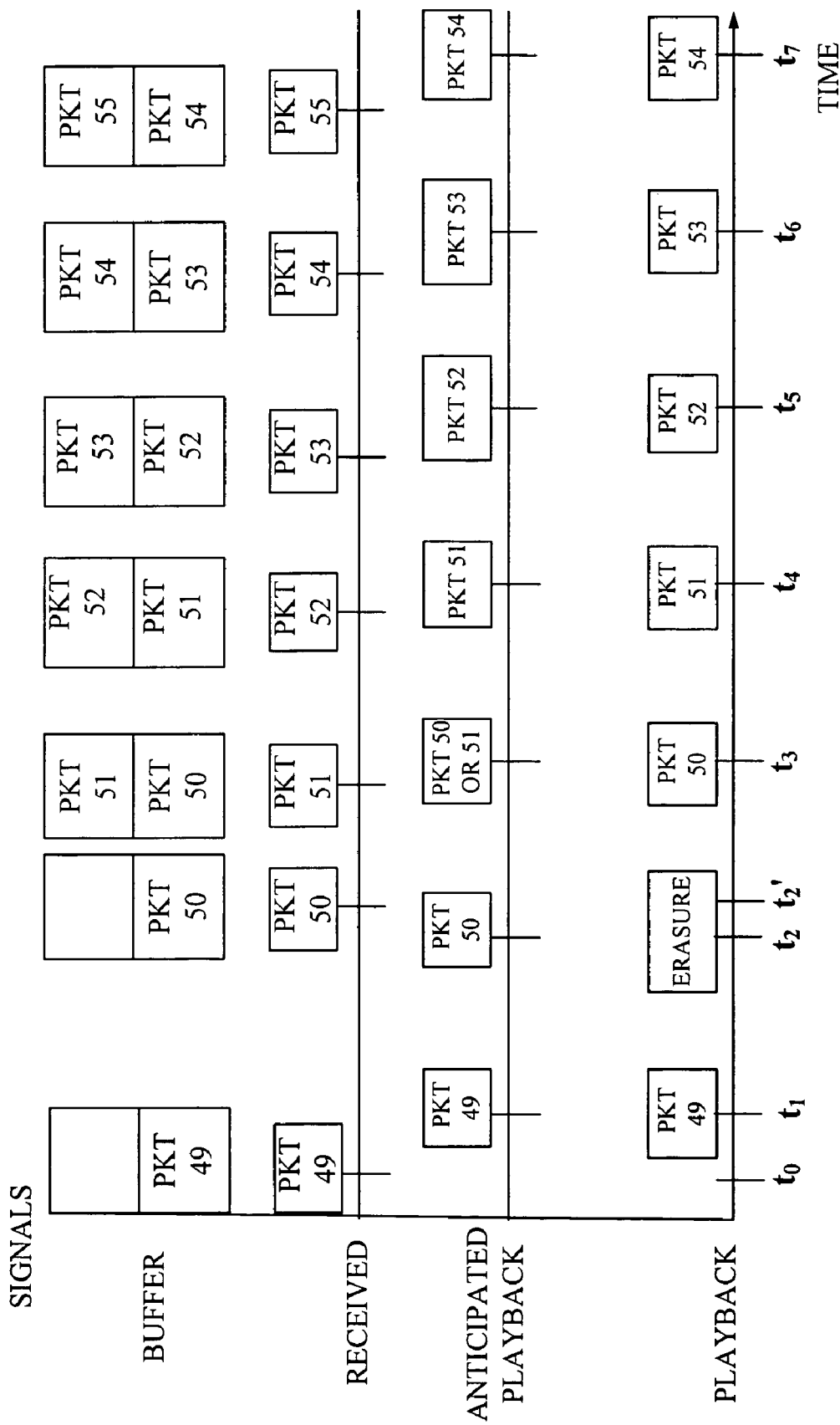
FIG. 9 is a timing diagram illustrating application of de-jitter buffer adaptation according to another example.

FIG. 9 is one example of a de-jitter buffer implementing IBA such as illustrated in FIGS. 8A and 8B. In the present illustration, the playback utility requests samples for playback from a decoder. The decoder then requests packets from the de-jitter buffer sufficient to allow uninterrupted playback by the playback utility. In the present illustration the packets carry voice communications, and the playback utility plays back a sample every 20 ms. Alternate systems may provide the packetized data from the de-jitter buffer to the playback utility through other configurations, and the packetized data may be other than voice communications.

The de-jitter buffer is illustrated in FIG. 9 as a stack of packets. In this illustration, the buffer receives PKT 49 first, and then subsequently receives PKT 50, 51, PKT 52, PKT 53, etc. The packet number in this illustration refers to a sequence of packets. In a packetized system, however, there is no guarantee the packets will be received in this order. For clarity of understanding, in this illustration packets are received in the same numerical sequence as transmitted, which is also the order of playback. For illustration purposes, in FIG. 9 subsequently received packets are stacked on top of previously received packets in the de-jitter buffer; for instance, PKT 49 is stacked on top of PKT 50, PKT 51 is stacked on top of PKT 50, etc. The packet at the bottom of the stack in the de-jitter buffer is the first to be sent to the play back utility. Note also, in the present illustration, the target de-jitter buffer length is not shown.

In FIG. 9, the receipt of packets, anticipated receipt time of packets and playback time of packets is graphed versus time. The updated buffer status is illustrated each time a packet is received. For example, PKT 49 is received at time $t_0$, wherein PKT 49 is anticipated for playback at time $t_1$. The buffer status on receipt of PKT 49 is illustrated at the top of the graph above time $t_0$, the receipt time of PKT 49. The time receipt for each packet received at the de-jitter buffer is graphed as RECEIVED. The ANTICIPATED PLAYBACK time is graphed just below the RECEIVED time. Playback times are identified as PLAYBACK.

In this example, initially the next packet for playback is PKT 49, which is anticipated to be played back at time $t_0$. The next sequential packet is expected at time $t_1$, etc. The first packet, PKT 49 is received before the anticipated playback time of $t_0$. Therefore, PKT 49 is played back at time $t_0$ as anticipated. The next packet, PKT 50, is anticipated at time $t_1$. Receipt of PKT 50, however, is delayed, and an erasure is sent to the playback utility, in lieu of PKT 50. The delay of PKT 50 causes an underflow as previously described. PKT 50 is received after the anticipated playback time, $t_1$, and before the next anticipated playback time, $t_2$. Once received, PKT 50 is stored in the de-jitter buffer. Therefore, when a next request for a packet to playback at time $t_2$ is received, the system looks for the lowest sequential packet in the de-jitter buffer; and PKT 50 is provided to the playback utility for playback at time $t_2$. Note, using IBA, even though PKT 50 is not received in time to playback as anticipated, PKT 50 is played back later and the rest of the sequence resumed from that point. As illustrated, subsequent packets, PKT 51, PKT 52, etc. are received and played back in time to avoid further erasures.

Although it may seem like IBA increases the end-to-end delay of packets, this is actually not the case. Since IBA leads to a smaller number of underflows, the de-jitter buffer value as estimated from Equation 1 above, is maintained at a smaller value. Therefore, the overall effect of IBA may be a decrease in the average end-to-end delay of packets overall.

IBA may enhance processing of communication having talkspurts. A talkspurt refers to the speech portion of a voice communication, wherein a voice communication includes speech and silence portions, consistent with normal speech patterns. In speech processing, a vocoder produces one type of packet for speech and another type for silence. The speech packets are encoded at one encoding rate, and silence is encoded at a different encoding rate. When encoded packets are received at the de-jitter buffer, the de-jitter buffer identifies the type packet from the encoding rate. The de-jitter buffer assumes a speech frame is part of a talkspurt. The first non-silence frame is the beginning of a talkspurt. The talkspurt ends when a silence packet is received. In discontinuous transmission, not all of the silence packets are transmitted, as the receiver may implement a simulated noise to account for the silence portions of the communication. In continuous transmission, all of the silence packets are transmitted and received. In one example, the de-jitter buffer adjusts the de-jitter buffer length according to the type of packets received.

In other words, the system may decide to reduce the length of the de-jitter buffer required for silence portions of the communication. Note, the IBA methods may be applicable to any communications where the playback is according to a predetermined timing scheme, such as a fixed rate, etc.

Time Warping

A talkspurt is generally made up of multiple packets of data. In one example, playback of a first packet of a talkspurt may be delayed by a length equal to the de-jitter buffer delay. The de-jitter buffer delay may be determined in various ways. In one scenario, the de-jitter buffer delay may be a calculated de-jitter buffer delay, based on an algorithm such as Equation 1 above. In another scenario, the de-jitter buffer delay may be the time it takes to receive voice data equal to the length of the de-jitter buffer delay. Alternatively, the de-jitter buffer delay may be selected as the smaller of the aforementioned values. In this example, suppose the de-jitter buffer delay is calculated as 60 ms using Equation 1 and the first packet of a talkspurt is received at a first time $t_i$. When a next packet of the talkspurt is received 50 ms after the first packet, the adaptive de-jitter buffer data is equal to the de-jitter delay, 60 ms. In other words, the time from receipt of a packet at the adaptive de-jitter buffer to playback is 60 ms. Note, the target length of the adaptive de-jitter buffer may be set to achieve a 60 ms delay. Such calculation determines how many packets are to be stored in order to meet the delay time.

The adaptive de-jitter buffer monitors the filling and emptying of data from the buffer and adjusts the output of the buffer to maintain the buffer at the target delay length, i.e., the amount of data to achieve the target delay time. When the de-jitter buffer sends the first packet of the talkspurt to playback, there is a delay equal to $\Delta$, where $\Delta$=MIN (de-jitter buffer delay, time taken to receive voice data equal to de-jitter delay). Subsequent packets of the talkpsurt are delayed by $\Delta$ plus the time it takes to playback the previous packets. Thus the de-jitter buffer delay of subsequent packets of the same talkspurt is implicitly defined once the de-jitter buffer delay for the first packet has been defined. In practice, this definition of de-jitter buffer delay may require additional considerations to accommodate for situations such as those illustrated in FIG. 10.

Figure 10:
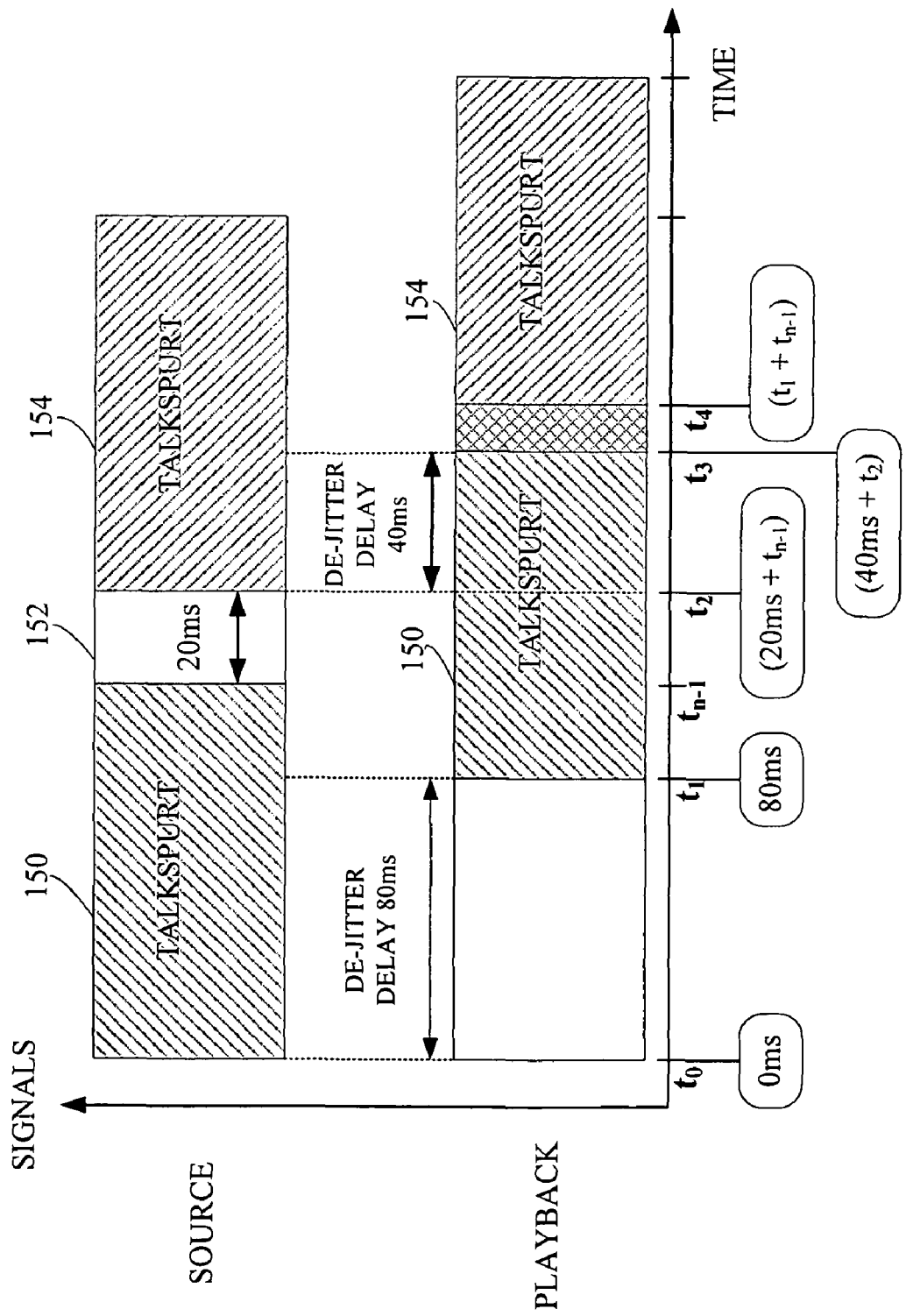
FIG. 10 is a diagram illustrating transmission of voice information in talkspurts according to one example, wherein the de-jitter buffer delay is not sufficient to avoid collision of data.

FIG. 10 illustrates the transmission of voice information in talkspurts. Talkspurt 150 is received at time $t_0$ and talkspurt 154 is received at time $t_2$. There is a silence period 152 received between talkspurt 150 and talkspurt 154 of 20 ms. Upon receipt the adaptive de-jitter buffer may store the received data and determine the delays for playback of each talkspurt. In this example, talkspurt 150 is received at the adaptive de-jitter buffer at time $t_0$, wherein the adaptive de-jitter buffer delay time is calculated as 80 ms. The de-jitter buffer delay is added to the receipt time to result in a playback time. In this way, talkspurt 150 is delayed by the adaptive de-jitter buffer by 80 ms before playback. Talkspurt 150 begins playback at time $t_1$, wherein $t_1=t_0+80$ ms, or 80 ms after talkspurt 150 is received; and completes playback at time $t_4$. Using an algorithm such as Equation 1 to calculate the target de-jitter buffer length as above, the de-jitter buffer delay applied to talkspurt 154 is 40 ms. This means the first packet of talkspurt 154 is to be played back at time $t_3$, wherein $t_3=t_2+40$ ms, or 40 ms after talkspurt 154 is received. Playback of packet 154 at time $t_3$, however, conflicts with playback of the last packet of talkspurt 150, which finishes playback at time $t_4$. Therefore, the calculated de-jitter buffer delay of 40 ms (for packet 154) does not allow sufficient time for talkspurt 150 to finish playing. To avoid such conflict and allow both packets to playback correctly, the first packet of talkspurt 154 should be played after the last packet of talkspurt 150 has been played with a silence period in between. In this example, talkspurt 150 and talkspurt 154 overlap from time $t_3$ to $t_4$. Therefore, the playback method in this scenario is not desirable. In order to prevent overlaps between the playback of packets as described herein, there is a need to detect when the last packet of the previous talkspurt is played back. Thus, calculation of the de-jitter buffer delay for a packet may consider the playback timing of previously played back packets, so as to avoid overlap or conflict.

As described above, in one example the de-jitter buffer delay is calculated or updated at the beginning of a talkspurt. Restricting the update of the de-jitter buffer delay to the beginning of a talkspurt, however, may be limiting, as talkspurts often vary in length and operating conditions may change during a talkspurt. Consider the example of FIG. 10. Thus, there may be a need to update the de-jitter buffer delay during a talkspurt.

Note, it is desirable to control the flow of data out of the adaptive de-jitter buffer to maintain the target delay length. In this way, if the adaptive de-jitter buffer is receiving data with variable delays, the data out of the adaptive de-jitter buffer is adjusted to allow the buffer to be filled with data sufficient to meet the target adaptive de-jitter buffer length. Time warping may be used to expand packets when the adaptive de-jitter buffer is receiving insufficient packets to maintain the target delay length. Similarly, time warping may be used to compress packets when the adaptive de-jitter buffer is receiving too many packets and is storing packets above the target delay length. The adaptive de-jitter buffer may work in coordination with a decoder to time warp packets as described herein.

Figure 11:
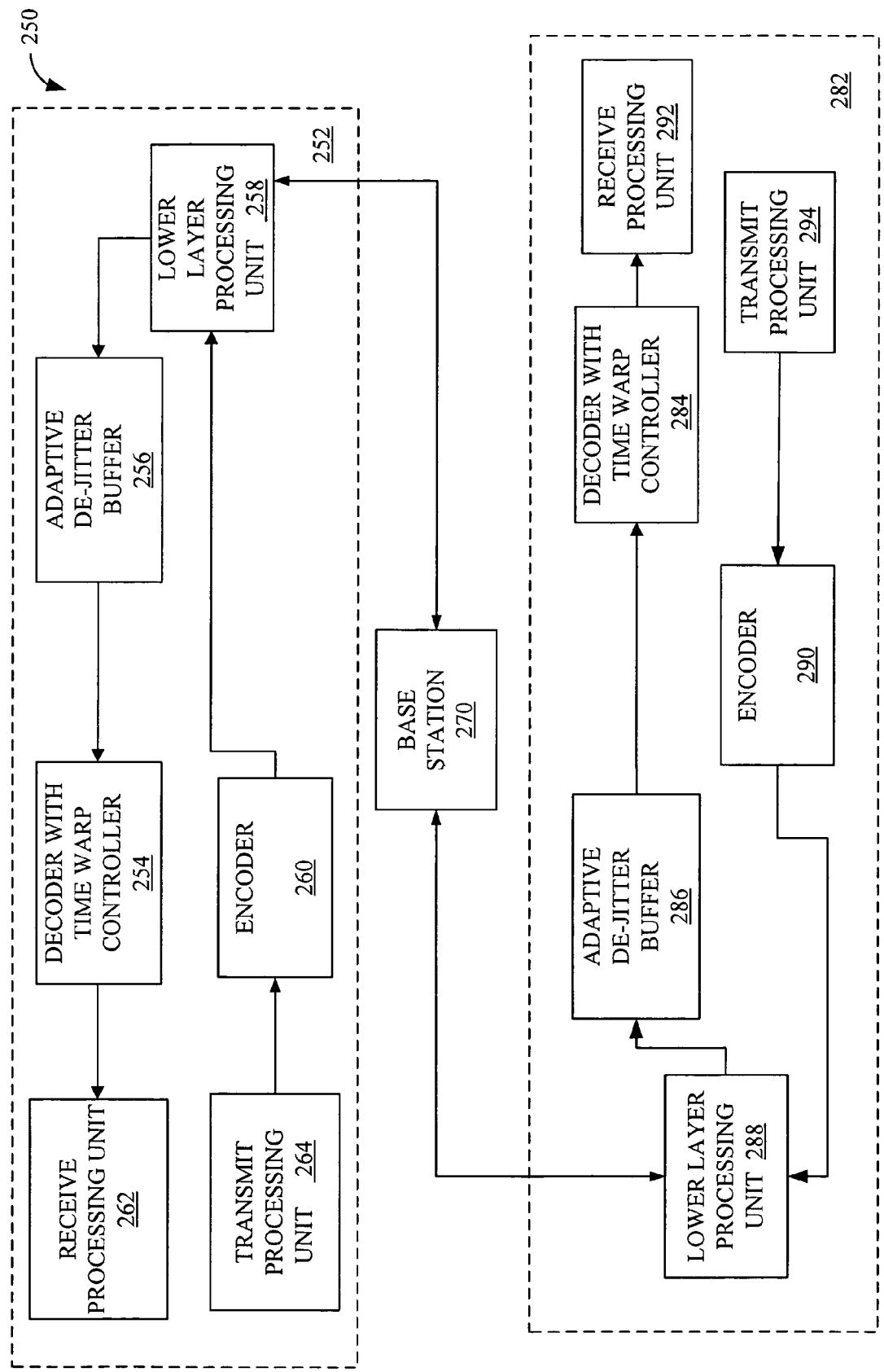
FIG. 11 is a block diagram of a communication system incorporating an adaptive de-jitter buffer.

FIG. 11 is a block diagram of a system including two receivers communicating through a network element. The receivers are AT 252 and AT 282; as illustrated ATs 252 and 282 are adapted for communication through a BS 270. In AT 252, transmit processing unit 264 transmits voice data to an encoder 260 which digitizes the voice data and sends the packetized data to lower layer processing unit 258. Packets are then sent to BS 270. When AT 252 receives data from BS 270, the data is first processed in the lower layer processing unit 258, from which packets of data are provided to an adaptive de-jitter buffer 256. Received packets are stored in adaptive de-jitter buffer 256 until the target de-jitter buffer length is reached. Once the target de-jitter buffer length is reached, the adaptive de-jitter buffer 256 sends data to a decoder 254. In the illustrated example, compression and expansion to implement time warping may be performed in the decoder 254 which converts the packetized data to voice data and sends the voice data to a receive processing unit 262. In another example of this invention, time compression and expansion (time warping) may be performed within the adaptive de-jitter buffer by a controller (not shown). The behavior of AT 282 is similar to that of AT 252. AT 282 transmits data on a path from transmit processing unit 294 to encoder 290 to lower layer processing unit 288 and finally to BS 270. AT 282 receives data on a path from lower layer processing unit 288 to adaptive de-jitter buffer 286 to decoder 284 to receive processing unit 292. Further processing is not illustrated but may affect the playback of data, such as voice, and may involve audio processing, screen displays, etc.

The de-jitter buffer equations given in Equation 1 calculate the de-jitter buffer delay at the beginning of a talkspurt. The de-jitter buffer delay may represent a specific number of packets, such as determined by talkspurts, or may represent an expected time equivalent for playback of data, such as voice data. Note here that the de-jitter buffer has a target size, and this determines the amount of data the de-jitter buffer expects to see stored at all points of time.

Variation in packet delay due to channel conditions, and other operating conditions, may lead to differences in packet arrival time at the adaptive de-jitter buffer. Consequently, the amount of data (number of packets) in the adaptive de-jitter buffer may be less or greater than the calculated de-jitter buffer delay value, DEJITTER_DELAY. For instance, packets may arrive at the de-jitter buffer at a slower or faster rate than the packets were generated originally at the encoder. When packets arrive at the de-jitter buffer at a slower rate than expected, the de-jitter buffer may begin to deplete because incoming packets will not replenish outgoing packets at the same rate. Alternatively, if packets arrive at a faster rate than the generation rate at the encoder, the de-jitter buffer may start increasing in size because packets are not leaving the de-jitter buffer as fast as they are entering. The former condition may lead to underflows, whereas the latter condition may cause high end-to-end delays due to larger buffering times in the de-jitter buffer. The latter is important because if the end-to-end delay of the packet data system decreases (AT moves to a less loaded area or user moved to an area with better channel quality) it is desirable to incorporate this delay reduction into the playback of the speech. The end-to-end delay is an important speech quality factor and any reduction on playback delay is perceived as an increase of conversational or speech quality.

To correct discrepancies at the de-jitter buffer between DEJITTER_DELAY and the amount of data actually present in the de-jitter buffer, one example of a de-jitter buffer employs time warping. Time warping involves expanding or compressing the duration of a speech packet. The de-jitter buffer implements time warping by expanding speech packets when the adaptive de-jitter buffer starts to deplete, and compressing speech packets when the adaptive de-jitter buffer becomes larger than DEJITTER_DELAY. The adaptive de-jitter buffer may work in coordination with a decoder to time warp packets. Time warping provides substantial improvement in speech quality without increasing the end-to-end delay.

Figure 12:
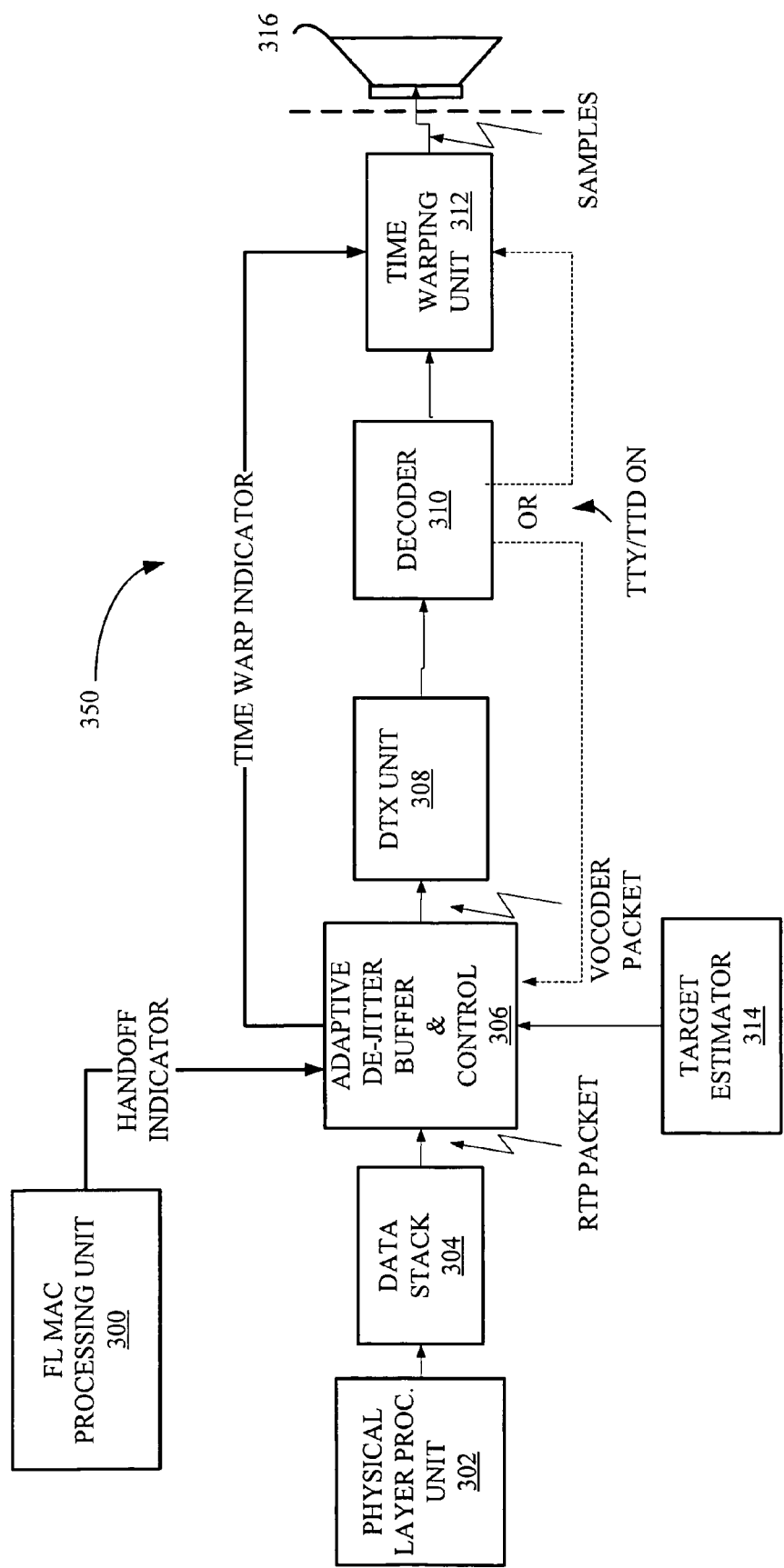
FIG. 12 is a block diagram of a portion of a receiver including an adaptive de-jitter buffer and a time warping unit.

FIG. 12 is a block diagram of an example of an adaptive de-jitter buffer implementing time warping. The physical layer processing unit 302 provides data to the data stack 304. The data stack 304 outputs packets to the adaptive de-jitter buffer and control unit 306. The Forward Link (FL) Medium Access Control (MAC) processing unit 300 provides a handoff indication to de-jitter processing unit 306. The MAC layer implements protocols for receiving and sending data on the physical layer, i.e. over the air. The MAC layer may include security, encryption, authentication, and connection information. In a system supporting IS-856, the MAC layer contains rules governing the Control Channel, the Access Channel, as well as the Forward and Reverse Traffic Channels. The target length estimator 314 provides the target de-jitter buffer length to the de-jitter buffer using the calculations given in Equation 1. Input to the target length estimator 314 includes packet arrival information and current packet error rate (PER). Note, alternate configurations may include the target length estimator 314 within the adaptive de-jitter buffer and control unit 306.

In one example, adaptive de-jitter buffer and control unit 306 further includes playback control which controls the rate of data provided for playback. From the adaptive de-jitter buffer and control unit 306, packets are sent to a Discontinuous Transmission (DTX) unit 308, wherein DTX unit 308 provides background noise information to decoder 310 when speech data is not being received. Note, the packets provided by the adaptive de-jitter buffer and control unit 306 are ready for decode processing and may be referred to as vocoder packets. The Decoder 310 decodes the packets and provides Pulse Code Modulated (PCM) speech samples to the time warping unit 312. In alternate examples, the time warping unit 312 may be implemented within the decoder 310. Time warping unit 312 receives a time warping indicator from adaptive de-jitter buffer and control unit 306. The time warping indicator may be a control signal, an instruction signal or a flag. In one example, a time warp indicator may be a multistate indicator, having for instance, a compression, expansion, and no time warping. There may be different values for different compression levels and/or different expansion levels. In one example, the time warping indicator instructs the time warping unit 312 to expand or compress data. The time warping indicator indicates expand, compress, or no warping. The time warping indicator may be considered a control signal initiating action at the time warping unit 312. The time warping indicator may be a message specifying how to expand or compress the packets. The time warping indicator may identify the packets to time warp as well as which action to take, expand or compress. Still further, the time warping indicator may provide a choice of options to the time warping unit 312. During a silence interval the DTX module modifies the stream of erasures provided by the de-jitter buffer into a stream of erasures and silence frames that the decoder uses to reconstruct a more precise and higher quality background noise. In an alternate example, the time warp indicator turns time warping on and off. In still another example, the indicator identifies the amount of compression and expansion used for playback. The time warping unit 312 may modify the samples from the decoder and provides the samples to audio processing 316, which may include an interface and conversion unit, as well as an audio driver and speaker.

While the time warping indicator identifies when to compress or when to expand, there is a need to determine how much time warping to apply to a given packet. In one embodiment, the amount of time warping is fixed, wherein packets are time warped according to speech cycle, or pitch.

In one embodiment, the time warping indicator is communicated as a percentage of a target expansion or a target compression level. In other words, the time warping indicator instructs to compress by a given percent or expand by a given percent.

In one scenario, it may be necessary to recognize a known characteristic of incoming data. For example, an encoder may anticipate data of a known tone or having specific characteristics of length for instance. In this situation, since a particular characteristic is anticipated, it would not be desirable to modify the received data using time warping. For instance, an encoder may expect incoming data to have a particular tone length. However, if time warping is enabled, the length of the tone may be modified by time warping. Therefore, in this scenario, time warping should not be enabled. Tone based communications include, but are not limited to, TeleTypewriter/Telecommunications Device for the Deaf (TTY/TDD) information, applications using keypad entries, or other applications using tone-based communications. In such communications the length of the tone carrier information, and therefore, modifying the pitch or tone length, such as compression or expansion at playback, may result in loss of that information. In TTY, TDD and other applications which enable receipt by hearing-impaired recipients, the decoder also provides the status of its inband processing of such communication. This indication is used to mask the time warping indications provided by the de-jitter buffer. If the decoder is processing packets with TTY/TDD information, time warping should be disabled. This may be done in 2 ways; providing the TTY/TDD status to the de-jitter buffer controller, or providing the TTY/TDD status to the time warping unit. If the decoder TTY/TDD status is provided to the de-jitter buffer controller, the controller should not indicate any expansion or compression indication when the vocoder indicates processing of TTY/TDD. If the decoder TTY/TDD status is provided to the time warping unit, this acts as a filter and the time-warping unit does not act upon time warping indications if the decoder is processing TTY/TDD information.

Figure 13A:
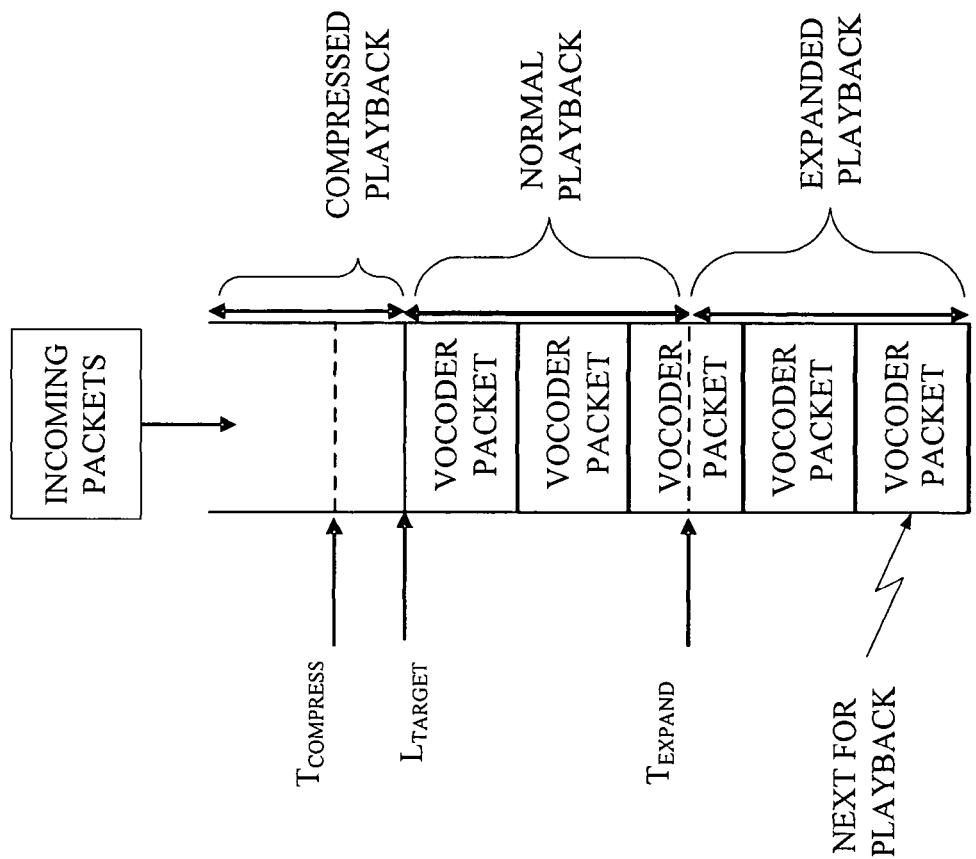
FIG. 13A illustrates one example of an adaptive de-jitter buffer, including compression and expansion thresholds.

In a system as illustrated in FIG. 12, the adaptive de-jitter buffer and control unit 306 monitors the rate of incoming data and generates a time warp indicator when too many or too few packets are available or buffered. The adaptive de-jitter buffer and control unit 306 determines when to time warp and which action to take. FIG. 13A illustrates operation of one example of an adaptive de-jitter buffer making the time warp determinations using compression and expansion thresholds. The de-jitter buffer accumulates packets which may have arrived at irregular time intervals. The de-jitter target length estimator 314 generates a target de-jitter buffer length; the target de-jitter buffer length is then applied to the de-jitter buffer. In practice, an adaptive de-jitter buffer and control unit 306 uses the de-jitter buffer length value to make control decisions about de-jitter buffer operation and to control playback. The compression threshold and expansion threshold indicate when compression or expansion is triggered, respectively. These thresholds may be specified as a fraction of the de-jitter target length.

As illustrated in FIG. 13A, the target de-jitter buffer length is given as $L_{Target}$. The compression threshold is given as $T_{Compress}$, and the expansion threshold is given as $T_{Expand}$. When the de-jitter buffer length increases above the compression threshold, $T_{Compress}$, the de-jitter buffer indicates to the decoder that packets should be compressed.

In a similar manner, when the de-jitter buffer length depletes below the expansion threshold, $T_{Expand}$, the de-jitter buffer indicates to the decoder that packets should be expanded, and effectively played back at a slower rate.

A point of operation between the expansion and compression thresholds avoids underflows as well as excessive increases in end-to-end delays. Therefore, target operation is between $T_{Compress}$ and $T_{Expand}$. In one example, the values for expansion and compression thresholds are set to 50% and 100%, of the target value of the de-jitter buffer, respectively. While in one example, time warping may be performed inside the decoder, in alternate examples, this function may be performed outside the decoder, for instance subsequent to decoding. However, it may be simpler to time warp the signal before synthesizing the signal. If such time warping methods were to be applied after decoding the signal, the pitch period of the signal would need to be estimated.

In certain scenarios, the de-jitter buffer length may be larger, for instance in a W-CDMA system. A time warp threshold generator may generate multiple compression and expansion thresholds. These thresholds may be calculated in response to operating conditions. Multi-level thresholds are illustrated in FIG. 13B. $T_{C1}$ is a first compression threshold, $T_{C2}$ is a second compression threshold and $T_{C3}$ is a third compression threshold. Also illustrated are $T_{E1}$, $T_{E2}$ and $T_{E3}$ representing three different values for expansion thresholds. The thresholds may be based on a percentage of time warping (how many packets get time warped), on compressed packets, on a percentage of expanded packets or on a ratio of these two values. The number of thresholds may be changed as needed, in other words, more or less thresholds may be needed. Each one of the thresholds relates to a different compression or expansion rate, for instance, for systems requiring finer granularity, more thresholds may be used, and for coarser granularity, less thresholds may be used. $T_{E1}$, $T_{E2}$ and $T_{E3}$, etc., may be a function of target delay length. Threshold may be changed by tracking delayed underflows and based on error statistics such as PER.

Figure 14:
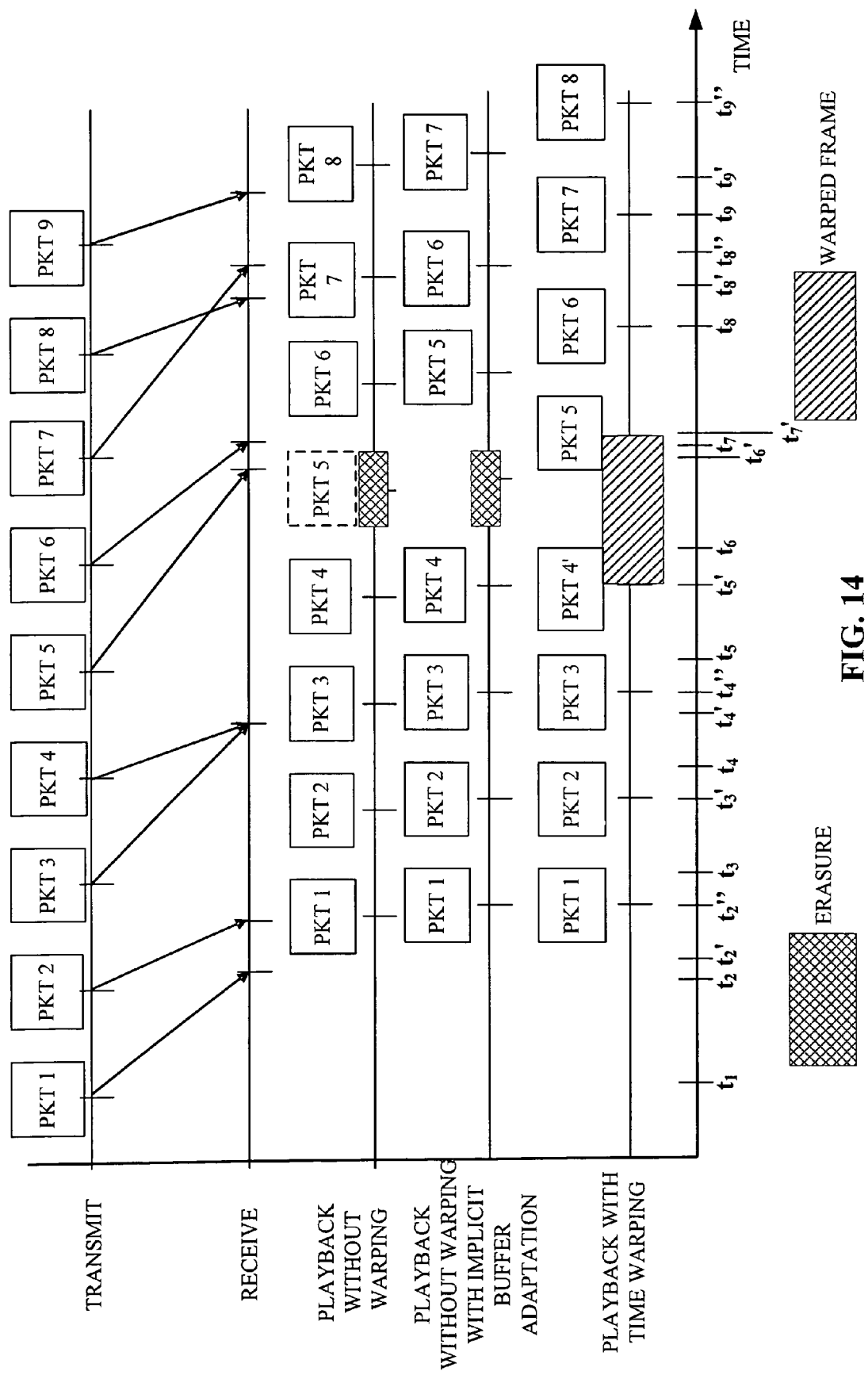
FIG. 14 is a timing diagram illustrating time warping on receipt of packets having various delays.

FIG. 14 illustrates playback of packets with and without time warping. In FIG. 14, PKT 1 is transmitted at time $t_1$, PKT 2 is sent at time $t_2$, and so on. The packets arrive at the receiver as indicated, wherein PKT 1 arrives at $t_2'$, and PKT 2 arrives at $t_2''$. For each packet, the playback time without using time warping is given as PLAYBACK WITHOUT WARPING. In contrast, the playback time using time warping is given as PLAYBACK WITH WARPING. As the present example is for real-time data, such as speech communications, the anticipated playback time of packets is at fixed time intervals. During playback, ideally each packet arrives before the anticipated playback time. If a packet arrives too late for playback at the anticipated time, there may be an impact on playback quality.

PKTs 1 and 2 are received on time, and they are played back, without time warping. PKT 3 and PKT 4 are both received at the same time, $t_4'$. The receipt time for both packets is satisfactory, because each packet is received before the associated anticipated playback times, $t_4''$ for PKT 3 and $t_5'$ for PKT 4. PKTs 3 and 4 are played back on time without warping. A problem arises when PKT 5 is received at time $t_6'$, after the anticipated playback time. An erasure is played back in lieu of PKT 5 at the anticipated playback time. PKT 5 arrives later, after the erasure has begun playback.

In a first scenario without warping, PKT 5 is dropped and PKT 6 is received and played back at the next anticipated playback time. Note, in this case, PKT 6 was received in time for playback. In a second scenario, if PKT 5 and all packets subsequent to PKT 5 are delayed, each packet may arrive too late for anticipated playback, and result in a string of erasures. In both of these scenarios, information is lost i.e., PKT 5 is dropped in the first scenario; PKT 5 and subsequent packets are lost in the second scenario.

Alternatively, using an IBA technique allows PKT 5 to be played back the next anticipated playback time, wherein subsequent packets continue from that point. IBA prevents loss of data, however, delays the stream of packets.

Such playback without time warping may increase the overall end-to-end delay in a communication system. As illustrated in FIG. 14, inter-packet delays may result in lost information, or delays in playback.

By implementing time warping, when PKT 5 arrives after its anticipated playback time, packets are expanded and an erasure may be avoided. For instance, expanding PKT 4 may cause playback in 23 ms instead of 20 ms. PKT 5 is played back when it is received. This is sooner than it would have been played back had an erasure been sent instead (as illustrated in one alternative for the playback without time warping but with IBA as described in FIG. 14.) Expanding PKT 4 instead of sending an erasure results in less degradation of playback quality. Thus, time warping provides for better overall playback quality as well as latency reduction. As illustrated in FIG. 14, packets subsequent to PKT 5 are played back earlier using time warping than if not using a time warping technique. In this specific example, PKT 7 is played back at time $t_9$, when time warping is used, which is earlier than without time warping.

One application of time warping to improve playback quality while considering the changing operating conditions as well as the changes in characteristics of the transmitted information in the transmission of speech. As speech characteristics vary, having talkspurts and silence periods, the target de-jitter buffer delay length and the compression and expansion thresholds for each type of data may be different.

Figure 15:
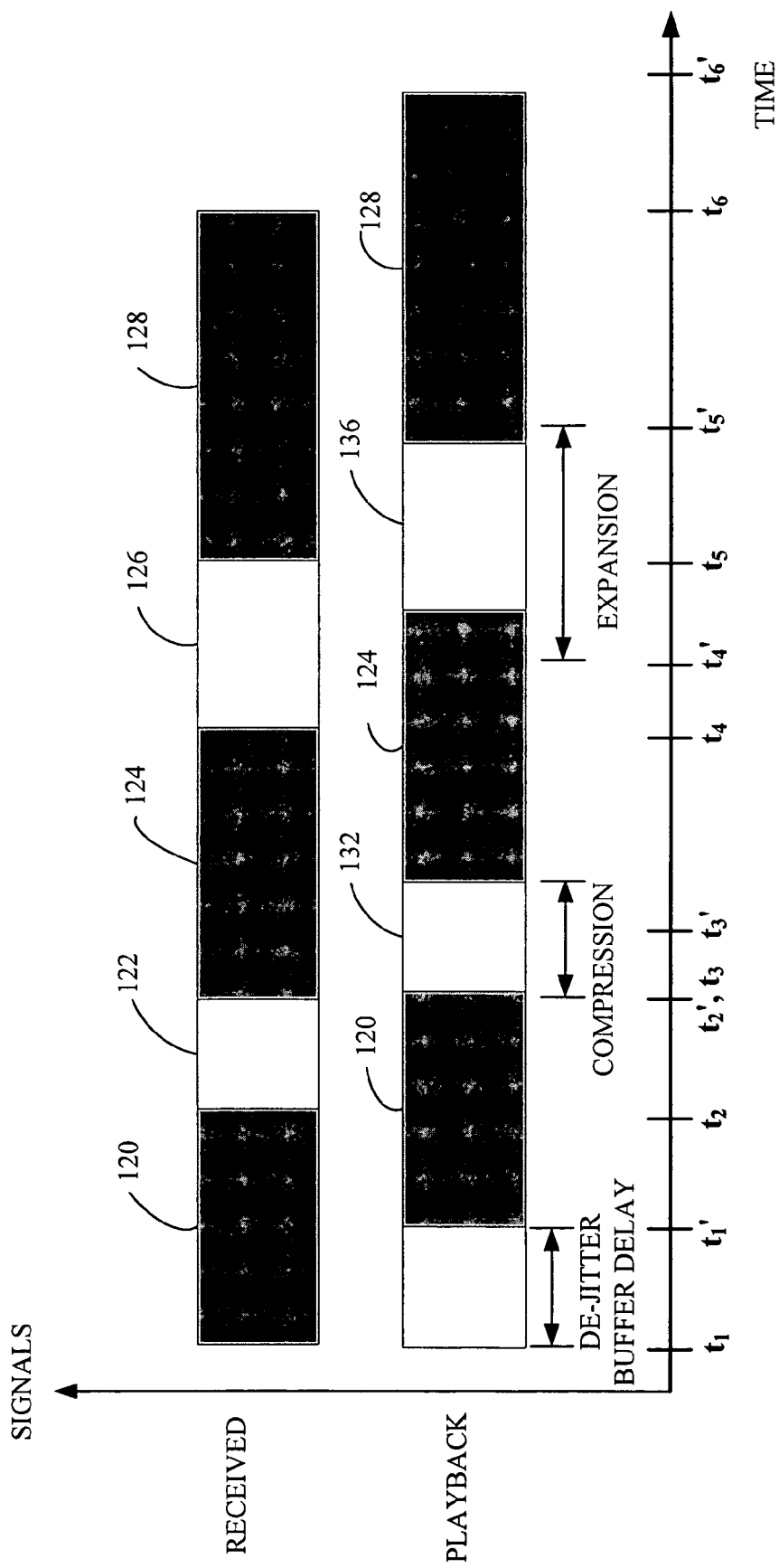
FIG. 15 is a timing diagram illustrating examples: i) compression of a silence portion of a speech segment; and ii) expansion of a silence portion of a speech segment.

FIG. 15 illustrates examples of "silence compression" and "silence expansion" due to differences in de-jitter delay from one talkspurt to another. In FIG. 15, the shaded regions 120, 124 and 128 represent talkspurts, while unshaded regions 122 and 126 represent silence periods of the received information. As received, talkspurt 120 begins at time $t_1$ and ends at time $t_2$. At the receiver, de-jitter buffer delay is introduced and therefore playback of talkspurt 120 begins at time $t_1'$. The de-jitter buffer delay is identified as the difference between time $t_1'$ and time $t_1$. As received, silence period 122 begins at time $t_2$ and ends at time $t_3$. The silence period 122 is compressed and played back as silence period 132 from time $t_2'$ to $t_3'$, which is less than the original time duration of the received silence period 122. Talkspurt 124 begins at time $t_3$ and ends at time $t_4$ at the source. Talkspurt 104 is played back at the receiver from time $t_3'$ to time $t_4'$. Silence period 126 (time $t_4$ to $t_5$) is expanded at the receiver on playback as silence period 136, wherein $(t_5'-t_4')$ is greater than $(t_5-t_4)$. A silence period may be compressed when the de-jitter buffer needs to playback packets sooner and expanded when a de-jitter buffer needs to delay the playback of packets. In one example, compression or expansion of silence periods causes insignificant degradation in voice quality. Thus, adaptive de-jitter delays may be achieved without degrading voice quality. In the example of FIG. 15, the adaptive de-jitter buffer compresses and expands the silence periods as identified and controlled by the adaptive de-jitter buffer.

Note, as used herein, time warping refers to the adaptive control of playback in response to the arrival time and length of received data. Time warping may be implemented using compression of data on playback, expansion of data on playback, or using both compression and expansion of data on playback. In one example, a threshold is used to trigger compression. In another example, a threshold is used to trigger expansion. In still another example, two triggers are used: one for compression, and one for expansion. Still other examples may employ multiple triggers, indicating various levels of time warping, e.g. fast playback at different rates.

Time warping may also be performed inside the decoder. Techniques for performing decoder time-warping are described in co-pending application Ser. No. 11/123,467, entitled "Time Warping Frames Inside the Vocoder by Modifying the Residual," filed May 5, 2005.

In one example, time warping incorporates a method for "merging" segments of speech. Merging speech segments involves comparing speech samples in at least two consecutive segments of speech and if a correlation is found between compared segments, creating a single segment of at least two consecutive segments. Merging of speech is done while attempting to preserve speech quality. Preserving speech quality and minimizing introduction of artifacts, such as sounds which degrade the quality for the user, including "clicks" and "pops," into the output speech is accomplished by carefully selecting the segment to merge. The selection of speech segments is based on segment similarity or correlation. The closer the similarity of the speech segments, the better the resulting speech quality and the lower the probability of introducing a speech artifact.

Figure 16:
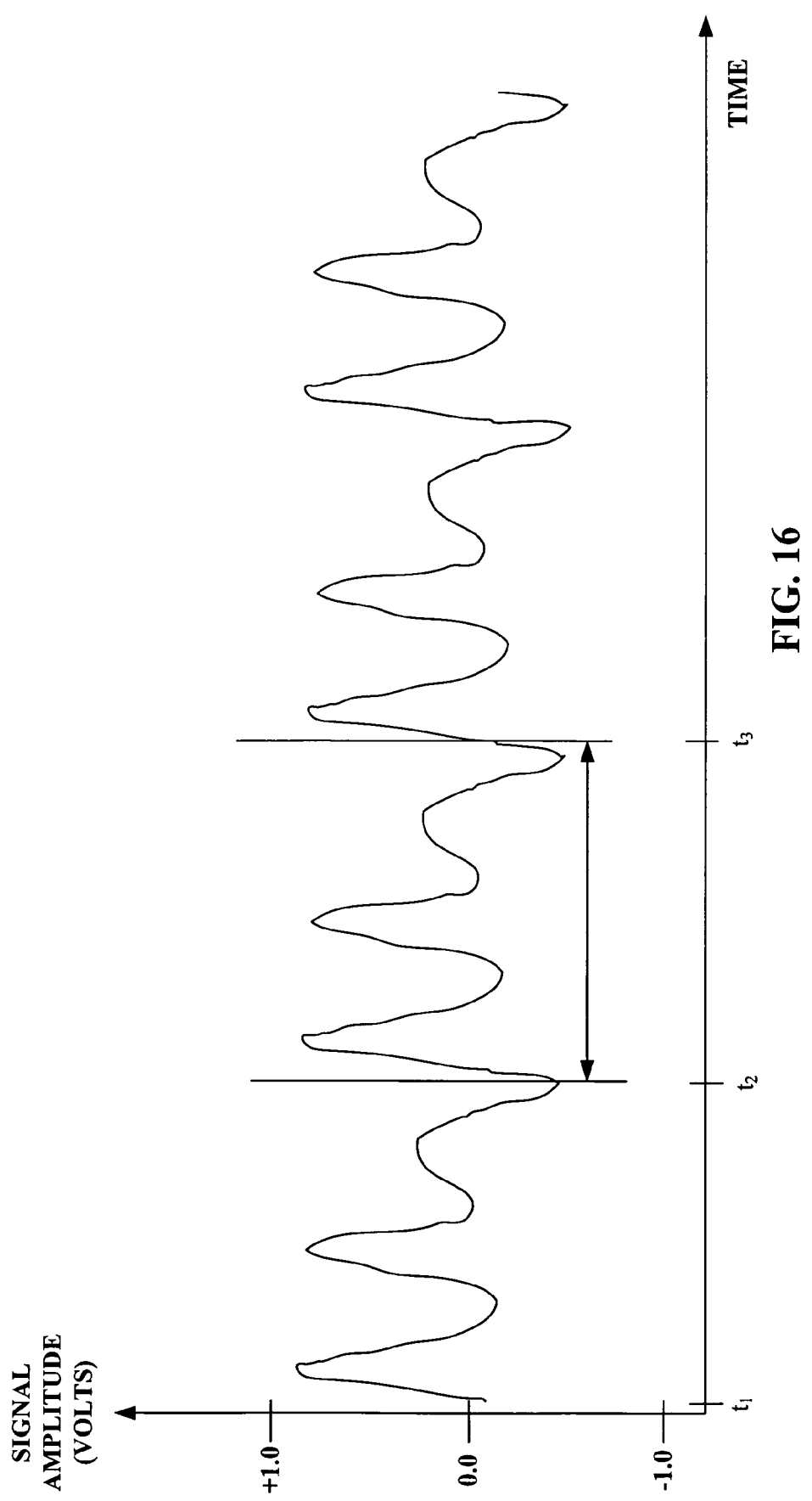
FIG. 16 is a timing diagram illustrating a speech signal, wherein portions of the speech signal may repeat.

FIG. 16 illustrates a speech signal plotted over time. The vertical axis represents the amplitude of the signal; and horizontal axis represents time. Note, the speech signal has a distinctive pattern, wherein portions of the speech signal repeat over time. In this example, the speech signal includes a first segment from time $t_1$ to $t_2$, which repeats as a second segment during $t_2$ to $t_3$. When such repetition of a segment is found, one of the segments or more, such as that from time $t_2$ to time $t_3$, may be eliminated with little or effectively no impact on the playback quality of the sample.

In one example, Equation 4, as given hereinbelow, may be used to find a relationship between the two segments of speech. Correlation is a measure of the strength of the relationship between the two segments. Equation 4 provides an absolute and bounded correlation factor (from −1 to +1) as a measure of the strength of the relationship, wherein a low negative number reflects a weaker relation, i.e., less correlation, than a high positive number, which reflects a stronger relation, i.e., more correlation. If application of Equation 4 indicates "good similarity," time warping is performed. If application of Equation 4 shows little similarity, artifacts may be present in a merged segment of speech. The correlation is given as:

$$Corr(d) = \frac{\sum_i [(x(i) - mx) \times (y(i-d) - my)]}{\sqrt{\sum_i (x(i) - mx)^{\wedge}2} \sqrt{\sum_i (y(i-d) - my)^{\wedge}2}} \quad (4)$$

In Equation 4, x and y represent the two segments of speech, m represents the window over which the correlation between the two segments is being calculated, d represents the correlation portion and i is an index. If application of Equation 4 indicates segments may be merged without introducing artifacts, merging may be done using an "add-overlap" technique. The add-overlap technique combines the compared segments and produces one speech segment out of two separate speech segments. The combination using add-overlap may be based on an equation such as Equation 5, given as:

a) $OutSegment[i] = \dfrac{(Segment1(i) * (WindowSize - i)) + (Segment2(i) * i)}{WindowSize}$ (5)

b) $OutSegment[i] = \dfrac{(Segment2(i) * (WindowSize - i)) + (Segment1(i) * i)}{WindowSize}$ $i = 0..WindowSize - 1$ $WindowSize = RWindowSize$ The resultant samples may be Pulse Code Modulation (PCM) samples. Each PCM sample has a predetermined format defining the bit length and format of the PCM sample. For example, a 16 bits signed number may be the format to represent a PCM sample. The add-overlap technique produced by application of Equation 5 includes weighting to provide a smooth transition between the first PCM sample of Segment1 and the last PCM sample of Segment2. In Equation 5, "RWindowSize" is the number of PCM samples in a reference window and "OutSegment" is the size of the resulting add-overlapped segment. "WindowSize" is equal to the reference window size and "Segment" is the target segment size. These variables are determined depending on the sampling rate, frequency content of speech and desired tradeoff between quality and computational complexity.

Figure 17A:
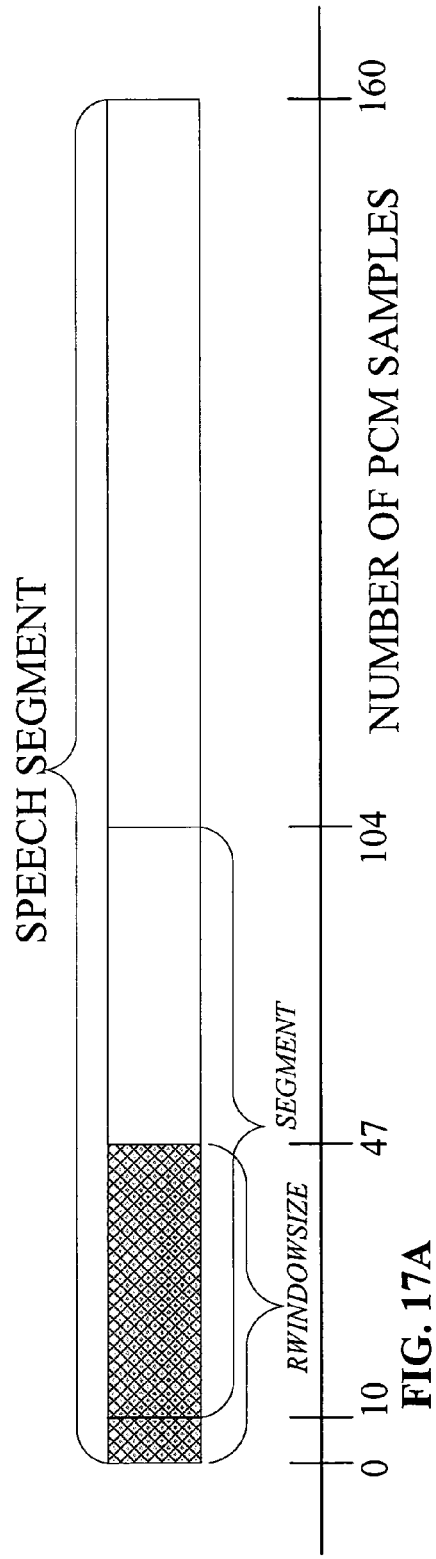
FIG. 17A is a diagram illustrating a speech segment, wherein the number of PCM samples in a reference window for an add-overlap operation, referred to as RWindowSize, is identified, and wherein a target or desired segment size, referred to as Segment, is identified.

The add-overlap technique described above is illustrated in FIGS. 17A and 17B. In FIG. 17A, a speech segment made up of 160 PCM samples is shown. In this example, RWindowSize is represented by PCM samples 0-47. In other words, PCM samples 0-47 correspond to the number of samples in the reference window of size WindowSize. Segment refers to the size of the target search area and is represented by PCM samples 10-104. In this example, PCM samples 0-47 are compared to samples 10-104, one PCM sample at a time, to find the best correlation between the reference samples and the target search area. The location within the target search area where maximum correlation is found is referred to as an "offset." At the point of offset, RWindowSize may be combined with the portion of Segment corresponding to the size of RWindowSize. The speech segment corresponding to PCM samples 104-160 is left untouched.

Figure 17B:
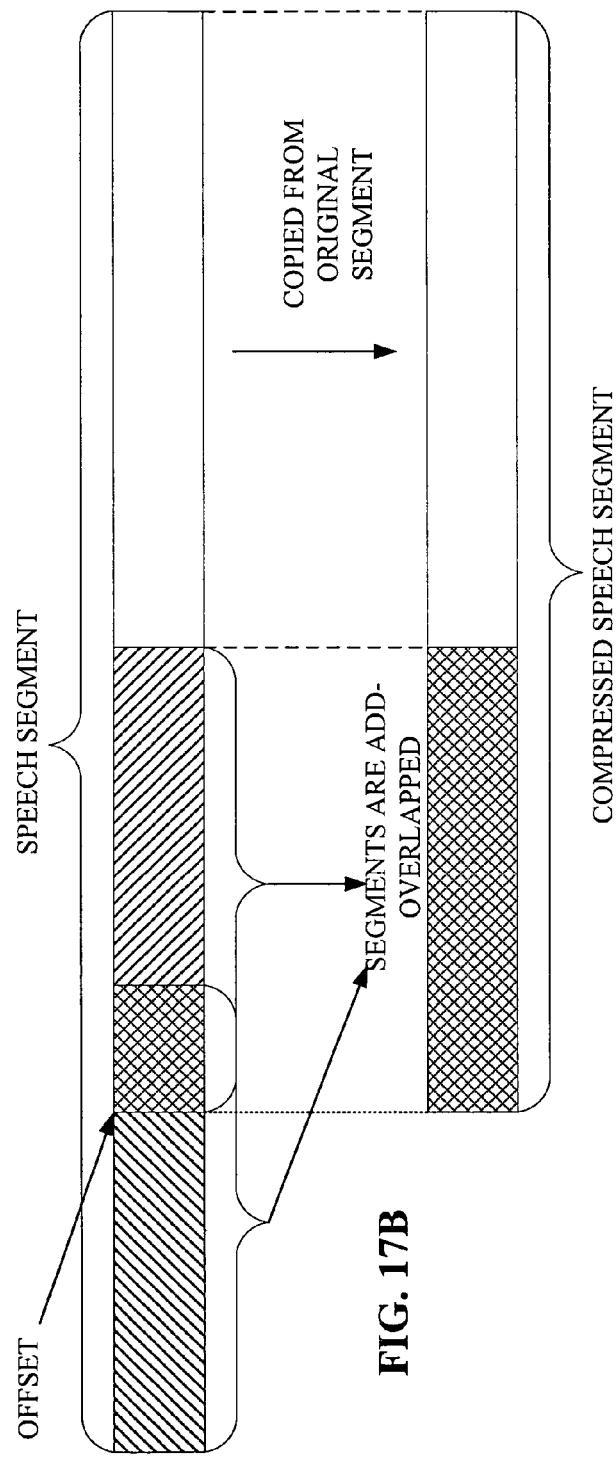
FIG. 17B is a diagram illustrating application of an add-overlap operation to compress the speech segment according to one example.

In FIG. 17B, the first RWindowSize samples of the speech segment are compared to subsequent portions of the speech segment one PCM sample at a time. The location where maximum correlation is found between RWindowSize and a corresponding length of samples within the target search area (Segment) is the "offset." The length of the offset is the distance from the beginning of the speech segment to the point of maximum correlation between RWindowSize and Segment. Once maximum correlation is found, RWindowSize is merged (at the point of offset) with a corresponding length Segment. In other words, add-overlap is performed by adding RWindowSize to a portion of Segment of the same length. This is done at the point of offset as illustrated. The rest of samples are copied from the original segment as illustrated. The resulting speech segment consists of the remaining samples copied as-is from the original speech segment, appended to the merged segment as illustrated. The resulting packet is shorter than original segment by the length of the offset. This process is referred to as speech compression. The lesser a speech segment is compressed, the lower the probability that a person may detect any degradation in quality.

Speech expansion is performed when the de-jitter buffer contains a low number of voice packets. The probability of underflows is increased if the de-jitter buffer has a low number of packets. The de-jitter buffer may feed an erasure to the decoder when an underflow occurs. This however, leads to degradation in voice quality. In order to prevent such a degradation in voice quality, the playback of the last few packets in the de-jitter buffer may be delayed. This is accomplished by expanding the packets.

Speech expansion may be accomplished by repeating multiple PCM samples of a speech segment. Repeating multiple PCM samples while avoiding artifacts or pitch flatness is accomplished by working with more PCM speech samples than when speech time compression is performed. For instance, the number of PCM samples used to implement speech expansion may be double of the number of PCM samples used in speech time compression. The additional PCM samples may be obtained from the previous packet of speech played.

Figure 18A:
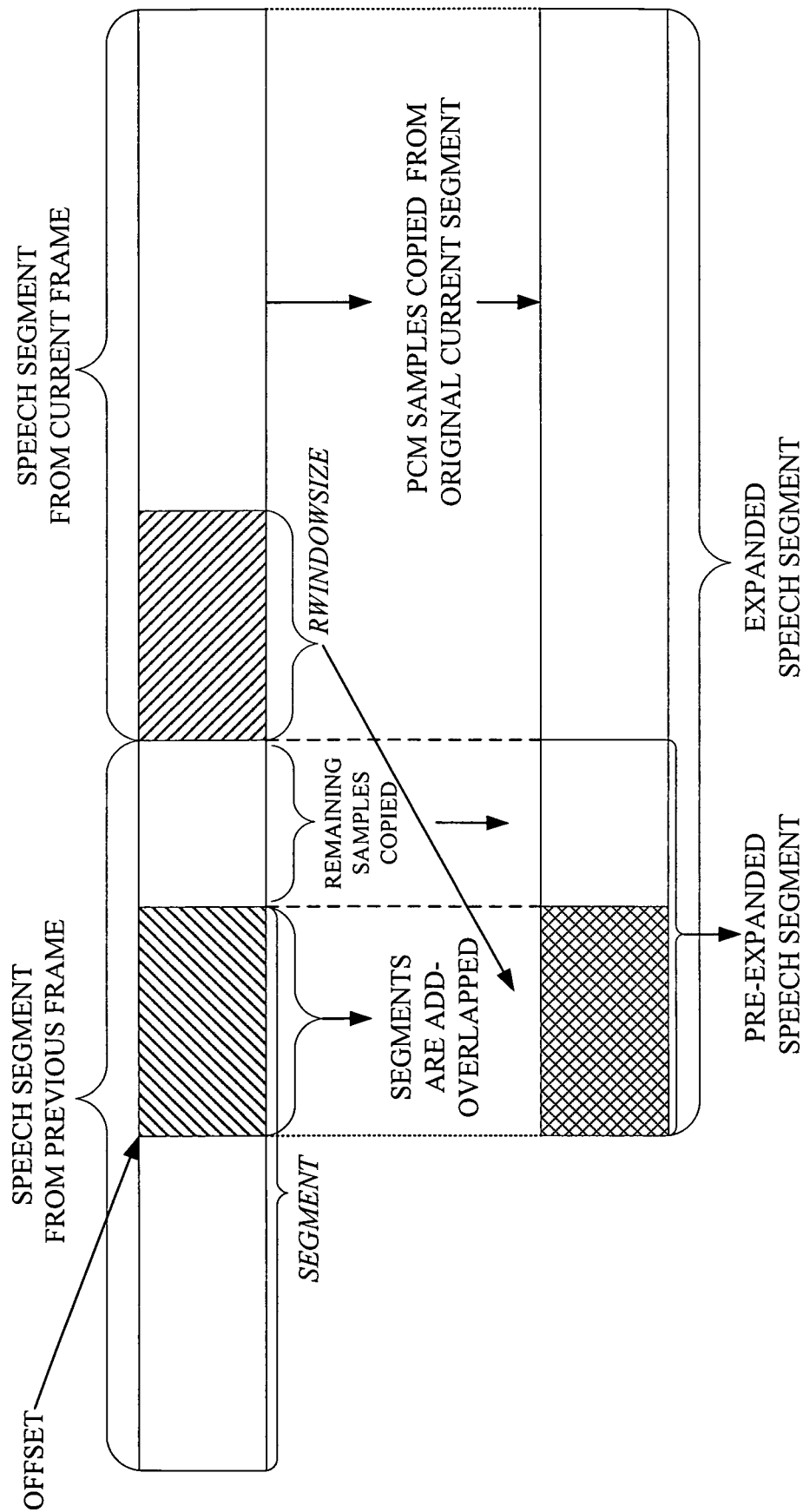
FIG. 18A is a diagram illustrating a multiple speech segments, wherein the number of PCM samples in a reference window for an add-overlap operation, referred to as RWindowSize, is identified, and wherein a target or desired segment size, referred to as Segment, is identified in preparation for expansion of a current speech segment.

FIG. 18A illustrates one example of speech expansion, wherein each packet or speech segment is 160 PCM samples long and a "pre-expanded" speech segment is generated. In this example, two segments of speech are compared; a "current" speech segment and a "previous" speech segment. The first RWindowSize PCM samples of the current speech segment are selected as reference samples. These RWindowSize samples are compared to Segment of a previous packet of speech, wherein a point of maximum correlation (or offset) is determined. The RWindowSize PCM samples are add-overlapped with a corresponding size of Segment within the previous packet at the offset point. A pre-expanded speech segment is created by copying and appending the rest of the samples from the previous speech segment to the add-overlapped segment as illustrated in FIG. 18A. The length of the expanded speech segment is then the length of the pre-expanded segment plus the length of the current speech segment as illustrated in FIG. 18A. In this example, the PCM samples are offset from the beginning of a speech segment.

Figure 18B:
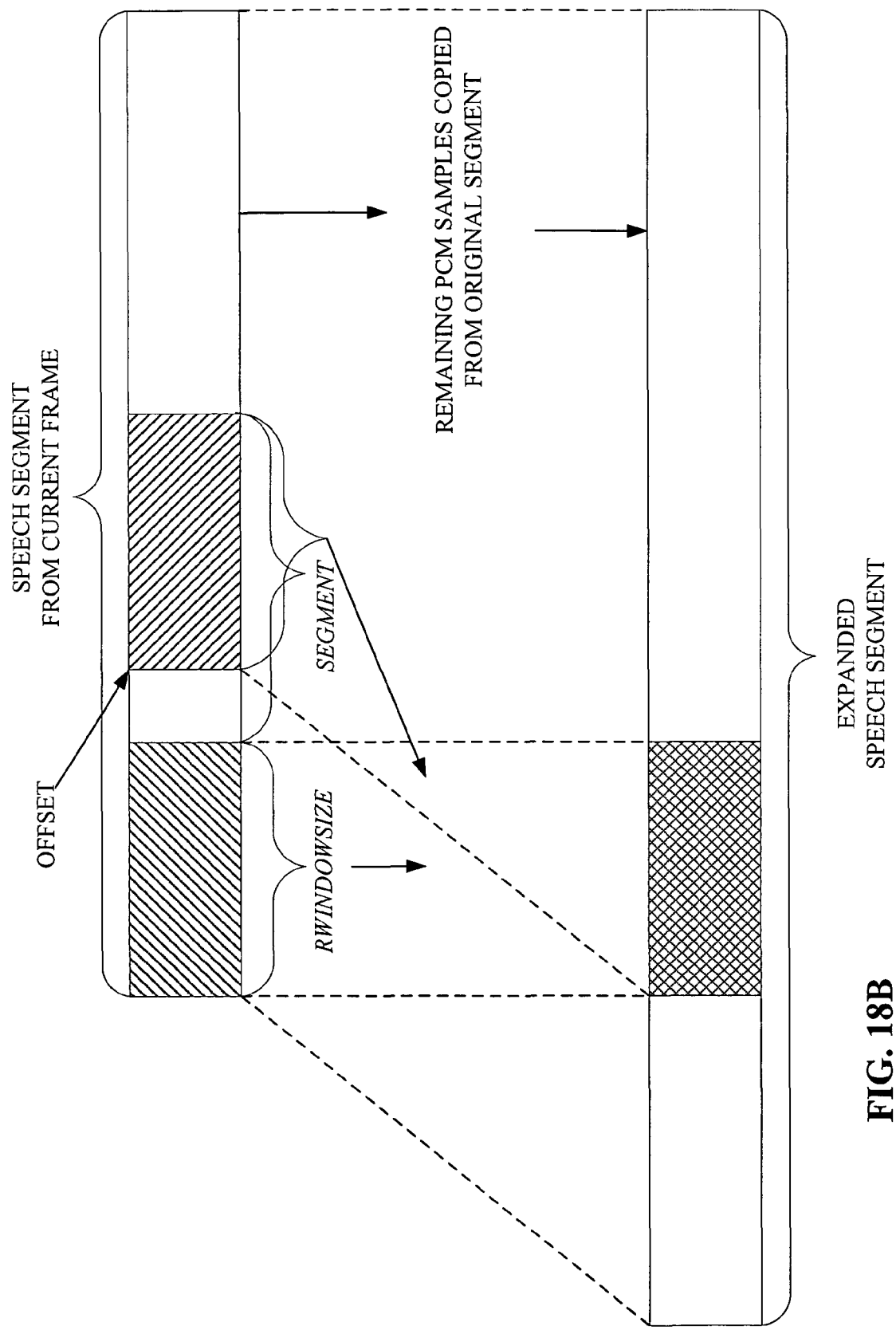
FIG. 18B is a diagram illustrating application of an add-overlap operation to expand a speech sample according to one example.

In another example, the current packet or speech sample is expanded as illustrated in FIG. 18B. The reference samples, RWindowSize, are located at the beginning of the current speech segment. RWindowSize is compared to the rest of the current speech packet until a point of maximum correlation (offset) is located. The reference samples are add-overlapped with the corresponding PCM samples found to have maximum correlation within the current speech segment. The expanded speech segment is then created by copying the PCM samples starting at the beginning of the packet to the point of offset, appending the add-overlapped segment to this and copying and appending the remaining PCM samples, unmodified, from the current packet. The length of the expanded speech segment is equal to the sum of the offset plus the length of the original packet.

Figure 18C:
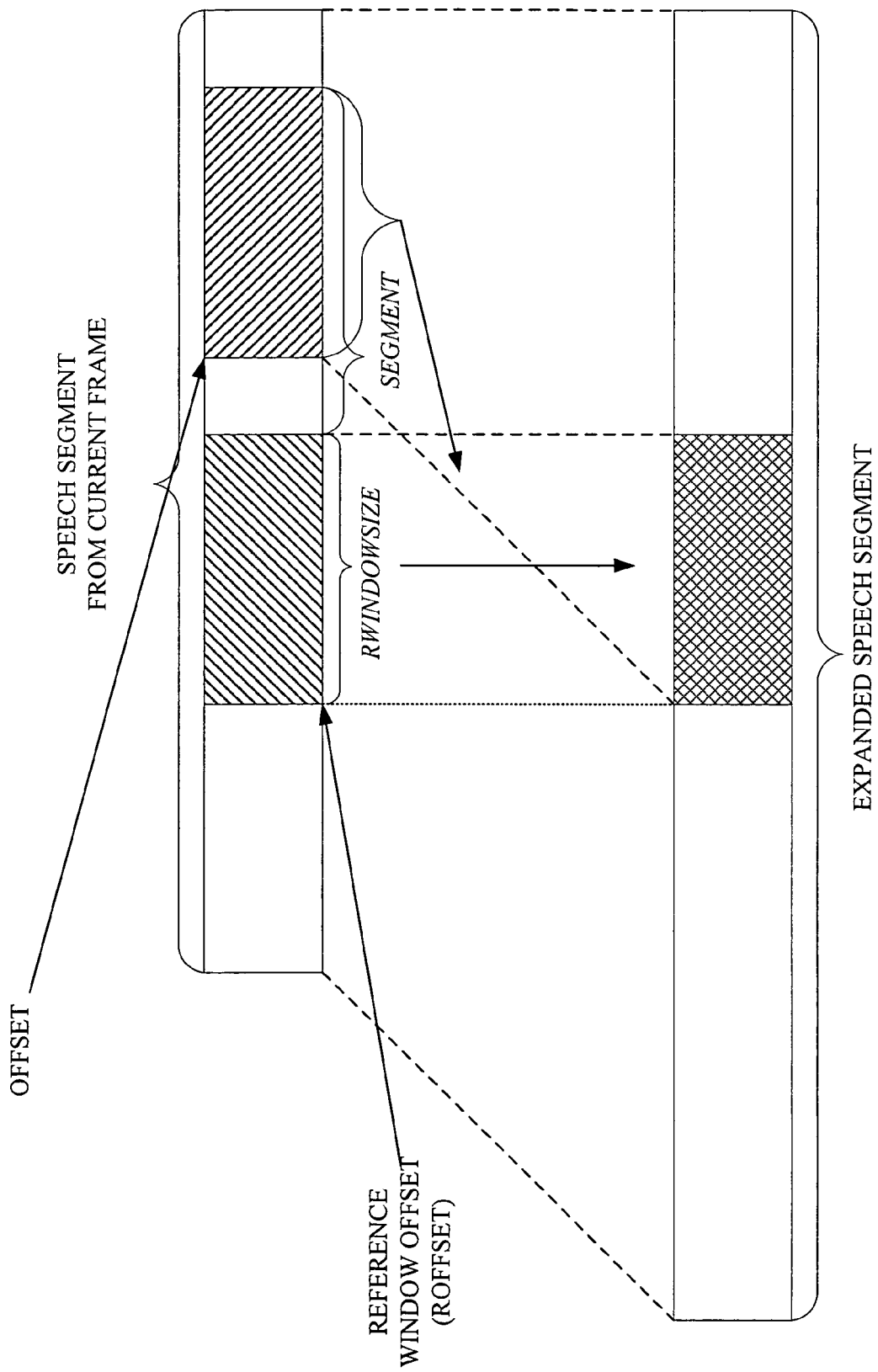
FIG. 18C is a diagram illustrating application of an operation to expand a speech sample according to an alternate example.

In another example, speech is expanded as illustrated in FIG. 18C, wherein RWindowSize is embedded within the current packet or speech segment and does not occur at the beginning of the packet. Roffset is the length of the speech segment corresponding to the distance between the beginning of the current packet to the point at which RWindowSize begins. RWindowSize is add-overlapped with the corresponding size of PCM samples in the current packet found at the point of maximum correlation. The expanded speech segment is then created by copying the PCM samples starting at the beginning of the original or a current packet and ending at the offset and appending the add-overlapped segment and the remaining PCM samples from the original packet. The length of the resulting expanded speech segment is the length of the original packet plus the offset minus Roffset samples, i.e. the number of PCM samples in Roffset as defined above.

Filtered Time Warping Thresholds

To avoid oscillating decisions of compression an expansion, when the number of packets stored in the adaptive de-jitter buffer varies quickly, variables used to evaluate the status of the adaptive de-jitter buffer, i.e., number of packets stored in the adaptive de-jitter buffer, one example filters such variables over a sampling window. The status of the adaptive de-jitter buffer may refer to the number of packets stored in the adaptive de-jitter buffer or any variables used to evaluate the data stored in the adaptive de-jitter buffer. In a system supporting burst data delivery, IS-856 referred to as 1xEV-DO, packet delivery to a given receiver is time division multiplexed on the forward link the receiver may receive several packets at one instance, followed by no packets for some time. This results in receipt of data in bursts at the adaptive de-jitter buffer of the receiver. The received data is effectively subject to "bundling," wherein there may be instances of two or more packets arriving close together in time. Such bundling may easily result in oscillations between expansion and compression of packets, wherein the adaptive de-jitter buffer provides time warping instructions in response to the rate of received data and the status of the buffer. For instance, consider an example wherein the calculated value (delay or length) of the de-jitter buffer is 40 ms at the beginning of a talkspurt. At a later time, the de-jitter buffer loading falls below the expansion threshold, resulting in a decision to expand a data packet. Immediately after the playback of this packet, a bundle of three packets arrives; the arriving data fills the de-jitter buffer size such that the compression threshold is exceeded. This will cause packets to be compressed. Since the arrival of a bundle of packets may be followed by no packet arrivals for some time, the de-jitter buffer may again be depleted, causing packets to be expanded. This kind of toggling between expansion and compression may cause a high percentage of packets to be time warped. This is undesirable since we would like to restrict the percentage of packets whose signal information has been modified due to time warping to a small value.

One example avoids such oscillations by smoothing out the effects bundling may have on the adaptive control of the adaptive de-jitter buffer and on time warping and playback of data. This example uses average values in determining when to time warp. The averages are calculated by filtering the variables used in such calculations. In one example, the compression and expansion thresholds are determined by filtering or averaging the size of the de-jitter buffer. Note that the size of the buffer refers to the current status of the buffer.

Comparing the filtered value of the size of the buffer to the expansion threshold may result in a higher number of underflows since some packets which would have been expanded using an unfiltered value, are not expanded using a filtered value. On the other hand, comparing a filtered value to the compression threshold may serve to dampen most of the oscillations (or toggling between time warp controls) with minimal or effectively no negative impact. Therefore, the compression and expansion thresholds may be treated differently.

In one example, the instantaneous value of the size of the adaptive de-jitter buffer is checked against the expansion threshold. In contrast, a filtered value of the de-jitter buffer is checked against the compression threshold. One configuration uses an Infinite Impulse Response (IIR) filter to determine the average size of the adaptive de-jitter buffer, wherein the adaptive de-jitter buffer has a filtered value which may be recomputed periodically, such as once every 60 ms. The filter time constant may be derived from bundling statistics and an example for this for 1xEV-DO Rev A may be 60 msec. The bundling statistics are used to derive the filter time constant because they have a strong correlation to how the instantaneous de-jitter buffer size oscillates during operation.

Expansion Due to Missing Packet

Figure 19:
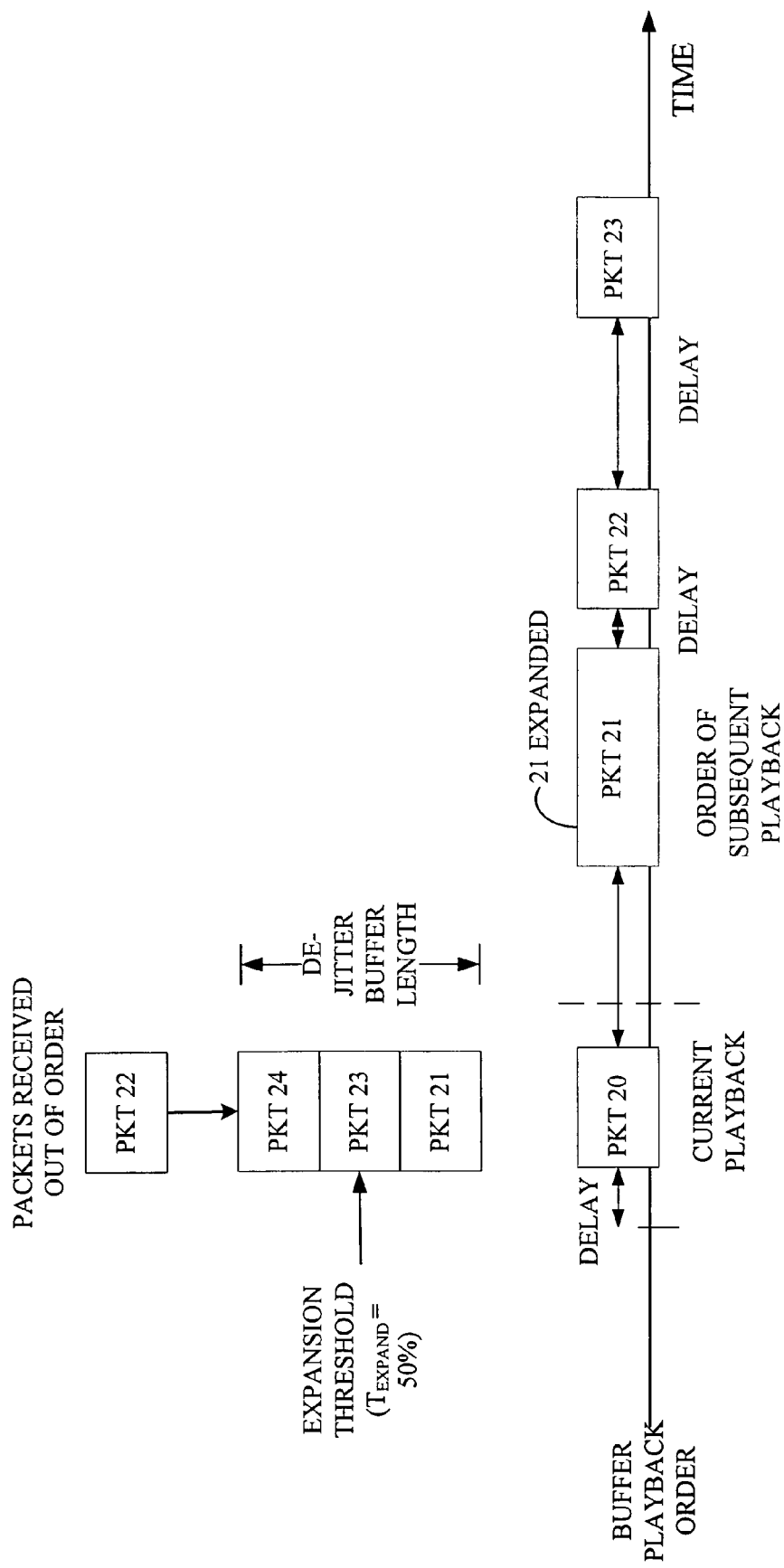
FIG. 19 is a diagram illustrating expansion of packets to allow for the arrival of delayed packets and packets that arrive out of order as is the case in a Hybrid ARQ re-transmission.

As noted hereinabove, the adaptive de-jitter buffer and the various methods for controlling the adaptive de-jitter buffer and controlling time warping of received data may be adapted to the specific system specifications and operating conditions. For communications systems implementing a repeat request scheme to improve performance, such as a Hybrid Automatic Repeat Request (H-ARQ) scheme, such repeat processing has implications on how a speech packet is expanded. Specifically, H-ARQ may cause packets to arrive reordered (i.e. out of order). Consider FIG. 19, illustrating a de-jitter buffer of a certain length and expansion threshold, $T_{Expand}$, given as 50% of the target de-jitter buffer length. The current packet being played back has sequence number 20, PKT 20. The de-jitter buffer contains three packets having sequence numbers 21, 23 and 24, identified as PKT 21, PKT 23 and PKT 24, respectively. When a playback utility requests the next packet after playing back PKT 20, the expansion threshold does not trigger as the de-jitter buffer contains packets sufficient to maintain a buffer length at more than 50% of the calculated de-jitter buffer length. In the present example, PKT 21 is therefore not expanded. This may cause an underflow if PKT 22 does not arrive by the time PKT 21 finishes playback, as packets are played back in sequence and therefore the playback utility may not play back PKT 23 before PKT 22. Even though the expansion threshold did not trigger, one example anticipates the discontinuity in the received packets and selects to expand PKT 21 to allow more time for PKT 22 to arrive. In this way, expansion of PKT 21 may avoid a missing packet and an erasure. Thus, a packet may be expanded even if the de-jitter buffer length is above the expansion threshold $T_{Expand}$.

The conditions under which packets are to be expanded may be enhanced. As described hereinabove, a packet may be expanded if the de-jitter buffer size is below the expansion threshold. In another scenario, a packet may be expanded if the packet having the next sequence number is not present in the de-jitter buffer.

As previously mentioned, the de-jitter buffer delay may be calculated at the beginning of a talkspurt. Since network conditions, including but not limited to channel conditions and loading conditions, may change during a talkspurt, particularly during a long talkspurt, one example is configured to change the de-jitter buffer delay during a talkspurt. Thus, the de-jitter buffer equations given hereinabove may be recalculated periodically, every CHANGE_JITTER_TIME seconds during a talkspurt. Alternately, the variables may be recalculated on a triggering event, such as a significant change in operating conditions, loading, air interface indications or other event. In one example, the value of CHANGE_JITTER_ TIME may be set to 0.2 sec (200 ms).

The time warping thresholds, e.g., compression and expansion thresholds may provide guidance on how to change values during talkspurts. Normal operation refers to operation of the receiver when the adaptive de-jitter buffer status is between the compression and expansion thresholds and around a target de-jitter buffer length. Each threshold acts as a trigger. When a threshold is reached or violated, the packets in the adaptive de-jitter buffer may be expanded or compressed depending on the threshold. The size of the adaptive de-jitter buffer may continue to expand or contract as it receives packets. This constant change in the size of the adaptive de-jitter buffer indicates the expansion and compression thresholds may be continuously approached during communication. In general, the system attempts to keep the adaptive de-jitter buffer size between the expansion and compression thresholds which is considered a stable state. In the stable state the size of the adaptive de-jitter buffer is not changed; and a change in the receipt of packets, and thus a change in the adaptive de-jitter buffer size, may automatically cause the compression/expansion threshold to trigger and compress/expand packets, respectively, until the new adaptive de-jitter buffer delay is achieved. In this scenario, the adaptive de-jitter buffer target delay length is updated is according to the CHANGE_JITTER_TIME. The actual size of the de-jitter buffer may not necessarily be calculated, as the de-jitter buffer size changes automatically when triggered as a result of reaching either the time warping expansion/compression thresholds. In one example, the value of CHANGE_ JITTER_TIME may be set to 0.2 sec (200 ms).

Handoff Pre-Warping

Handoffs are typically accompanied by loss of coverage for a short amount of time. When handoff is imminent, the AT may experience poor channel conditions and increased packet delays. One example processes handoff conditions in a special manner applying time warping to speech packets. As soon as the AT decides to handoff to a new base station, this information may be used to control the de-jitter buffer. Upon receiving this handoff signal, the AT enters a "pre-warping" mode, such as illustrated in pre-warping mode 244 of FIG. 8B. In this mode, the AT expands packets until one of two conditions is met. Under the first condition, the de-jitter buffer continues to accumulate packets and the cumulative expansion results in a de-jitter buffer size of PRE_WARPING_EXPANSION. In other words, expansion of packets is performed until PRE_WARPING_EXPANSION is reached.

Alternatively, under a second condition, a time period WARPING_TIME has been satisfied. A timer starts on receipt of a handoff signal or outage indicator; the timer expires at WARPING_TIME. Once one of these two conditions has been satisfied, the AT exits the pre-warping mode. During the pre-warping mode, no packets are compressed unless the End_Talkspurt condition (described later) is satisfied because the de-jitter buffer will want to accumulate enough packets to send them at regular intervals to the playback utility. In an example wherein packets are expected at regular intervals, for instance 20 ms, the value of PRE_WARPING_EXPANSION may be set to 40 ms and that of WARPING_TIME to be equivalent to 100 slots (166 ms).

Handoffs are just one form of outage events. The de-jitter buffer may implement a mechanism to handle handoffs or other types of outages. The required information for this is how much de-jitter excess is required to handle the outage (PRE_WARPING_EXPANSION) and how long the de-jitter buffer will keep working on this outage avoidance mode (WARPING_TIME).

Counting Delayed Underflows

Since the adaptive de-jitter buffer equations provided hereinabove are designed to target a percentage of delayed underflows, it is desirable to accurately measure the number of delayed underflows. When an underflow occurs, it is not known whether the underflow was caused due to packet delay or due to a packet dropped somewhere in the network, i.e., in transmission path. There is a need therefore, to accurately account for the type of underflow.

In one example, for communications using RTP/UDP/IP, each packet includes an RTP sequence number. Sequence numbers are used to arrange received packets in the order they were transmitted. When an underflow occurs, the RTP sequence number of the packet causing the underflow may be stored in memory, such as in a memory array. If a packet with the identified sequence number arrives later, this underflow is counted as a "delay underflow."

The "delayed underflow rate" is the ratio of the number of underflows to the number of total received packets. The number of underflows and the number of received packets are both set to zero each time the de-jitter buffer equations are updated.

Enhancement to the Beginning and End of a Talkspurt

Figure 20:
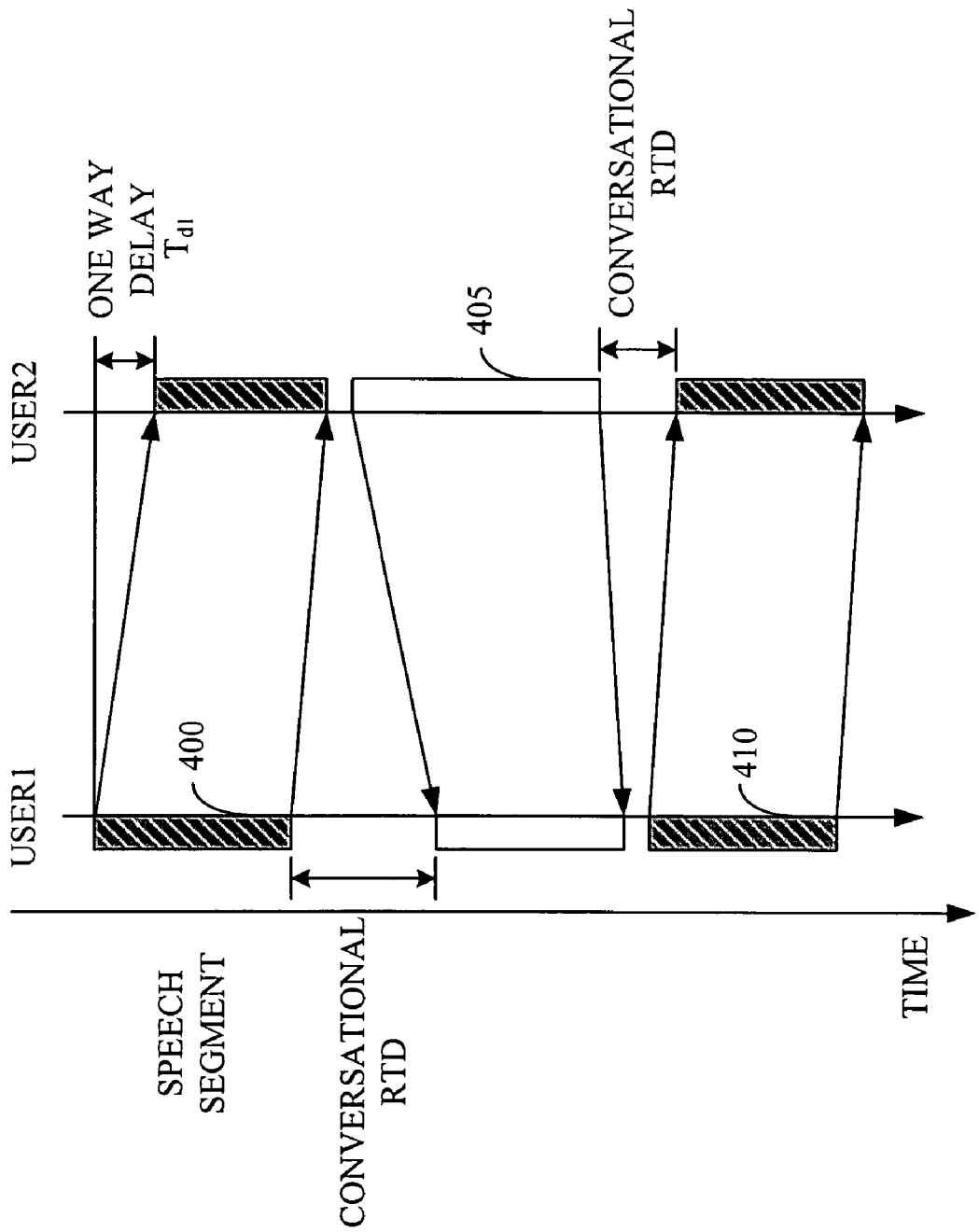
FIG. 20 is a diagram illustrating a timeline of a conversation between two users.

Consider FIG. 20 illustrating the timeline of a conversation between two users. In this graph, the vertical axes represent time. Each user transmits talkspurts and silence periods, which are then received by the other user. For clarity, the shaded block segments 400 and 410 represent talkspurts (speech segments) for User 1. The unshaded block segment 405 represents talkspurts for User 2. The areas outside of the talkspurts on the timeline represent times when the users are not talking, but may be listening to the other user or receiving a silence period. Segment 400 is played back at User 2. Once the speech segment 400 finishes playback at User 2, User 2 waits for a short interval of time before starting to speak. The beginning of User 2's first speech segment 405 is subsequently heard by User 1. The conversational Round Trip Delay (RTD) perceived by User 1 is the time gap between when User 1 stopped speaking to the time when User 1 heard the beginning of User 2's speech segment. Conversational RTD is not a one-way end-to-end delay, but is user specific and significant from the point of view of the users. For instance, if the conversational RTD is too large for User 1, it will prompt User 1 to start speaking again without waiting for User 2's speech segment to be played back. This breaks the flow of conversation and is perceived as conversational quality degradation.

The conversational RTD experienced by User 1 may be changed in different ways. In one example, the time at which the end of User 1's speech segment is played back to User 2 may be changed. In a second example, the time at which the beginning of User 2's speech segment is played back to User 1 is changed. Note, the delays of only the beginning and end of talkspurts influence voice quality in a conversation. A design goal is to further reduce the delays at the beginning and end of talkspurts.

In one example, the goal is to enhance the beginning of a talkspurt. This enhancement may be accomplished by manipulating the first packet of a talkspurt of User 1 such that a listener, User 2, receives the packet sooner than if the defaults adaptive de-jitter buffer delay had been implemented. The delay applied to a packet in an adaptive de-jitter buffer may be the default adaptive de-jitter buffer delay, a calculated value, or a value selected to result in a listener receiving the packet at a particular time. In one example, the timing of a first packet of a talkspurt is varied by recalculating the adaptive de-jitter buffer delay at the beginning of each received talkspurt. When the adaptive de-jitter buffer delay applied to the first packet of a talkspurt is decreased, this first packet is expedited to the listener. When the applied delay is increased, the first packet is received by a listener at a later time. The default de-jitter buffer delay for a first packet may be less than the calculated de-jitter buffer delay and vice versa. In the illustrated example, the de-jitter delay of the first packet of each talkspurt is restricted by a value referred to as MAX_BEGINNING_DELAY, which may be measured in seconds. This value may be a recalculated de-jitter buffer delay or a delay designed to result in the listener receiving the packet at a designated time. The value of MAX_BEGINNING_DELAY may be less than the actual calculated de-jitter buffer delay. When MAX_BEGINNING_DELAY is less than the calculated delay of the de-jitter buffer and is applied to the first packet of a talkspurt, subsequent packets of the talkspurt will be expanded automatically. Automatic expansion of subsequent packets occurs because a de-jitter buffer may not receive packets at the same rate that it plays back packets. As the de-jitter buffer plays back packets, the de-jitter buffer decreases in size and the expansion threshold is approached. Once the expansion threshold is reached, expansion is triggered and subsequent packets in the talkspurt are expanded until the de-jitter buffer receives enough incoming packets to exceed the expansion threshold. By implementing a MAX_BEGINNING_DELAY value, the first packet of the talkspurt is received by the listener sooner while subsequent packets are expanded. The listener is satisfied by receipt of the initial packet sooner. Enhancing the beginning of a talkspurt has the potential to increase the number of underflows by a small amount; however, an appropriate value of MAX_BEGINNING_DELAY mitigates this effect. In one example a value of MAX_BEGINNING_DELAY is calculated as a fraction of the actual de-jitter target; as an example, a MAX_BEGINNING_DELAY value of 0.7 of the TARGET DE-JITTER BUFFER LENGTH may lead to an insignificant increase in underflows. In another example, a MAX_BEGINNING_DELAY value may be a fixed number such as 40 ms, which leads to an insignificant increase in underflows, such as for example, in a system supporting 1xEV-DO Rev A.

Expansion of subsequent packets in a talkspurt does not degrade overall voice quality. This is illustrated in FIG. 20, wherein User 2 receives the first packet of a talkspurt from User 1 and the initial or "one way delay" is restricted to a $T_{d1}$. As illustrated, speech segment 400 is received at User 2 without any expansion or compression, speech segment 405, however, is compressed at User 1 on receipt.

Figure 21:
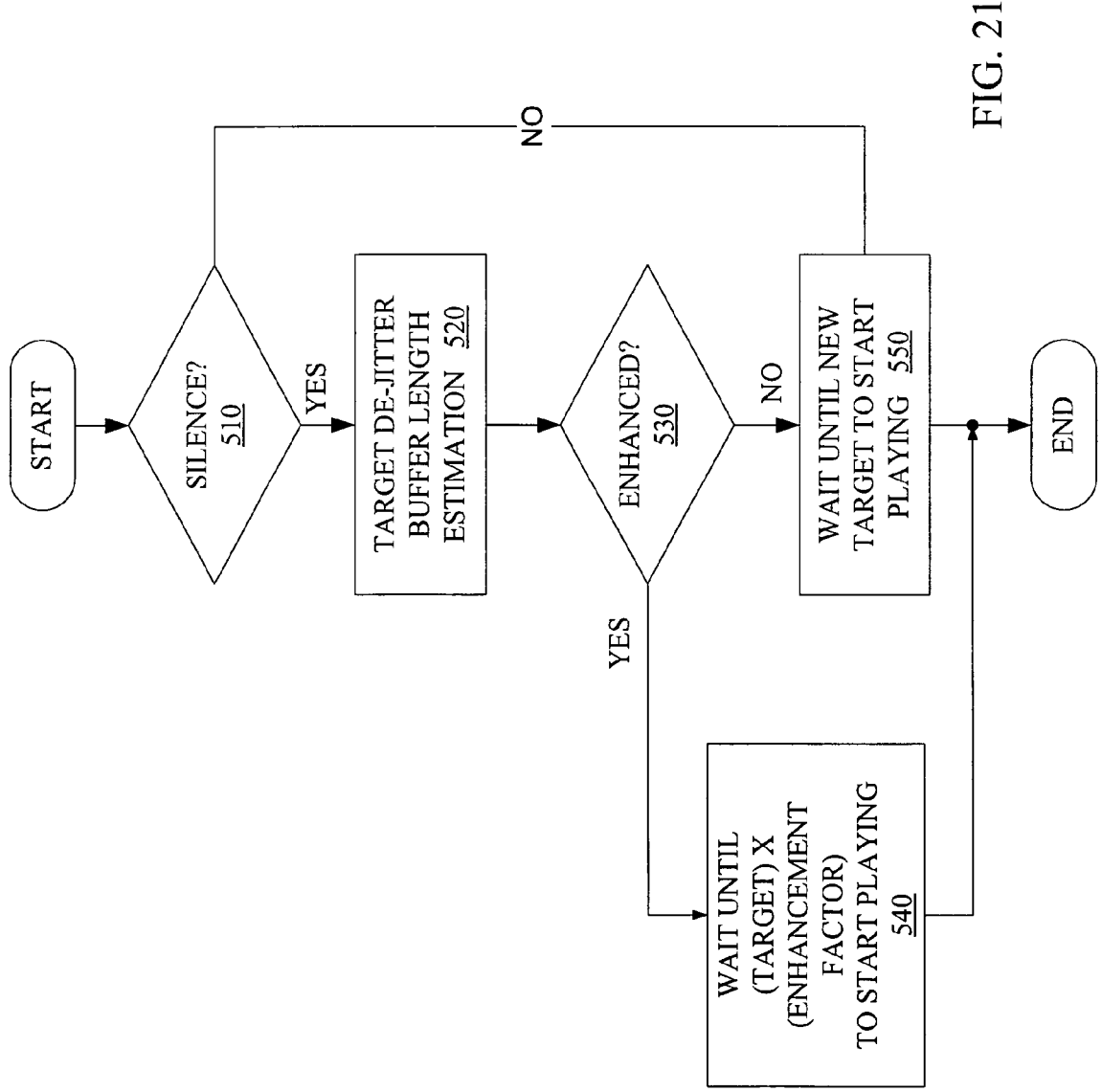
FIG. 21 is a flowchart illustrating enhancement at the beginning of a talkspurt according to one example.

FIG. 21 is a flowchart illustrating the enhancement to the beginning of talkspurts. It is first determined in step 510 whether the system is in silence mode. Silence mode may correspond to a period of silence between talkspurts, or a time when packets are not being received by the de-jitter buffer. If the system is not in silence mode, the process ends. If it is in silence mode, target de-jitter length estimation is performed in step 520. Then, it is determined whether the system is enhanced in step 530. Enhancement, according to one example indicates the calculated target adaptive de-jitter length is greater than a given value, which in one example is given as an enhancement factor such as MAX_BEGINNING_DELAY; the system waits a period equal to the enhancement factor or fraction of the target length to start playing, in step 540. If the system is not enhanced, the system waits for a new target to start playback, in step 550. The value of the new target may be equal to the calculated target de-jitter buffer length or the maximum de-jitter buffer length.

Figure 22:
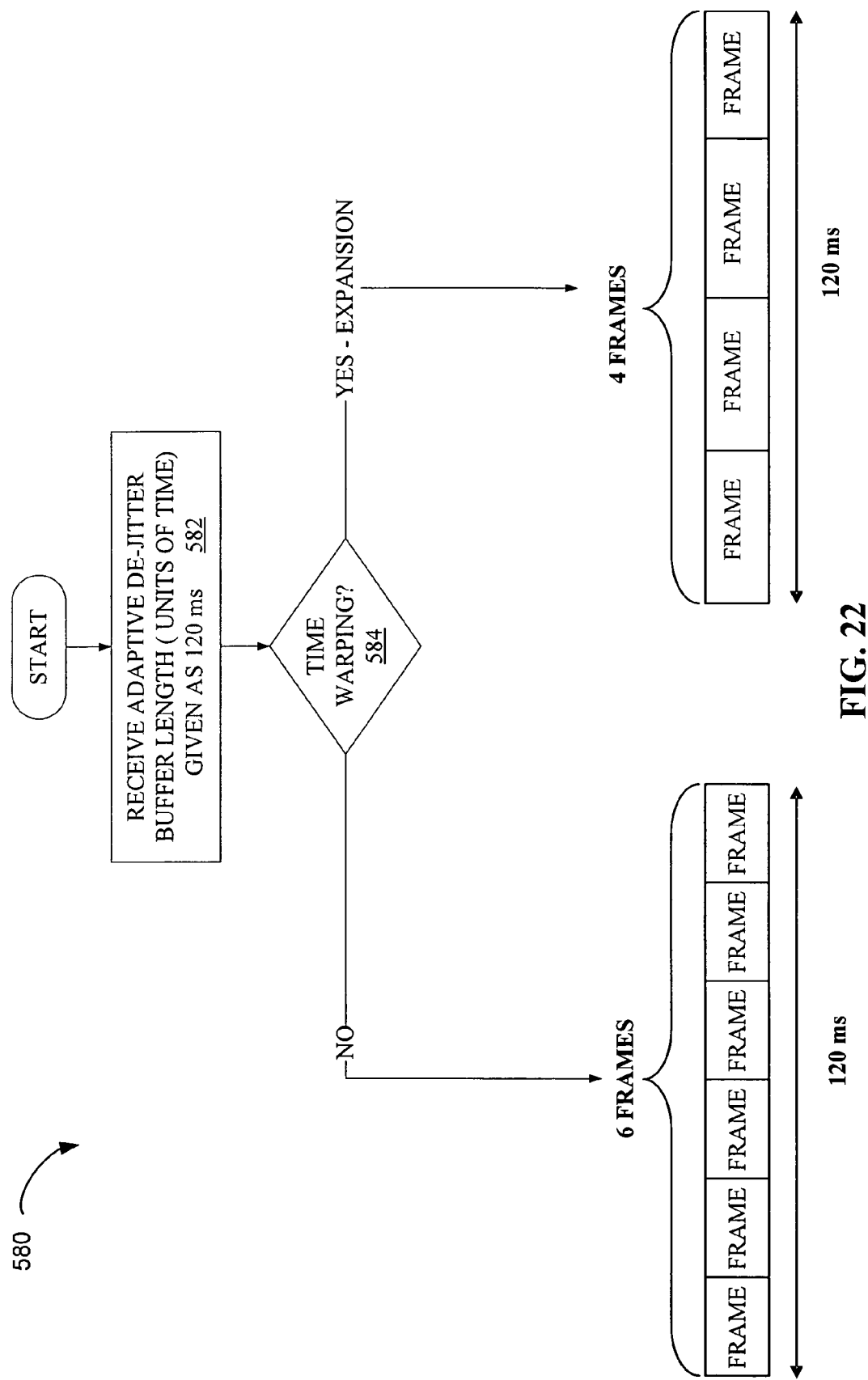
FIG. 22 is a diagram illustrating enhancement at the beginning of a talkspurt according to an alternate example.

FIG. 22 also illustrates enhancement to the beginning of a talkspurt. The process 580 is illustrated starting on identification of a talkspurt. Two scenarios are considered: i) with time warping; and ii) without time warping. In this example, speech packets of 20 ms length are used. Speech packets of any length may be implemented. Here, the adaptive de-jitter buffer waits for 120 ms before playing back packets. This value is the adaptive target de-jitter buffer length and is received from an adaptive de-jitter buffer target estimator at step 582. In the present example, 120 ms is equivalent to receiving six (6) packets, each 20 ms long, without time warping. If time warping is not used at 584, six (6) packets are provided in 120 ms. In the first scenario, therefore, the de-jitter buffer will begin to play back packets after receipt of six packets. This is equivalent in time to 120 ms of delay. In the second scenario, with the implementation of time warping, the de-jitter buffer may expand the first four (4) packets received and begin playing back packets upon receipt of four (4) packets. Thus, even though the de-jitter buffer delay of 80 ms in this case is less than the estimated de-jitter buffer delay of 120 ms, potential underflows may be avoided by expanding the first few packets. In other words, playback of packets may begin sooner with time warping than without time warping. Thus, time-warping may be used to enhance the beginning of a talkspurt without affecting the number of underflows.

Figure 23:
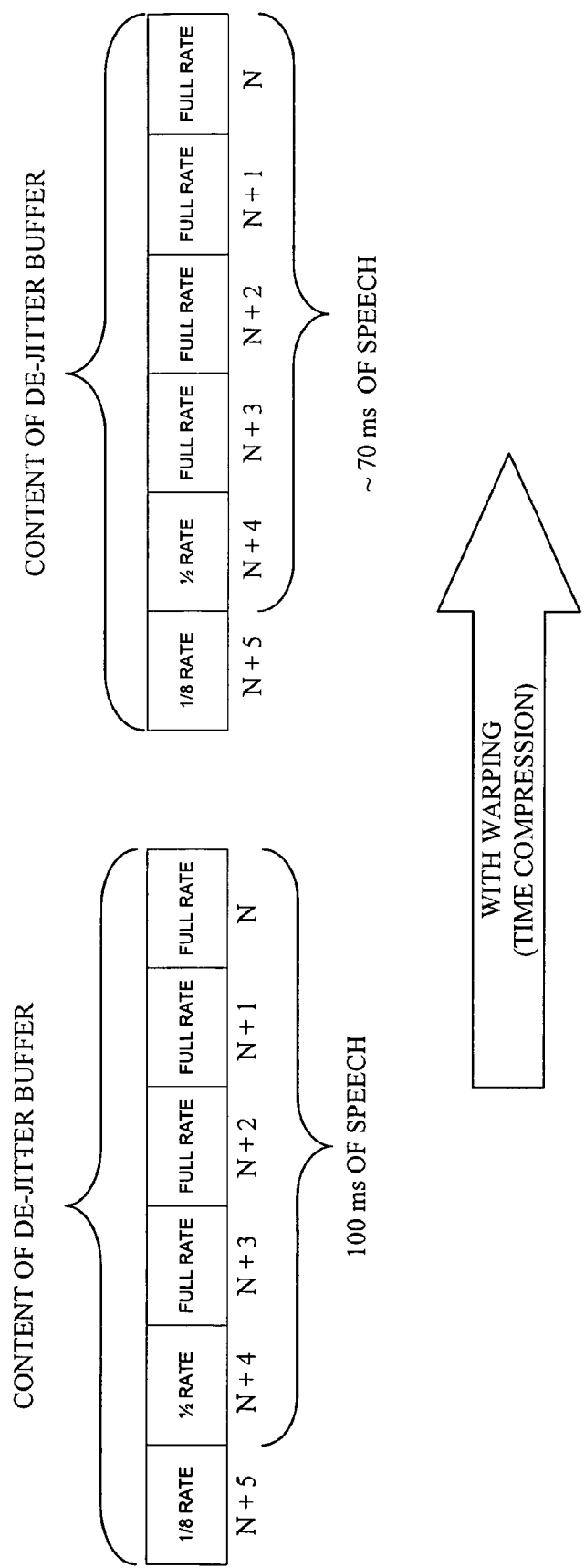
FIG. 23 is a diagram illustrating the enhancement of the end of talkspurts.

In another example, the end of a talkspurt may be enhanced. This is accomplished by compressing the last few packets of a talkspurt, thus reducing the end-to-end delay. In other words, the delay at the end of a talkspurt is made smaller and a second user hears back from a first user faster. Enhancement to the end of a talkspurt is illustrated in FIG. 23. Here, a ⅛ rate packet indicates the end of a talkspurt. This differs from full rate (rate ½), half rate (rate ½) or quarter rate (rate ¼) packets, which may be used to transmit voice data. Other rate packets may also be used for transmission during silence periods or at the end of talkspurts. The implementation of ⅛ rate packets as silence indicator packets in voice communication is described further in co-pending U.S. patent application Ser. No. 11/123,478, priority date Feb. 1, 2005, entitled "METHOD FOR DISCONTINUOUS TRANSMISSION AND ACCURATE REPRODUCTION OF BACKGROUND NOISE INFORMATION."

As illustrated in FIG. 23, without time warping, packets N through N+4 are played back in 100 ms. By compressing the last few packets of the talkspurt, the same packets N through N+4 may be played back in 70 ms instead of 100 ms. The quality of speech may have little or effectively no degradation when time compression is implemented. Enhancement to the end of a talkspurt assumes the receiver has knowledge to identify the end of the talkspurt, and anticipate when the end is approaching.

While sending voice packets over Real-time Transport Protocol (RTP) in one example, an "end of talkspurt" indicator may be set in the last packet of each talkspurt. When a packet is being provided to playback, the packets in the de-jitter buffer are checked for the "end of talkspurt" indicator. If this indicator is set in one of the packets and there are no missing sequence numbers between the current packet being provided to playback and the "end of talkspurt" packet, the packet being provided to the playback is compressed, as well as all future packets of the current talkspurt.

In another example, the system transitions to silence if it is in a talkspurt and either a ⅛ rate packet or a packet with the Silence Indicator Description (SID) bit set is delivered to the playback utility. A ⅛ rate packet may be detected by checking its size. The SID bit is carried in the RTP header. The system transitions to talkspurt if it is in silence, and a packet which is neither ⅛ rate nor has the SID bit set is delivered to playback. Note, in one example, adaptive de-jitter buffering methods as presented herein may be performed when the system is in the talkspurt state, and may be ignored when in a silence period.

Note, this method may correctly discard duplicated packets that arrived late. If a duplicated packet arrives, it will simply be discarded since the first instance of the packet was played back at the appropriate time and its sequence was not saved in the array containing the "delay underflows" candidates.

While sending voice packets over RTP in one example, an "end of talkspurt" indicator may be set in the last packet of each talkspurt. When a packet is being provided to playback, the packets in the de-jitter buffer are checked for the "end of talkspurt" indicator. If this indicator is set in one of the packets and there are no missing sequence numbers between the current packet being provided to playback and the "end of talkspurt" packet, the packet being provided to the playback is compressed, as well as all future packets of the current talkspurt.

Figure 24:
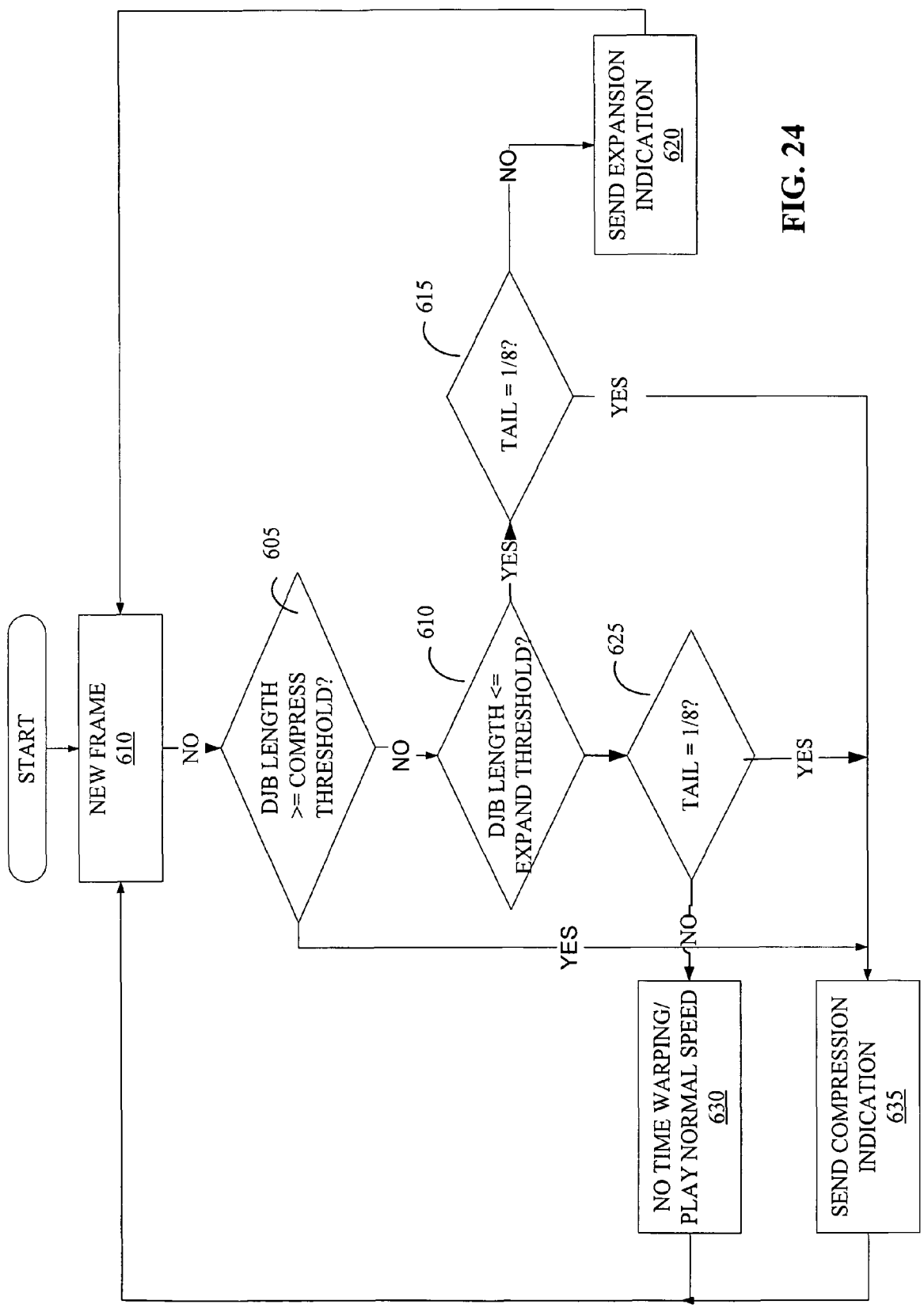
FIG. 24 is a flowchart illustrating enhancement at the end of a talkspurt according to one example.

A flowchart illustrating enhancement to the end of talkspurts according to one example is illustrated in FIG. 24. A new packet begins at step 600. In step 605, if the de-jitter buffer length is greater or equal to the compression threshold, a compression indication is generated in step 635 and the tail is provided to the new packet in step 600. In step 605, if the de-jitter buffer is not greater or equal to the compression threshold, it is determined in step 610 whether the de-jitter buffer length is smaller or equal to the expansion threshold. If it is, step 615 determines whether the tail is equal to a packet rate which may be representative of a silence period or end of talkspurt. In one example, a continuous train of ⅛ rate packets may be sent at constant intervals, e.g. 20 ms, during a silence period or at the end of a talkspurt. In FIG. 24, if it is determined in step 615 that the tail is not equal to a ⅛ rate packet, the segment is expanded in step 620 and returns to the new packet in step 600. Step 625 determines whether the tail is equal to ⅛. In step 625, if the tail is equal to ⅛ rate, a compression indication is generated in step 635. If it is not equal to ⅛ rate, then the playback is normal, without any time warping, in step 630.

Time Warp Quality Optimizer

When a number of consecutive packets are compressed (or expanded), this may noticeably speed up (or slow down) the audio and cause degradation in quality. Such degradation may be avoided by spacing out time-warped packets, i.e., a time-warped packet is succeeded by a few non-time-warped packets before another packet is warped.

If the above spacing out of warped packets is applied to expansion, it can cause some packets that would otherwise be expanded to not be expanded. This can lead to underflows since expansion of packets is carried out when the de-jitter buffer is depleted of packets. Thus, in one example, the above spacing out of warped packets may be applied to compressed packets, i.e., a compressed packet may be followed by a few uncompressed packets before another packet can be compressed. The number of such packets that should not be compressed between two compressed packets may be typically set to 2 or 3.

Set of Conditions to Trigger Time Warping

Described herein are a number of conditions to trigger time warping (expansion/compression) of voice packets. The following is a combined set of rules (in the form of pseudo-code) to determine whether a packet is to be compressed, to be expanded or neither.

If (in Pre-Warping (Handoff Detected) Phase and no End of Talkspurt Detected) and DEJITTER_TARGET+PRE_WARPING EXPANSION not reached)

```
    Expand Packet
End If
Else
    If (End of Talkspurt Detected)
        Compress
    End If
    Else
        If (Compress Threshold Triggered)
            Compress
        End If
        Else If (Expand Threshold Triggered or Next Packet not
        in Queue )
            Expand
        End If
    End If
End If.
```

Figure 25:
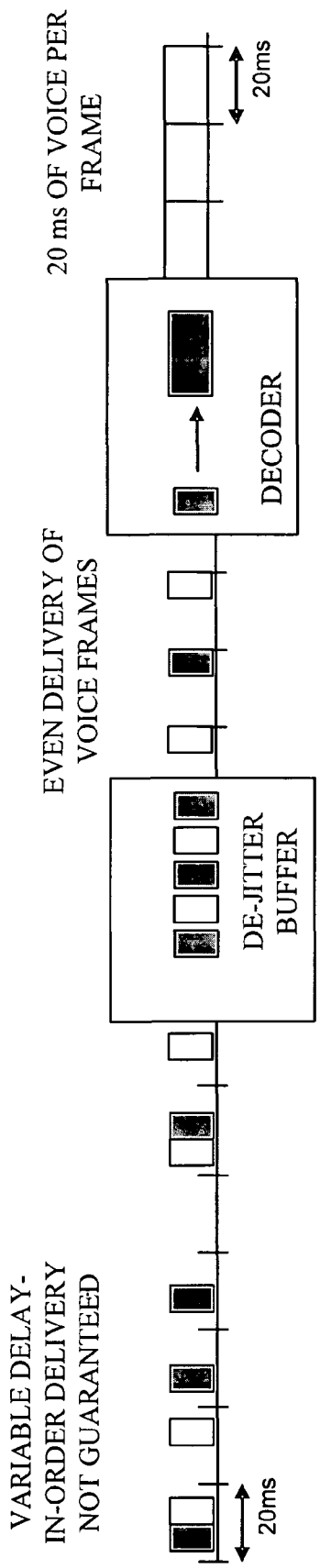
FIG. 25 is a diagram illustrating operation of a prior art de-jitter buffer and decoder system, wherein the de-jitter buffer delivers packets to the decoder at regular time intervals.

FIG. 25 illustrates implementation of a traditional de-jitter buffer coupled with a decoder function. In FIG. 25, the packets are expected to arrive at the de-jitter buffer in 20 ms intervals. It is observed, in this example, that the packets arrive at irregular intervals i.e. with jitter. The de jitter buffer accumulates the packets until a specific de-jitter buffer length is reached such that the de-jitter buffer is not depleted once it begins to send packets out at regular intervals such as 20 ms. At the required de-jitter buffer length, the de-jitter buffer begins to playback the packets at regular intervals of 20 ms. A decoder receives these packets at regular intervals and converts each packet into 20 ms of voice per packet. Alternate examples may choose other time intervals.

Figure 26:
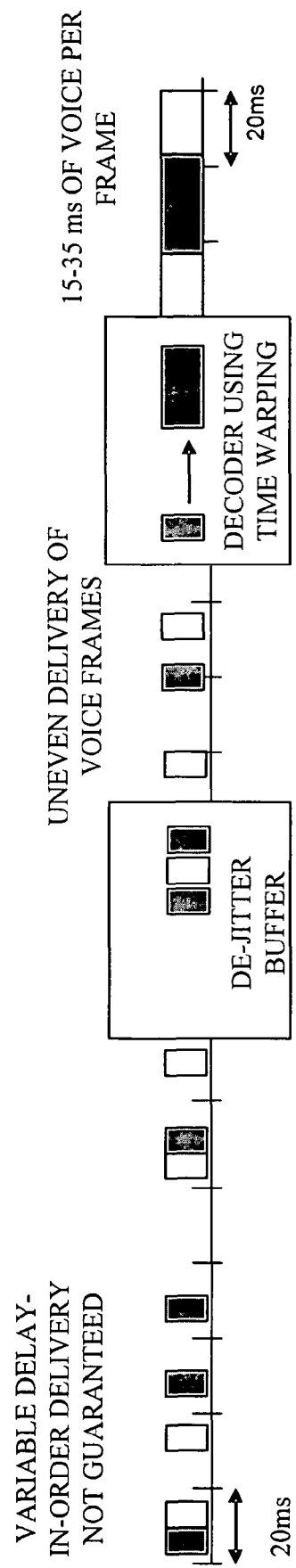
FIG. 26 is a diagram illustrating operation of an adaptive de-jitter buffer and decoder according to one example, wherein the adaptive de-jitter buffer delivers packets to the decoder at uneven time intervals.

FIG. 26, in comparison, illustrates an example of an adaptive de-jitter buffer supporting time warping. Here, the packets arrive at the adaptive de-jitter buffer at irregular intervals. In this case however, the target de-jitter buffer length is much smaller. This is because time warping allows packets to be expanded if the de-jitter buffer begins to deplete thus allowing time for the adaptive de-jitter buffer to become replenished. The decoder may expand packets if the adaptive de-jitter buffer begins to deplete and compress packets if the adaptive de-jitter buffer begins to accumulate too many packets. It is observed that an un-even delivery of voice packets is input into the decoder and time warping unit from the adaptive de-jitter buffer. These packets are allowed to arrive at irregular intervals because with time warping, the decoder converts each packet to a different length voice packet, depending on the arrival time of the original packet. For instance, in this example, the decoder converts each packet into 15-35 ms of voice per packet. Since packets may be played back sooner due to time warping, the required buffer size is smaller, resulting in less latency in the network.

Figure 27:
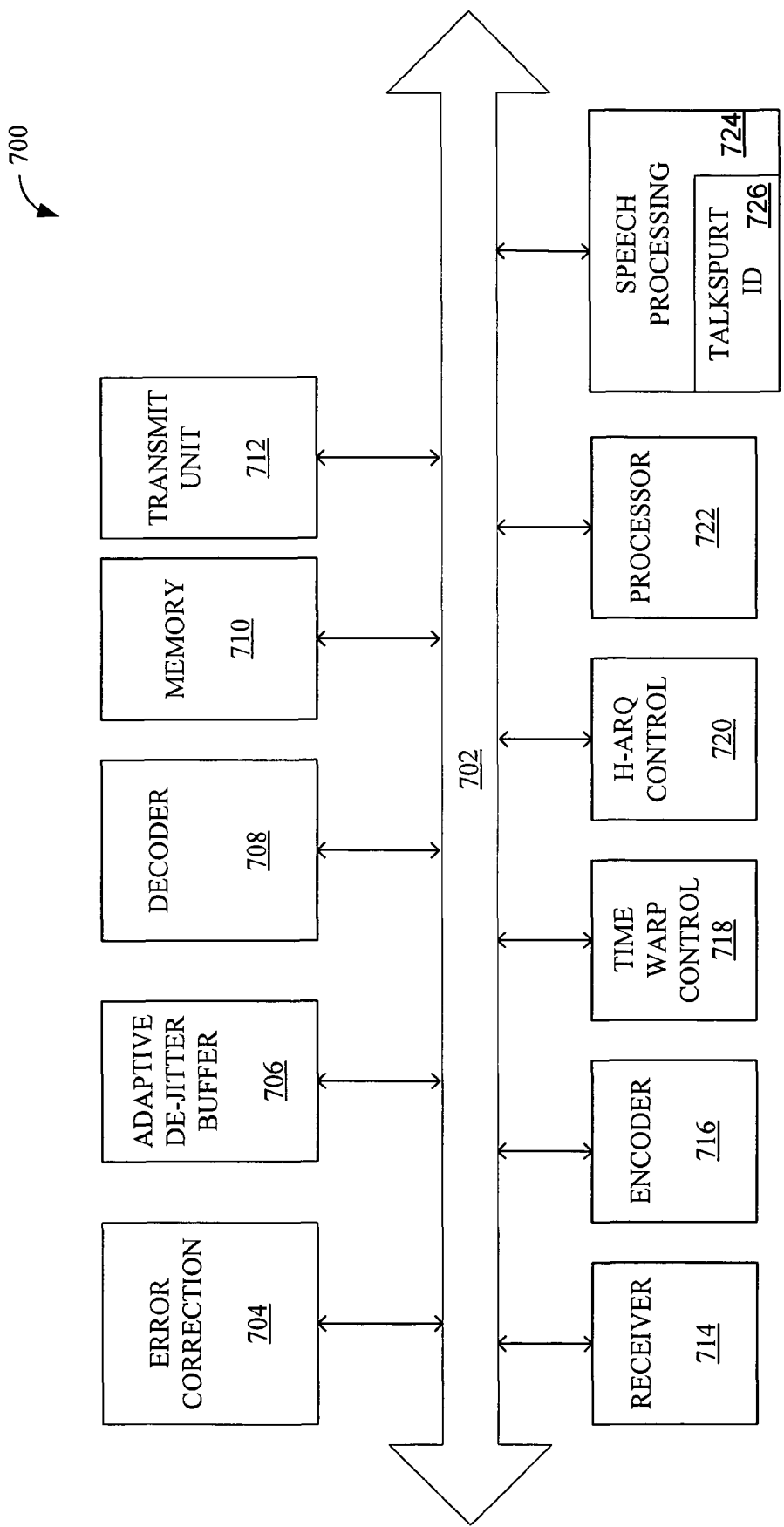
FIG. 27 is a block diagram illustrating an Access Terminal (AT) according to one example, including an adaptive de-jitter buffer and a time warping control unit.

FIG. 27 is a block diagram illustrating an AT according to one example. Adaptive de-jitter buffer 706, time warp control unit 718, receive circuitry 714, control of processor 722; memory 710, transmit circuitry 712, Decoder 708, H-ARQ Control 720, encoder 716, speech processing 724, Talkspurt ID 726, error correction 704 may be coupled together as shown in the preceding embodiments. In addition they may be coupled together via communication bus 702 shown in FIG. 27.

Figure 28:
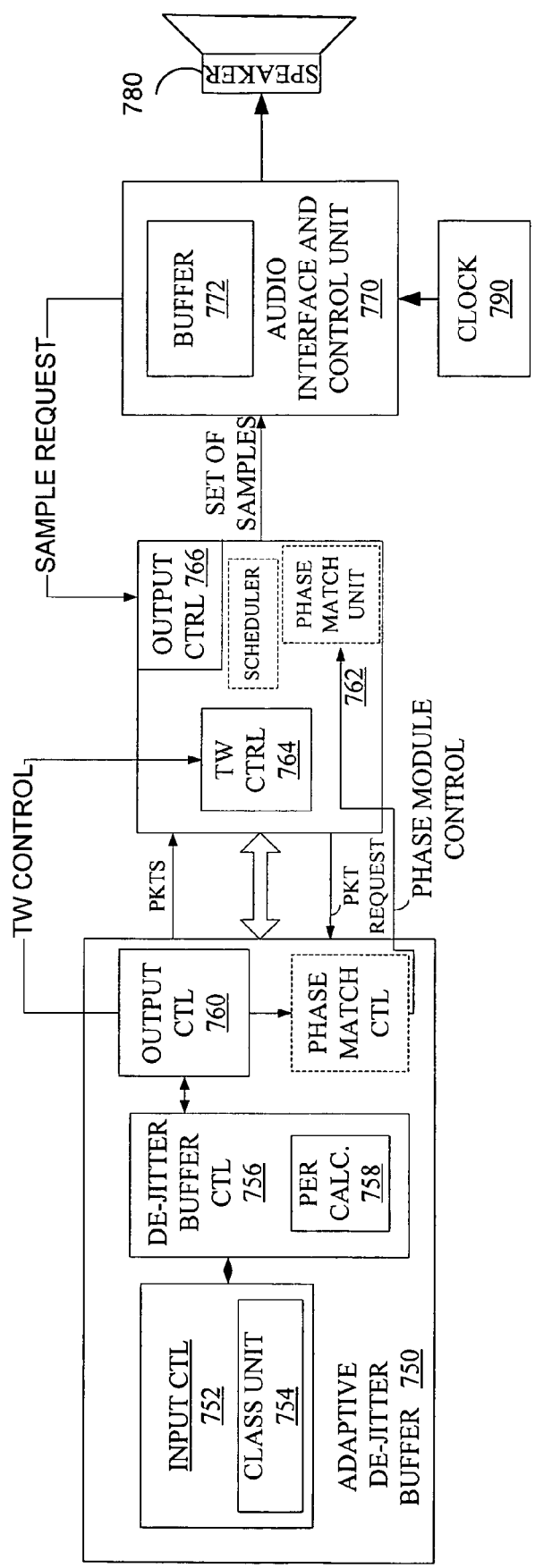
FIG. 28 illustrates a portion of a receiver, including an adaptive de-jitter buffer, and adapted to time warp packets according to one example.
Figure 29:
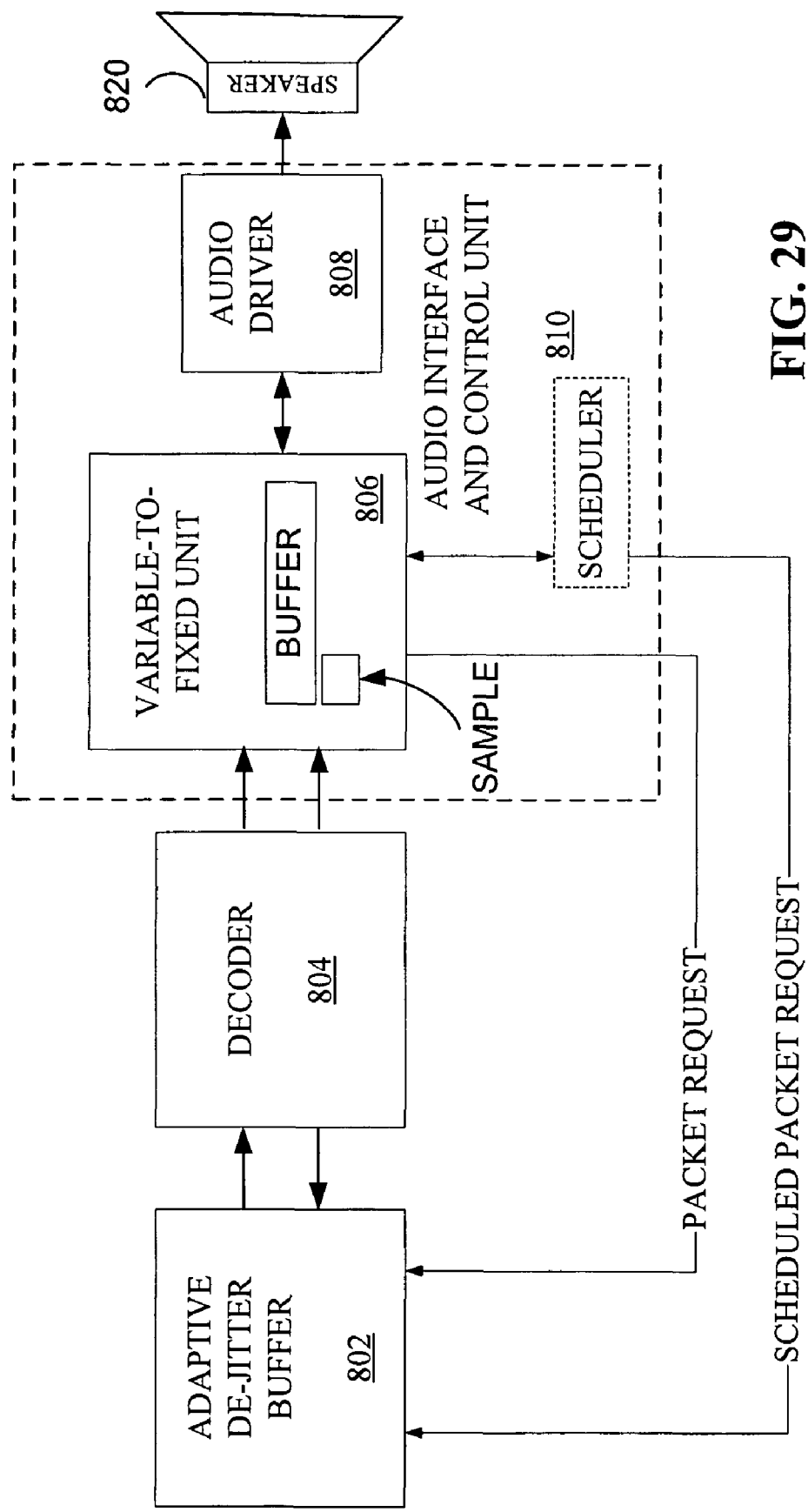
FIG. 29 illustrates an alternate example of a receiver, including an adaptive de-jitter buffer, and adapted to time warp packets according to another example.

FIG. 28 illustrates packet processing in one example wherein packets are received by a de-jitter buffer and eventually played back by a speaker. As illustrated, packets are received at the de-jitter buffer. The de-jitter buffer sends packets and time warping information to the decoder upon packet requests from the decoder. The decoder sends samples to the output driver upon requests from the output driver.

The input controller within the de-jitter buffer keeps track of the incoming packets and indicates if there is an error in the incoming packets. The de-jitter buffer may receive packets that have sequence numbers. An error may be detected by the input controller for instance, when an incoming packet has a sequence number that is lower than the sequence number of a previous packet. A classification unit, located within the input controller in FIG. 28 classifies incoming packets. Different categories defined by the classification unit may include "good packets," "delayed packets," "bad packets," etc. Also, the input control unit may compare packets and send this information to de-jitter buffer controller.

The de-jitter buffer controller illustrated in FIG. 28 receives bi-directional input from the input and output controller of the de-jitter buffer. The de-jitter buffer controller receives data from the input controller, wherein such data indicates characteristics of the incoming data such as the number of good packets received, the number of bad packets received, etc. The de-jitter buffer may use this information to determine when the de-jitter buffer needs to shrink or grow, which may result in a signal to the time warping controller to compress or expand. A Packet Error Rate (PER) unit within the de-jitter buffer controller unit calculates the PER delay. The output controller of the de-jitter buffer requests packets from the de-jitter buffer. The output controller unit of the de-jitter buffer may also indicate what was the last packet played back.

The decoder sends packet requests to the de-jitter buffer and receives packets from the de-jitter buffer upon such requests. A time warping controller unit within the decoder receives time warping control information from the output controller of the de-jitter buffer. The time warping control information indicates whether packets are to be compressed, expanded or left unmodified. The packets received by the decoder are decoded and converted to speech samples; and upon request from a buffer within an output driver, samples are sent to the output driver. The sample requests from the output driver are received by an output controller within the decoder.

Phase Matching

As noted previously, the receipt of a packet after its anticipated playback time may result in erasures being played back in lieu of the delayed packet. The receipt of erasures or missing packets at the adaptive de jitter buffer may cause discontinuities in the decoded speech. When potential discontinuities are recognized by the adaptive de-jitter buffer, the adaptive de-jitter buffer may request the decoder perform phase matching. As illustrated in FIG. 28, the adaptive dejitter buffer 750 may include a phase match controller that receives input from the output controller 760. The phase match control information is sent to a phase match unit which may be located in the decoder 762. In one example, the phase match control information may include "phase offset" and "run length" information. The phase offset is the difference between the number of packets the decoder has decoded and the number of packets the encoder has encoded. Run length refers to the number of consecutive erasures the decoder has decoded immediately prior to decoding the current packet.

In one example, phase matching and time warping are both implemented in a decoder having common control code or software. In one example, a decoder implements waveform interpolation, wherein:
 a) If no time-warping and no phase matching is used, vocoding is done using waveform_interpolation with 160 samples;
 b) If time-warping is used and no phase matching, vocoding is done using waveform_interpolation_decoding with (160+−N*Pitch Period) samples, where N may be 1 or 2.
 c) If no time-warping and phase matching is used, vocoding is done using waveform_interpolation_decoding with (160−Δ) samples, where Δ is the amount of Phase Matching.
 d) If both Phase Matching and time-warping used, vocoding is done waveform_interpolation_decoding with (160−Δ+−N*Pitch Period) samples, where Δ is the amount of Phase Matching.

A clock input to the output driver determines how frequently data is requested by the buffer within the output driver. This is the main clock in the system and may be implemented in many different ways. The dominant clock of the system may be derived by the sampling rate of the PCM samples. For example, if narrowband speech is being communicated, the system plays back 8000 PCM samples per second (8 KHz). This clock may drive the rest of the system. One approach is to let the audio interface 770 request more samples from the decoder when they are needed. Another approach is to let the decoder/time warping run independently and because this module knows how many PCM samples were previously delivered, it knows when next to provide more samples.

A scheduler may be located in the decoder 762 or in the audio interface and control unit 810. When located in the audio interface control unit 810, the scheduler bases a next request for packets on the number of PCM samples received. When the scheduler is located in the decoder, the scheduler may request packets every t ms. For instance, the decoder scheduler may request packets every 2 ms from the adaptive de-jitter buffer 750. If time warping is not enabled in the decoder, or if the time warp unit is not located in the decoder 762, the scheduler sends a set of samples to the audio interface and control unit 770 corresponding to the exact number of samples in 1 packet. For instance, where the audio interface unit 770 requests samples every 2 ms, the output ctrl 766 of the decoder sends 16 PCM samples (1 packet corresponds to 20 ms 160 samples of speech data, at 8 Khz sampling rate.) In other words, when the time warp controller is outside the decoder, the output of the decoder is a normal packet to sample conversion. The audio interface unit 770 converts the number of samples to the number of samples it would have received had the decoder performed time warping.

In another scenario, when the time warp controller is located within the decoder, and when time warping is enabled, in compression mode, the decoder may output fewer samples; and in expansion mode, the decoder may output more samples."

Figure 30:
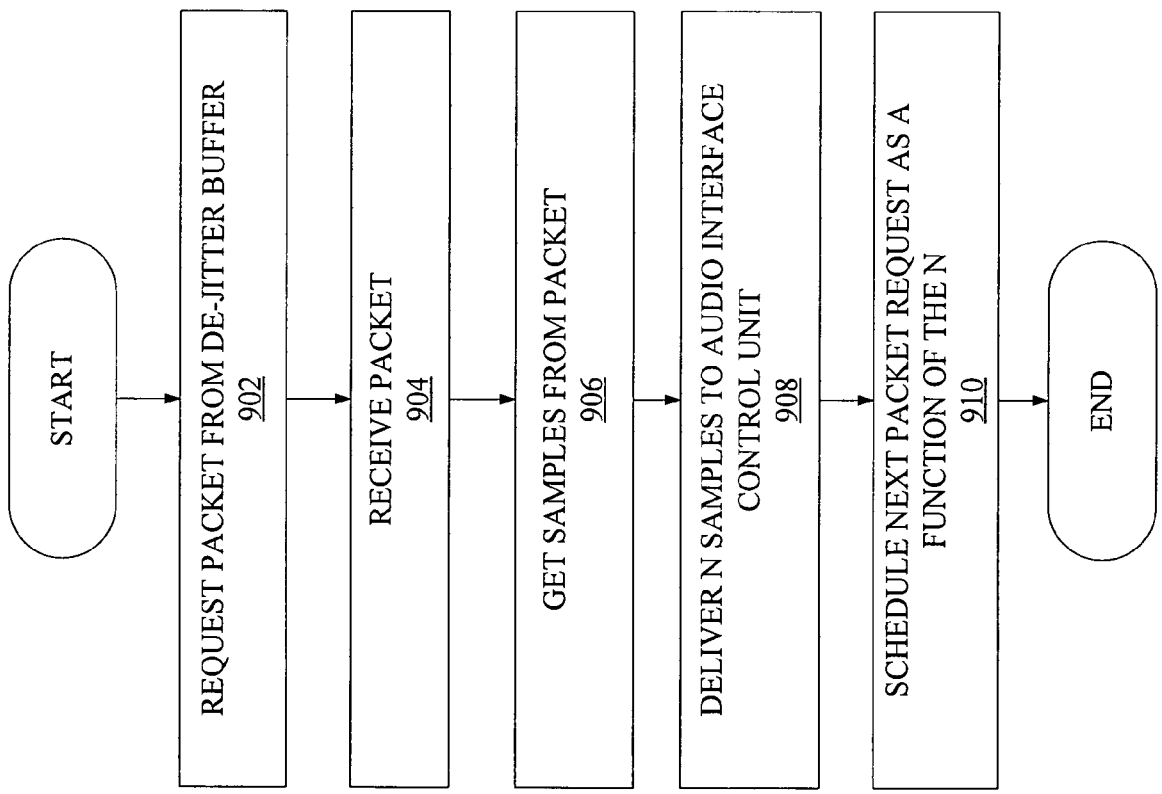
FIG. 30 is a flowchart illustrating one example of a scheduler in a decoder in one example of a receiver, including an adaptive de-jitter buffer, and adapted to time warp packets according to one example.

FIG. 30 further illustrates a scenario where the scheduling function is done by the decoder. In step 902, the decoder requests a packet from the de-jitter buffer. The packet is received at step 904. The packet is converted into "N" samples in step 906. The "N" generated samples are delivered to the audio interface control unit in step 908, and in step 910, the next packet request is scheduled as a function of N.

Figure 31:
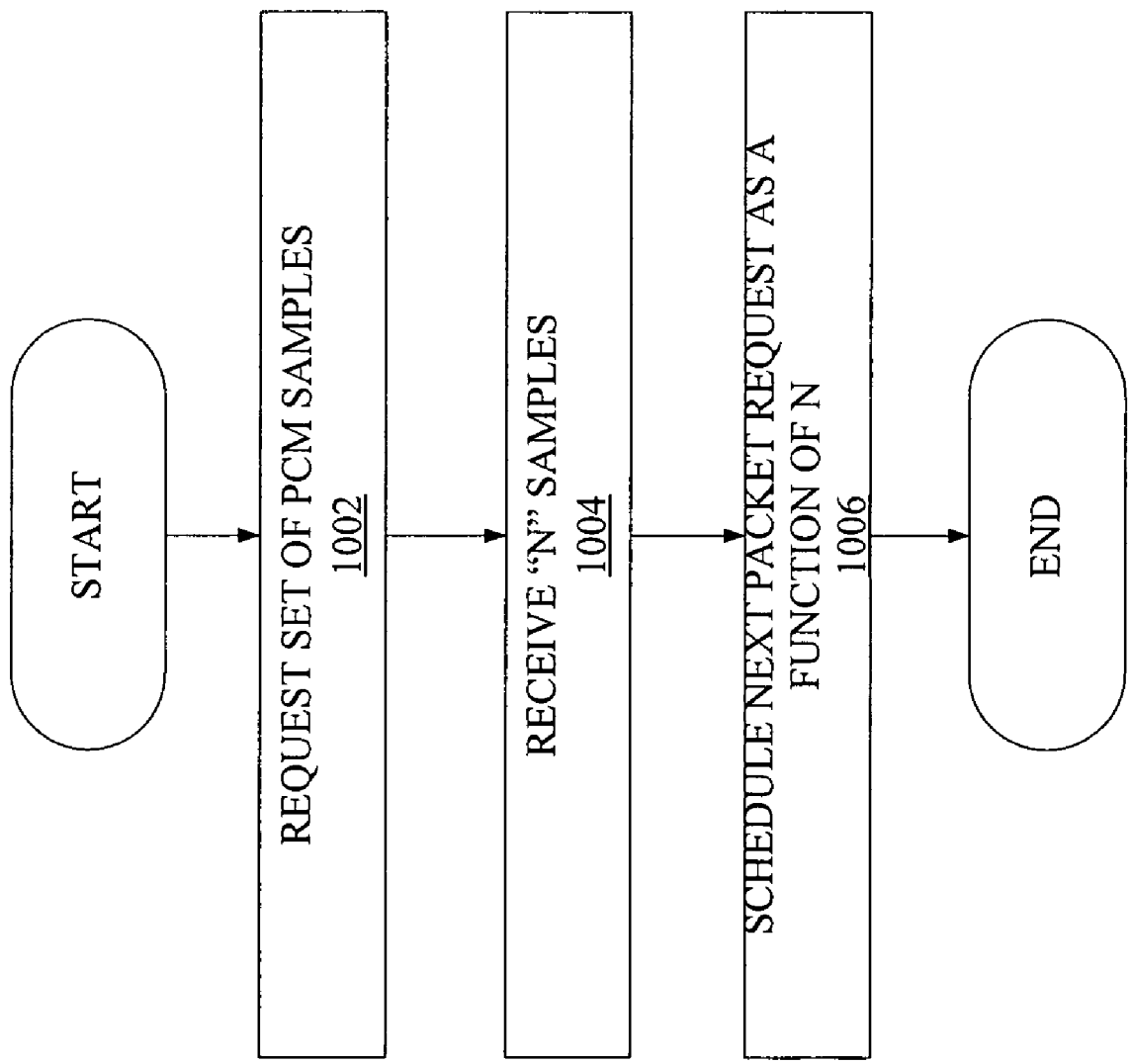
FIG. 31 is a flowchart illustrating a scheduler in an audio interface unit in one example of a receiver.

FIG. 31 illustrates scheduling outside the decoder, in the audio interface and control unit. The audio interface unit first requests a set of PCM samples at step 1002. The requested PCM samples are received at step 1004, and in step 1006, the next packet request is scheduled as a function of N.

Figure 32:
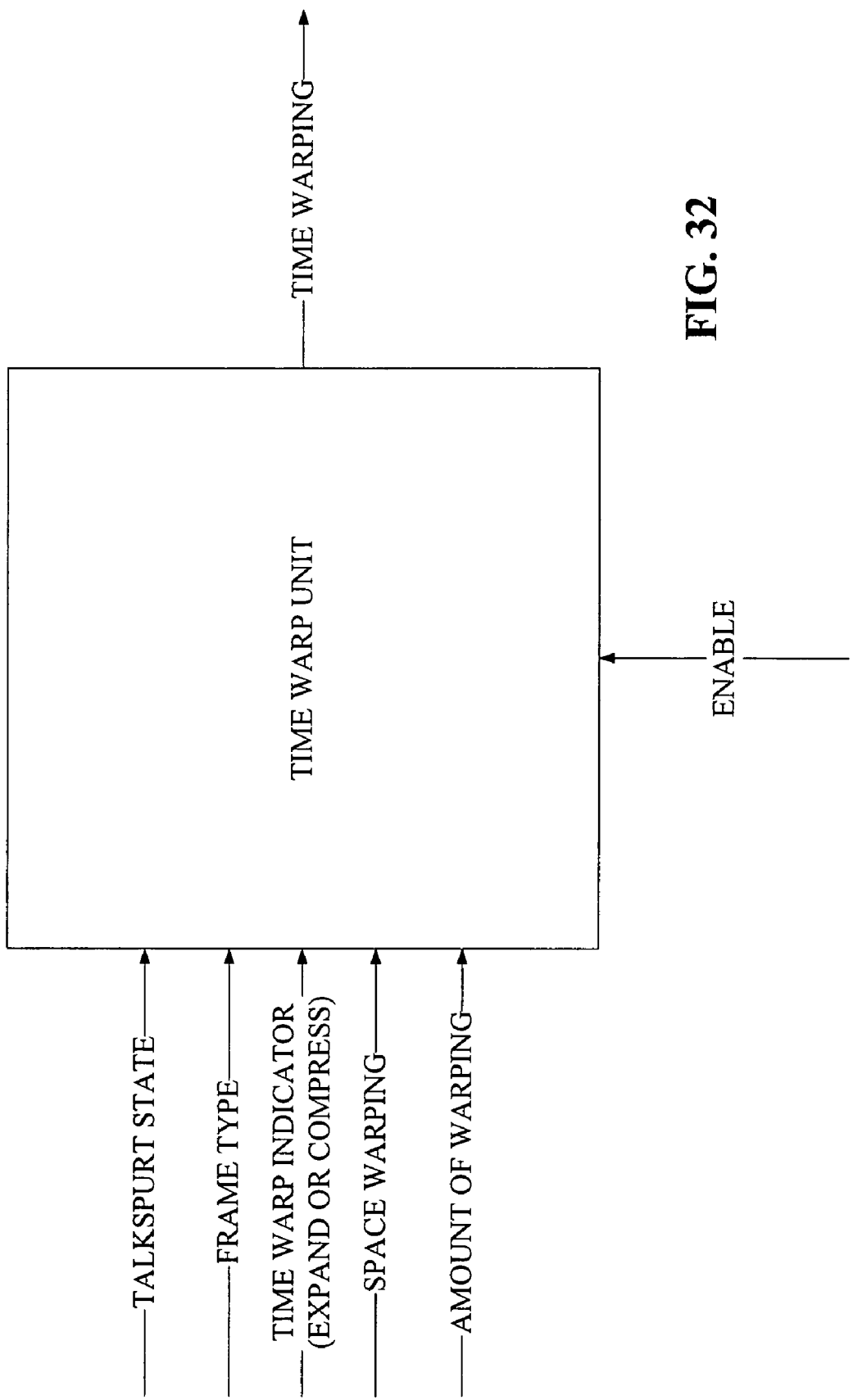
FIG. 32 illustrates the time warp unit where the scheduling is calculated outside the decoder.

The time warp indicator may be a part of the instruction from the adaptive de-jitter buffer such as a no time warp indicator. FIG. 32 illustrates the time warp unit where the scheduling is calculated outside the decoder, for instance in the audio interface and control unit. The packet type, time warp indicator and the amount of warping to be done is input to the time warp unit.

Figure 33:
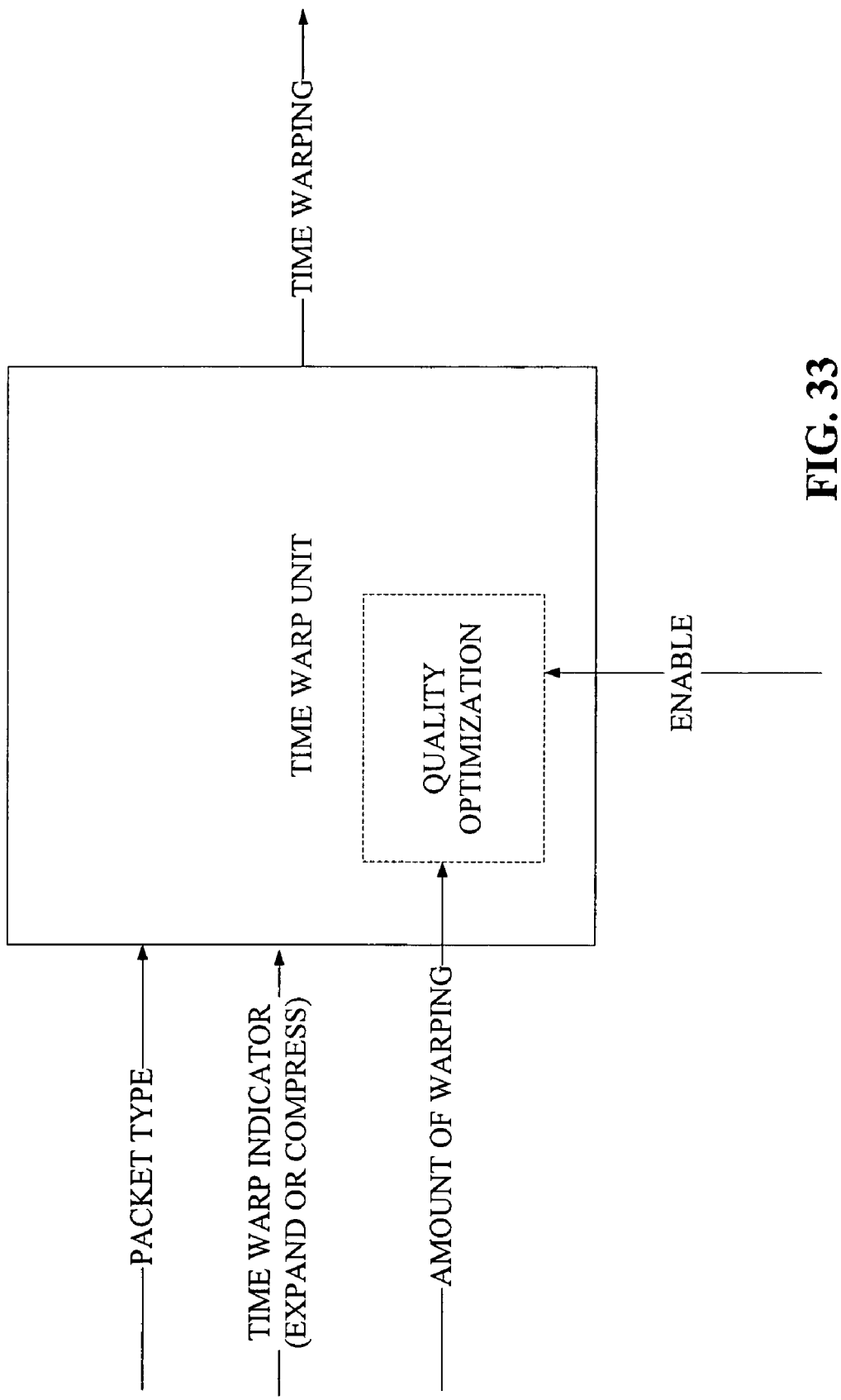
FIG. 33 illustrates the time warp unit where the scheduling is calculated in the time warp unit in decoder.

FIG. 33 illustrates the time warp unit where the scheduling is calculated in the time warp unit in decoder. Input to the time warp unit includes packet type, time warp indicator and amount of warping to be done. The amount of warping and enable are input to the quality optimization unit of the time warp unit. The time warping information is output.

While the specification describes particular examples of the present invention, those of ordinary skill can devise variations of the present invention without departing from the inventive concept. For example, the teachings herein refer to circuit-switched network elements but are equally applicable to packet-switched domain network elements. Also, the teachings herein are not limited to authentication triplet pairs but can also be applied to use of a single triplet including two SRES values (one of the customary format and one of the newer format disclosed herein).

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. An apparatus, comprising:
a buffer memory storage unit configured to store received packets of data comprising sequence identifiers; and
means for buffer adaptation configured to set a window for a playback sequence for a plurality of anticipated packets, wherein the window has a window size, to compare the sequence identifiers of the received packets of data to the playback sequence of the window, to determine whether any of the plurality of anticipated packets for the window have been received based on the comparing of the sequence identifiers of the received packets to the playback sequence of the window, and if any of the plurality of anticipated packets for the window have been received, then to initiate playback of the received packet with a lowest sequence identifier that corresponds to the plurality of anticipated packets, and only if none of the plurality of anticipated packets for the window have been received, then to initiate playback of an erasure, and to adjust the playback sequence of the window based on the playback.

2. The apparatus as in claim 1, wherein adjusting the playback sequence of the window comprises incrementing an index into the playback sequence corresponding to a next anticipated packet of the plurality of anticipated packets.

3. The apparatus as in claim 2, wherein the index is incremented once if the playback of the erasure is initiated.

4. The apparatus as in claim 3, wherein the index is incremented to a sequence identifier beyond the playback sequence of the window if the received packet that is played back corresponds to a last anticipated packet in the window.

5. The apparatus as in claim 4, wherein the window size comprises two (2) sequence identifiers.

6. The apparatus as in claim 4, wherein the window size comprises three (3) sequence identifiers.

7. A method for jitter buffer adaptation comprising:
setting, by a de-jitter buffer controller coupled to a de-jitter buffer, a window for a playback sequence for a plurality of anticipated packets, wherein the window has a window size;
storing, by the de-jitter buffer, received packets of data comprising sequence identifiers;
comparing, by the de-jitter buffer controller, the sequence identifiers of the received packets of data to the playback sequence of the window;
determining, by the de-jitter buffer controller, whether any of the plurality of anticipated packets for the window have been received based on the comparing of the sequence identifiers of the received packets to the playback sequence of the window, and if any of the plurality of anticipated packets for the window have been received, then initiating playback of the received packet with a lowest sequence identifier that corresponds to the plurality of anticipated packets, and only if none of the plurality of anticipated packets for the window have been received, then initiating playback of an erasure; and
adjusting, by the de-jitter buffer controller, the playback sequence of the window based on the playback.

8. The method as in claim 7, wherein adjusting the playback sequence of the window comprises incrementing an index into the playback sequence corresponding to a next anticipated packet of the plurality of anticipated packets.

9. The method as in claim 8, wherein the index is incremented once if the playback of the erasure is initiated.

10. The method as in claim 9, wherein the index is incremented to a sequence identifier beyond the playback sequence of the window if the received packet that is played back corresponds to a last anticipated packet in the window.

11. The method as in claim 10, wherein the window size comprises two (2) sequence identifiers.

12. The method as in claim 10, wherein the window size comprises three (3) sequence identifiers.

13. A non-transitory computer-readable storage medium containing a set of instructions, the set of instructions comprising:
setting a window for a playback sequence for a plurality of anticipated packets, wherein the window has a window size;
storing received packets of data comprising sequence identifiers;
comparing the sequence identifiers of the received packets of data to the playback sequence of the window;
determining whether any of the plurality of anticipated packets for the window have been received based on the comparing of the sequence identifiers of the received packets to the playback sequence of the window, and if any of the plurality of anticipated packets for the window have been received, then initiating playback of the received packet with a lowest sequence identifier that corresponds to the plurality of anticipated packets, and only if none of the plurality of anticipated packets for the window have been received, then initiating playback of an erasure; and
adjusting the playback sequence of the window based on the playback.

14. The non-transitory computer-readable storage medium as in claim 13, wherein adjusting the playback sequence of the window comprises incrementing an index into the playback sequence corresponding to a next anticipated packet of the plurality of anticipated packets.

15. The non-transitory computer-readable storage medium as in claim 14, wherein the index is incremented once if the playback of the erasure is initiated.

16. The non-transitory computer-readable storage medium as in claim 15, wherein the index is incremented to a sequence identifier beyond the playback sequence of the window if the received packet that is played back corresponds to a last anticipated packet in the window.

17. The non-transitory computer-readable storage medium as in claim 16, wherein the window size comprises two (2) sequence identifiers.

18. The non-transitory computer-readable storage medium as in claim 16, wherein the window size comprises three (3) sequence identifiers.

19. An apparatus comprising:
de-jitter buffer for storing received packets of data comprising sequence identifiers; and
de-jitter buffer controller, coupled to the de-jitter buffer, for setting a window for a playback sequence for a plurality of anticipated packets, wherein the window has a window size, for comparing the sequence identifiers of the received packets of data to the playback sequence of the window, for determining whether any of the plurality of anticipated packets for the window have been received based on the comparing of the sequence identifiers of the received packets to the playback sequence of the window, and if any of the plurality of anticipated packets for the window have been received, then initiating playback of the received packet with a lowest sequence identifier that corresponds to the plurality of anticipated packets, and only if none of the plurality of anticipated packets for the window have been received, then initiating playback of an erasure, and for adjusting the playback sequence of the window based on the playback.

20. The apparatus as in claim 19, wherein adjusting the playback sequence of the window comprises incrementing an index into the playback sequence corresponding to a next anticipated packet of the plurality of anticipated packets.

21. The apparatus as in claim 20, wherein the index is incremented once if the playback of the erasure is initiated.

22. The apparatus as in claim 21, wherein the index is incremented to a sequence identifier beyond the playback sequence of the window if the received packet that is played back corresponds to a last anticipated packet in the window.

23. The apparatus as in claim 22, wherein the window size comprises two (2) sequence identifiers.

24. The apparatus as in claim 22, wherein the window size comprises three (3) sequence identifiers.

* * * * *